(12) United States Patent
Relke et al.

(10) Patent No.: US 7,419,265 B2
(45) Date of Patent: Sep. 2, 2008

(54) AUTOSTEREOSCOPIC PROJECTION SYSTEM

(75) Inventors: Ingo Relke, Jena (DE); Stephan Otte, Jena (DE); Markus Klippstein, Munchenroda (DE); Thomas Bruggert, Jena (DE); Bernd Riemann, Ranis (DE)

(73) Assignee: X3D Technologies Gmbh, Jena (DE)

( * ) Notice: Subject to any disclaimer, the term of this patent is extended or adjusted under 35 U.S.C. 154(b) by 165 days.

(21) Appl. No.: 10/520,860

(22) PCT Filed: Jul. 11, 2003

(86) PCT No.: PCT/EP03/07620

§ 371 (c)(1),
(2), (4) Date: Jan. 11, 2005

(87) PCT Pub. No.: WO2004/008779

PCT Pub. Date: Jan. 22, 2004

(65) Prior Publication Data

US 2006/0103932 A1    May 18, 2006

(30) Foreign Application Priority Data

Jul. 12, 2002   (DE)  ............................ 202 11 612 U
Dec. 3, 2002    (DE)  ............................ 202 18 862 U
Dec. 16, 2002   (DE)  ............................... 102 59 968

(51) Int. Cl.
  *G03B 21/00*   (2006.01)
  *G03B 21/26*   (2006.01)
  *G03B 35/00*   (2006.01)
  *H04N 9/47*    (2006.01)
  *H04N 13/04*   (2006.01)

(52) U.S. Cl. .................. 353/7; 353/8; 353/10; 353/94; 359/465; 359/630; 348/57; 348/58; 352/57

(58) Field of Classification Search ...................... 353/7, 353/8, 10, 94; 359/465, 630; 348/57, 58, 348/42; 352/57; 396/324
See application file for complete search history.

(56) References Cited

U.S. PATENT DOCUMENTS 5,712,732 A * 1/1998 Street ......................... 359/630

(Continued)

FOREIGN PATENT DOCUMENTS

| DE | 201 21 318 U1 | 8/2002 |
| JP | 11352442 | 12/1999 |
| WO | WO 01/56265 A2 | 8/2001 |

OTHER PUBLICATIONS

Schmidt et al., "Multi-viewpoint Autostereoscopic Displays from 4D-Vision," Proceedings of the SPIE, vol. 4660 (2002).

*Primary Examiner*—Melissa Jan Koval
(74) *Attorney, Agent, or Firm*—Grimes & Battersby, LLP; James F. McLaughlin; Paul C. Onderick

(57) ABSTRACT

An autostereoscopic projection arrangement, comprising at least one projector and at least one filter array which has a multitude of filter elements arranged in columns and rows, in which arrangement bits of partial information from views of a scene or object are projected by the projector(s) onto a projection screen, where there bits of partial information are rendered on image rendering elements and, having passed one or several of the filter arrays, are made visible to at least one observer, and in which, as regards to propagation direction of the bits of partial information, the image rendering elements correspond with correlated filter elements in such a way that an observer will see predominantly bits of partial information from a first selection of views with one eye and predominantly bits of partial information from a second selection of views with the other eye, and thus will have a spatial impression.

17 Claims, 36 Drawing Sheets

U.S. PATENT DOCUMENTS

| | | | | |
|---|---|---|---|---|
| 6,088,505 A | * | 7/2000 | Hobbs | 385/147 |
| 6,593,957 B1 | * | 7/2003 | Christie | 348/42 |
| 7,190,518 B1 | * | 3/2007 | Kleinberger et al. | 359/465 |
| 2002/0030888 A1 | | 3/2002 | Kleinberger | |
| 2003/0067539 A1 | | 4/2003 | Doerfel et al. | |

* cited by examiner

| i \ j | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 |
| 2 | 3 | 4 | 5 | 6 | 7 | 8 | 1 | 2 | 3 | 4 | 5 | 6 | 7 | 8 | 1 | 2 | 3 | 4 | 5 | 6 | 7 |
| 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 4 | 5 | 6 | 7 | 8 | 1 | 2 | 3 | 4 | 5 | 6 | 7 | 8 | 1 | 2 | 3 | 4 | 5 | 6 | 7 | 8 | 1 |
| 5 | 6 | 7 | 8 | 1 | 2 | 3 | 4 | 5 | 6 | 7 | 8 | 1 | 2 | 3 | 4 | 5 | 6 | 7 | 8 | 1 | 2 |
| 6 | 7 | 8 | 1 | 2 | 3 | 4 | 5 | 6 | 7 | 8 | 1 | 2 | 3 | 4 | 5 | 6 | 7 | 8 | 1 | 2 | 3 |
| 7 | 8 | 1 | 2 | 3 | 4 | 5 | 6 | 7 | 8 | 1 | 2 | 3 | 4 | 5 | 6 | 7 | 8 | 1 | 2 | 3 | 4 |
| 8 | 1 | 2 | 3 | 4 | 5 | 6 | 7 | 8 | 1 | 2 | 3 | 4 | 5 | 6 | 7 | 8 | 1 | 2 | 3 | 4 | 5 |
| 9 | 2 | 3 | 4 | 5 | 6 | 7 | 8 | 1 | 2 | 3 | 4 | 5 | 6 | 7 | 8 | 1 | 2 | 3 | 4 | 5 | 6 |
| 10 | 3 | 4 | 5 | 6 | 7 | 8 | 1 | 2 | 3 | 4 | 5 | 6 | 7 | 8 | 1 | 2 | 3 | 4 | 5 | 6 | 7 |
| 11 | 4 | 5 | 6 | 7 | 8 | 1 | 2 | 3 | 4 | 5 | 6 | 7 | 8 | 1 | 2 | 3 | 4 | 5 | 6 | 7 | 8 |
| 12 | 5 | 6 | 7 | 8 | 1 | 2 | 3 | 4 | 5 | 6 | 7 | 8 | 1 | 2 | 3 | 4 | 5 | 6 | 7 | 8 | 1 |
| 13 | 6 | 7 | 8 | 1 | 2 | 3 | 4 | 5 | 6 | 7 | 8 | 1 | 2 | 3 | 4 | 5 | 6 | 7 | 8 | 1 | 2 |
| 14 | 7 | 8 | 1 | 2 | 3 | 4 | 5 | 6 | 7 | 8 | 1 | 2 | 3 | 4 | 5 | 6 | 7 | 8 | 1 | 2 | 3 |
| 15 | 8 | 1 | 2 | 3 | 4 | 5 | 6 | 7 | 8 | 1 | 2 | 3 | 4 | 5 | 6 | 7 | 8 | 1 | 2 | 3 | 4 |
| 16 | 1 | 2 | 3 | 4 | 5 | 6 | 7 | 8 | 1 | 2 | 3 | 4 | 5 | 6 | 7 | 8 | 1 | 2 | 3 | 4 | 5 |

| i \ j | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 21 | 6 | 7 | 7 | 8 | 8 | 1 | 1 | 2 | 2 | 3 | 3 | 4 | 4 | 5 | 5 | 6 |
| 20 | 5 | 6 | 6 | 7 | 7 | 8 | 8 | 1 | 1 | 2 | 2 | 3 | 3 | 4 | 4 | 5 |
| 19 | 4 | 5 | 5 | 6 | 6 | 7 | 7 | 8 | 8 | 1 | 1 | 2 | 2 | 3 | 3 | 4 |
| 18 | 3 | 4 | 4 | 5 | 5 | 6 | 6 | 7 | 7 | 8 | 8 | 1 | 1 | 2 | 2 | 3 |
| 17 | 2 | 3 | 3 | 4 | 4 | 5 | 5 | 6 | 6 | 7 | 7 | 8 | 8 | 1 | 1 | 2 |
| 16 | 1 | 2 | 2 | 3 | 3 | 4 | 4 | 5 | 5 | 6 | 6 | 7 | 7 | 8 | 8 | 1 |
| 15 | 8 | 1 | 1 | 2 | 2 | 3 | 3 | 4 | 4 | 5 | 5 | 6 | 6 | 7 | 7 | 8 |
| 14 | 7 | 8 | 8 | 1 | 1 | 2 | 2 | 3 | 3 | 4 | 4 | 5 | 5 | 6 | 6 | 7 |
| 13 | 6 | 7 | 7 | 8 | 8 | 1 | 1 | 2 | 2 | 3 | 3 | 4 | 4 | 5 | 5 | 6 |
| 12 | 5 | 6 | 6 | 7 | 7 | 8 | 8 | 1 | 1 | 2 | 2 | 3 | 3 | 4 | 4 | 5 |
| 11 | 4 | 5 | 5 | 6 | 6 | 7 | 7 | 8 | 8 | 1 | 1 | 2 | 2 | 3 | 3 | 4 |
| 10 | 3 | 4 | 4 | 5 | 5 | 6 | 6 | 7 | 7 | 8 | 8 | 1 | 1 | 2 | 2 | 3 |
| 9 | 2 | 3 | 3 | 4 | 4 | 5 | 5 | 6 | 6 | 7 | 7 | 8 | 8 | 1 | 1 | 2 |
| 8 | 1 | 2 | 2 | 3 | 3 | 4 | 4 | 5 | 5 | 6 | 6 | 7 | 7 | 8 | 8 | 1 |
| 7 | 8 | 1 | 1 | 2 | 2 | 3 | 3 | 4 | 4 | 5 | 5 | 6 | 6 | 7 | 7 | 8 |
| 6 | 7 | 8 | 8 | 1 | 1 | 2 | 2 | 3 | 3 | 4 | 4 | 5 | 5 | 6 | 6 | 7 |
| 5 | 6 | 7 | 7 | 8 | 8 | 1 | 1 | 2 | 2 | 3 | 3 | 4 | 4 | 5 | 5 | 6 |
| 4 | 5 | 6 | 6 | 7 | 7 | 8 | 8 | 1 | 1 | 2 | 2 | 3 | 3 | 4 | 4 | 5 |
| 3 | 4 | 5 | 5 | 6 | 6 | 7 | 7 | 8 | 8 | 1 | 1 | 2 | 2 | 3 | 3 | 4 |
| 2 | 3 | 4 | 4 | 5 | 5 | 6 | 6 | 7 | 7 | 8 | 8 | 1 | 1 | 2 | 2 | 3 |
| 1 | 2 | 3 | 3 | 4 | 4 | 5 | 5 | 6 | 6 | 7 | 7 | 8 | 8 | 1 | 1 | 2 |

| i→ | R 1 | G 2 | B 3 | R 4 | G 5 | B 6 | R 7 | G 8 | B 9 | R 10 | G 11 | B 12 | R 13 | G 14 | B 15 | R 16 | G 17 | B 18 | R 19 | G 20 | B 21 |
|---|---|---|---|---|---|---|---|---|---|---|---|---|---|---|---|---|---|---|---|---|---|
| j 1 | 2 | 3 | 4 | 5 | 6 | 7 | 8 | 1 | 2 | 3 | 4 | 5 | 6 | 7 | 8 | 1 | 2 | 3 | 4 | 5 | 6 |
| 2 | 3 | 4 | 5 | 6 | 7 | 8 | 1 | 2 | 3 | 4 | 5 | 6 | 7 | 8 | 1 | 2 | 3 | 4 | 5 | 6 | 7 |
| 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 4 | 5 | 6 | 7 | 8 | 1 | 2 | 3 | 4 | 5 | 6 | 7 | 8 | 1 | 2 | 3 | 4 | 5 | 6 | 7 | 8 | 1 |
| 5 | 6 | 7 | 8 | 1 | 2 | 3 | 4 | 5 | 6 | 7 | 8 | 1 | 2 | 3 | 4 | 5 | 6 | 7 | 8 | 1 | 2 |
| 6 | 7 | 8 | 1 | 2 | 3 | 4 | 5 | 6 | 7 | 8 | 1 | 2 | 3 | 4 | 5 | 6 | 7 | 8 | 1 | 2 | 3 |
| 7 | 8 | 1 | 2 | 3 | 4 | 5 | 6 | 7 | 8 | 1 | 2 | 3 | 4 | 5 | 6 | 7 | 8 | 1 | 2 | 3 | 4 |
| 8 | 1 | 2 | 3 | 4 | 5 | 6 | 7 | 8 | 1 | 2 | 3 | 4 | 5 | 6 | 7 | 8 | 1 | 2 | 3 | 4 | 5 |
| 9 | 2 | 3 | 4 | 5 | 6 | 7 | 8 | 1 | 2 | 3 | 4 | 5 | 6 | 7 | 8 | 1 | 2 | 3 | 4 | 5 | 6 |
| 10 | 3 | 4 | 5 | 6 | 7 | 8 | 1 | 2 | 3 | 4 | 5 | 6 | 7 | 8 | 1 | 2 | 3 | 4 | 5 | 6 | 7 |
| 11 | 4 | 5 | 6 | 7 | 8 | 1 | 2 | 3 | 4 | 5 | 6 | 7 | 8 | 1 | 2 | 3 | 4 | 5 | 6 | 7 | 8 |
| 12 | 5 | 6 | 7 | 8 | 1 | 2 | 3 | 4 | 5 | 6 | 7 | 8 | 1 | 2 | 3 | 4 | 5 | 6 | 7 | 8 | 1 |
| 13 | 6 | 7 | 8 | 1 | 2 | 3 | 4 | 5 | 6 | 7 | 8 | 1 | 2 | 3 | 4 | 5 | 6 | 7 | 8 | 1 | 2 |
| 14 | 7 | 8 | 1 | 2 | 3 | 4 | 5 | 6 | 7 | 8 | 1 | 2 | 3 | 4 | 5 | 6 | 7 | 8 | 1 | 2 | 3 |
| 15 | 8 | 1 | 2 | 3 | 4 | 5 | 6 | 7 | 8 | 1 | 2 | 3 | 4 | 5 | 6 | 7 | 8 | 1 | 2 | 3 | 4 |
| 16 | 1 | 2 | 3 | 4 | 5 | 6 | 7 | 8 | 1 | 2 | 3 | 4 | 5 | 6 | 7 | 8 | 1 | 2 | 3 | 4 | 5 |

| i\j | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 2 | 3 | 4 | 4 | 5 | 6 | 6 | 7 | 8 | 8 | 1 | 2 | 2 | 3 | 4 | 4 |
| 2 | 3 | 4 | 5 | 5 | 6 | 7 | 7 | 8 | 1 | 1 | 2 | 3 | 3 | 4 | 5 | 5 |
| 3 | 4 | 5 | 6 | 6 | 7 | 8 | 8 | 1 | 2 | 2 | 3 | 4 | 4 | 5 | 6 | 6 |
| 4 | 5 | 6 | 7 | 7 | 8 | 1 | 1 | 2 | 3 | 3 | 4 | 5 | 5 | 6 | 7 | 7 |
| 5 | 6 | 7 | 8 | 8 | 1 | 2 | 2 | 3 | 4 | 4 | 5 | 6 | 6 | 7 | 8 | 8 |
| 6 | 7 | 8 | 1 | 1 | 2 | 3 | 3 | 4 | 5 | 5 | 6 | 7 | 7 | 8 | 1 | 1 |
| 7 | 8 | 1 | 2 | 2 | 3 | 4 | 4 | 5 | 6 | 6 | 7 | 8 | 8 | 1 | 2 | 2 |
| 8 | 1 | 2 | 3 | 3 | 4 | 5 | 5 | 6 | 7 | 7 | 8 | 1 | 1 | 2 | 3 | 3 |
| 9 | 2 | 3 | 4 | 4 | 5 | 6 | 6 | 7 | 8 | 8 | 1 | 2 | 2 | 3 | 4 | 4 |
| 10 | 3 | 4 | 5 | 5 | 6 | 7 | 7 | 8 | 1 | 1 | 2 | 3 | 3 | 4 | 5 | 5 |
| 11 | 4 | 5 | 6 | 6 | 7 | 8 | 8 | 1 | 2 | 2 | 3 | 4 | 4 | 5 | 6 | 6 |
| 12 | 5 | 6 | 7 | 7 | 8 | 1 | 1 | 2 | 3 | 3 | 4 | 5 | 5 | 6 | 7 | 7 |
| 13 | 6 | 7 | 8 | 8 | 1 | 2 | 2 | 3 | 4 | 4 | 5 | 6 | 6 | 7 | 8 | 8 |
| 14 | 7 | 8 | 1 | 1 | 2 | 3 | 3 | 4 | 5 | 5 | 6 | 7 | 7 | 8 | 1 | 1 |
| 15 | 8 | 1 | 2 | 2 | 3 | 4 | 4 | 5 | 6 | 6 | 7 | 8 | 8 | 1 | 2 | 2 |
| 16 | 1 | 2 | 3 | 3 | 4 | 5 | 5 | 6 | 7 | 7 | 8 | 1 | 1 | 2 | 3 | 3 |
| 17 | 2 | 3 | 4 | 4 | 5 | 6 | 6 | 7 | 8 | 8 | 1 | 2 | 2 | 3 | 4 | 4 |
| 18 | 3 | 4 | 5 | 5 | 6 | 7 | 7 | 8 | 1 | 1 | 2 | 3 | 3 | 4 | 5 | 5 |
| 19 | 4 | 5 | 6 | 6 | 7 | 8 | 8 | 1 | 2 | 2 | 3 | 4 | 4 | 5 | 6 | 6 |
| 20 | 5 | 6 | 7 | 7 | 8 | 1 | 1 | 2 | 3 | 3 | 4 | 5 | 5 | 6 | 7 | 7 |
| 21 | 6 | 7 | 8 | 8 | 1 | 2 | 2 | 3 | 4 | 4 | 5 | 6 | 6 | 7 | 8 | 8 |

| $p_1 \rightarrow$ | 1 | 2 | 3 | 4 | 5 | 6 | 7 | 8 | 9 |
|---|---|---|---|---|---|---|---|---|---|
| $q_1$ 1 | R' | G' | B' | R' | G' | B' | R' | G' | B' |
| 2 | G' | B' | R' | G' | B' | R' | G' | B' | R' |
| 3 | B' | R' | G' | B' | R' | G' | B' | R' | G' |
| 4 | R' | G' | B' | R' | G' | B' | R' | G' | B' |
| 5 | G' | B' | R' | G' | B' | R' | G' | B' | R' |
| 6 | B' | R' | G' | B' | R' | G' | B' | R' | G' |
| 7 | R' | G' | B' | R' | G' | B' | R' | G' | B' |
| 8 | G' | B' | R' | G' | B' | R' | G' | B' | R' |
| 9 | B' | R' | G' | B' | R' | G' | B' | R' | G' |

| j \ i | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1 | 1 | 2 | 3 | 1 | 2 | 3 | 1 | 2 | 3 | 1 | 2 | 3 | 1 | 2 | 3 | 1 | 2 | 3 | 1 | 2 | 3 |
| 2 | 2 | 3 | 1 | 2 | 3 | 1 | 2 | 3 | 1 | 2 | 3 | 1 | 2 | 3 | 1 | 2 | 3 | 1 | 2 | 3 | 1 |
| 3 | 3 | 1 | 2 | 3 | 1 | 2 | 3 | 1 | 2 | 3 | 1 | 2 | 3 | 1 | 2 | 3 | 1 | 2 | 3 | 1 | 2 |
| 4 | 1 | 2 | 3 | 1 | 2 | 3 | 1 | 2 | 3 | 1 | 2 | 3 | 1 | 2 | 3 | 1 | 2 | 3 | 1 | 2 | 3 |
| 5 | 2 | 3 | 1 | 2 | 3 | 1 | 2 | 3 | 1 | 2 | 3 | 1 | 2 | 3 | 1 | 2 | 3 | 1 | 2 | 3 | 1 |
| 6 | 3 | 1 | 2 | 3 | 1 | 2 | 3 | 1 | 2 | 3 | 1 | 2 | 3 | 1 | 2 | 3 | 1 | 2 | 3 | 1 | 2 |
| 7 | 1 | 2 | 3 | 1 | 2 | 3 | 1 | 2 | 3 | 1 | 2 | 3 | 1 | 2 | 3 | 1 | 2 | 3 | 1 | 2 | 3 |
| 8 | 2 | 3 | 1 | 2 | 3 | 1 | 2 | 3 | 1 | 2 | 3 | 1 | 2 | 3 | 1 | 2 | 3 | 1 | 2 | 3 | 1 |
| 9 | 3 | 1 | 2 | 3 | 1 | 2 | 3 | 1 | 2 | 3 | 1 | 2 | 3 | 1 | 2 | 3 | 1 | 2 | 3 | 1 | 2 |
| 10 | 1 | 2 | 3 | 1 | 2 | 3 | 1 | 2 | 3 | 1 | 2 | 3 | 1 | 2 | 3 | 1 | 2 | 3 | 1 | 2 | 3 |
| 11 | 2 | 3 | 1 | 2 | 3 | 1 | 2 | 3 | 1 | 2 | 3 | 1 | 2 | 3 | 1 | 2 | 3 | 1 | 2 | 3 | 1 |
| 12 | 3 | 1 | 2 | 3 | 1 | 2 | 3 | 1 | 2 | 3 | 1 | 2 | 3 | 1 | 2 | 3 | 1 | 2 | 3 | 1 | 2 |
| 13 | 1 | 2 | 3 | 1 | 2 | 3 | 1 | 2 | 3 | 1 | 2 | 3 | 1 | 2 | 3 | 1 | 2 | 3 | 1 | 2 | 3 |
| 14 | 2 | 3 | 1 | 2 | 3 | 1 | 2 | 3 | 1 | 2 | 3 | 1 | 2 | 3 | 1 | 2 | 3 | 1 | 2 | 3 | 1 |
| 15 | 3 | 1 | 2 | 3 | 1 | 2 | 3 | 1 | 2 | 3 | 1 | 2 | 3 | 1 | 2 | 3 | 1 | 2 | 3 | 1 | 2 |
| 16 | 1 | 2 | 3 | 1 | 2 | 3 | 1 | 2 | 3 | 1 | 2 | 3 | 1 | 2 | 3 | 1 | 2 | 3 | 1 | 2 | 3 |

Fig.27

| i→<br>j↓ | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1  | 2 | 3 | 4 | 5 | 6 | 7 | 8 | 1 | 2 | 3 | 4 | 5 | 6 | 7 | 8 | 1 | 2 | 3 | 4 | 5 | 6 |
| 2  | 3 | 4 | 5 | 6 | 7 | 8 | 1 | 2 | 3 | 4 | 5 | 6 | 7 | 8 | 1 | 2 | 3 | 4 | 5 | 6 | 7 |
| 3  | 4 | 5 | 6 | 7 | 8 | 1 | 2 | 3 | 4 | 5 | 6 | 7 | 8 | 1 | 2 | 3 | 4 | 5 | 6 | 7 | 8 |
| 4  | 4 | 5 | 6 | 7 | 8 | 1 | 2 | 3 | 4 | 5 | 6 | 7 | 8 | 1 | 2 | 3 | 4 | 5 | 6 | 7 | 8 |
| 5  | 5 | 6 | 7 | 8 | 1 | 2 | 3 | 4 | 5 | 6 | 7 | 8 | 1 | 2 | 3 | 4 | 5 | 6 | 7 | 8 | 1 |
| 6  | 6 | 7 | 8 | 1 | 2 | 3 | 4 | 5 | 6 | 7 | 8 | 1 | 2 | 3 | 4 | 5 | 6 | 7 | 8 | 1 | 2 |
| 7  | 6 | 7 | 8 | 1 | 2 | 3 | 4 | 5 | 6 | 7 | 8 | 1 | 2 | 3 | 4 | 5 | 6 | 7 | 8 | 1 | 2 |
| 8  | 7 | 8 | 1 | 2 | 3 | 4 | 5 | 6 | 7 | 8 | 1 | 2 | 3 | 4 | 5 | 6 | 7 | 8 | 1 | 2 | 3 |
| 9  | 8 | 1 | 2 | 3 | 4 | 5 | 6 | 7 | 8 | 1 | 2 | 3 | 4 | 5 | 6 | 7 | 8 | 1 | 2 | 3 | 4 |
| 10 | 8 | 1 | 2 | 3 | 4 | 5 | 6 | 7 | 8 | 1 | 2 | 3 | 4 | 5 | 6 | 7 | 8 | 1 | 2 | 3 | 4 |
| 11 | 1 | 2 | 3 | 4 | 5 | 6 | 7 | 8 | 1 | 2 | 3 | 4 | 5 | 6 | 7 | 8 | 1 | 2 | 3 | 4 | 5 |
| 12 | 2 | 3 | 4 | 5 | 6 | 7 | 8 | 1 | 2 | 3 | 4 | 5 | 6 | 7 | 8 | 1 | 2 | 3 | 4 | 5 | 6 |
| 13 | 2 | 3 | 4 | 5 | 6 | 7 | 8 | 1 | 2 | 3 | 4 | 5 | 6 | 7 | 8 | 1 | 2 | 3 | 4 | 5 | 6 |
| 14 | 3 | 4 | 5 | 6 | 7 | 8 | 1 | 2 | 3 | 4 | 5 | 6 | 7 | 8 | 1 | 2 | 3 | 4 | 5 | 6 | 7 |
| 15 | 4 | 5 | 6 | 7 | 8 | 1 | 2 | 3 | 4 | 5 | 6 | 7 | 8 | 1 | 2 | 3 | 4 | 5 | 6 | 7 | 8 |
| 16 | 4 | 5 | 6 | 7 | 8 | 1 | 2 | 3 | 4 | 5 | 6 | 7 | 8 | 1 | 2 | 3 | 4 | 5 | 6 | 7 | 8 |

Fig.33

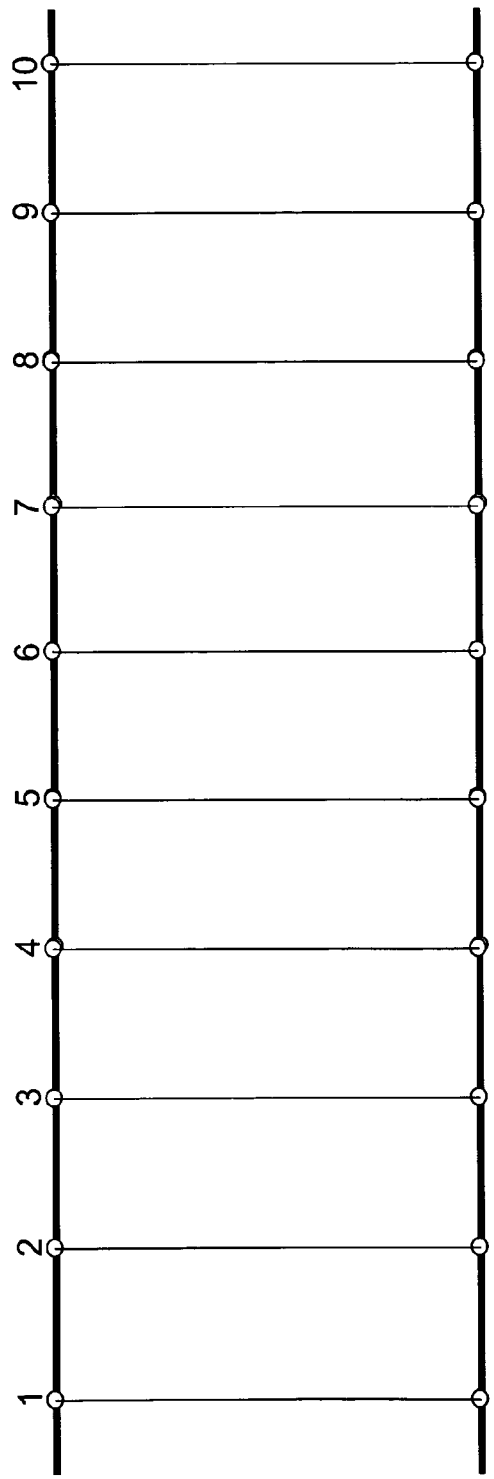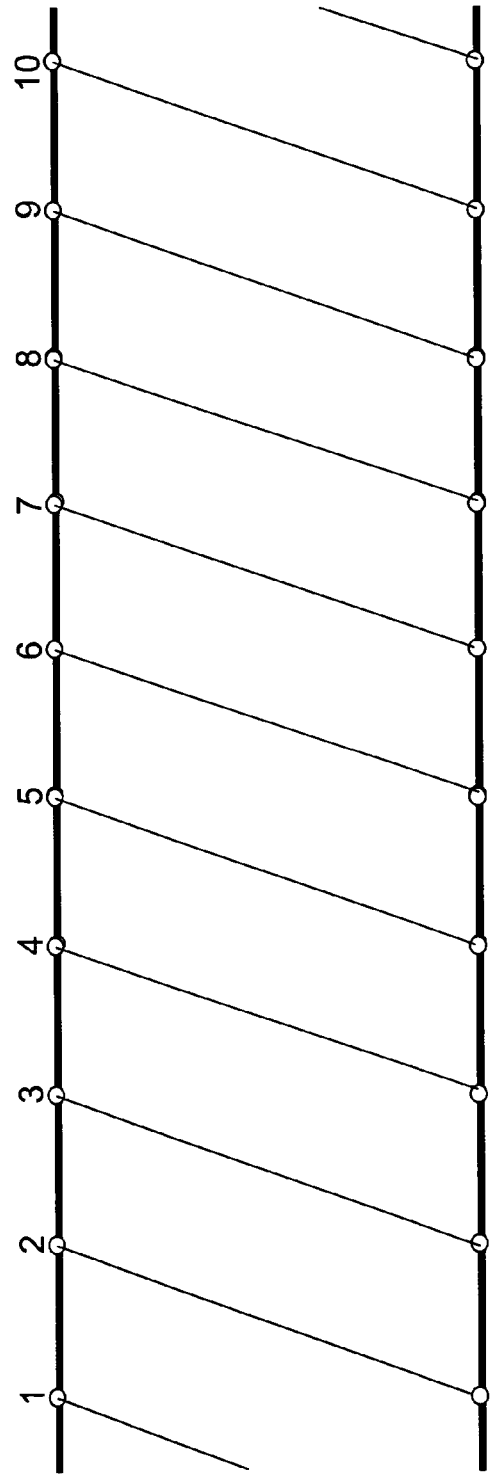

AUTOSTEREOSCOPIC PROJECTION SYSTEM

BACKGROUND

1. Field of the Invention

The invention relates to an autostereoscopic projection arrangement comprising at least one projector, a projection screen having a multitude of image rendering elements arranged in columns and rows, and at least one filter array having a multitude of filter elements arranged in columns and rows, in which the projector or the projectors project bits of partial information from views of a scene or object through one or several filter arrays onto the projection screen so as to make these bits of partial information visible on the image rendering elements.

2. Description of Prior Art

An arrangement of this type is described, e.g., in DE 206 474. This patent specification discloses a projection screen having a grid of lines each in front of and behind a ground glass screen (in viewing direction). The grids contain narrow, vertical lines which are alternatingly opaque and transparent, and through which is a stereopair of images is back-projected. The observer or observers looking through the grid in front see a spatial image, as either of the viewer's eyes is offered a different perspective. The drawback of this arrangement is that slight alignment errors of the line grids or the ground glass screen may cause irritating effects such as Moiré patterns.

U.S. Pat. No. 5,146,246 describes a two-view projection. In this arrangement, either of the observer's eyes is essentially offered only one view, i.e. either the right or the left one. Here again, a grid of lines each, i.e. a barrier screen, is arranged in front of and behind the projection screen (in viewing direction). This barrier screen is comprehensively disclosed as a pattern of opaque and transparent vertical stripes. A similar arrangement devised by the same inventor is described in U.S. Pat. No. 5,225,861. This is a back projection system, which projects a left-hand and a right-hand image each through a grid of opaque and transparent elements, in which, because of another grid of opaque and transparent elements, the observer's eyes are presented essentially disjoint views. This patent specification also describes vertical opaque and transparent stripes as grid elements.

For the two patent specifications mentioned last it is true again that the arrangements described require a large scope of alignment work. Moreover, the means of image separation described in addition are essentially suitable only for systems showing two views, so that the observer(s) of the stereoscopic image is/are hardly given any freedom of movement.

Patent application JP 9179090 describes a back projection system with a lenticular, in which at least two views of a scene are presented in a time-multiplex mode. Allocation of the back-projected views to the stripe segments on the projection screen, which correspond to the imaging directions of the lenticulars, is effected through controllable liquid crystal segments. These segments are switched to be either transparent or scattering, so that, depending on their respective states, a particular view is imaged by means of the lenticulars in always one or several defined directions. As a first disadvantage, this arrangement involves a large equipment outlay. In particular, it requires comprehensive control electronics. Moreover, despite the views presented in a time-multiplex mode at full resolution, the observer only sees one image per eye at a time, and at a reduced horizontal resolution. For flicker-free rendition, the arrangement further requires fast projection image display devices. The frame repetition rate of these image display devices must be the higher, the more views are to be presented, which adds to the cost of the arrangements.

U.S. Pat. No. 4,101,210 and U.S. Pat. No. 4,132,468 describe a stereo-projection for several views of a scene, in which, due to the imaging means provided on a screen (e.g., an emulsion), continuous, non-overlapping mosaic images with line structures are formed of several views. These mosaic images have virtually no gaps, i.e. their view portions are imaged quite next to each other. The said imaging means comprise, in particular, the use of lens arrays in combination with lenticulars.

DE 35 29 819 C2 describes a projection of several views through a lenticular. In this arrangement, projection of the strips of views to below each individual cylindrical lens is effected by the respective neighboring cylindrical lenses. The advantage of this is that the projector housings need not be particularly narrow in order to achieve the correct combination of views on the projection screen. The disadvantage is that, especially with large screen diameters, lenticulars of large size are needed.

DE 196 08 305 A1 discloses a back projection system in which two views are projected onto one screen through vertical barrier stripes. The mosaic image resulting from the two views is then made visible to the observer by a barrier screen in such a way that the observer's eyes see different views, which produces a 3D impression. The arrangement is characterized by a sliding mechanism, which shifts the barrier screen on the observer's side in accordance with the observer's eye position. One disadvantage of this arrangement is that only two views of a scene are used; another, that the control loop for ascertaining the eye position and accordingly shifting the barrier screen on the observer's side has a certain hysteresis, so that the observer sometimes sees a pseudoscopic image. In common embodiments, the arrangement is only suitable for a single observer.

DE 37 00 525 A1 describes a projection device with a lenticular. The projection area in this arrangement is curved. Among other disadvantages, the arrangement requires much space where large-size screens are used.

WO 98/43441 A1 describes a dynamic multiple-view projection system with shutters. The main disadvantage her is the extensive work involved in manufacturing the arrangement.

U.S. Pat. No. 2,313,947 discloses a multiple-view projection with two barrier screens comprising vertical barrier stripes. U.S. Pat. No. 2,307,276 also describes a multiple-view projection with barrier screens using vertical barrier stripes, in which, characteristically, a certain stripe width between the view stripes produced on the screen remains dark. This largely prevents pseudoscopic and double-image positions.

U.S. Pat. No. 4,872,750 describes a back-projection system with a barrier screen on the rear side, in which color images are produced by an overlap between separate RGB projections. The preferred means used here for spatial re-embodiment are lenticulars. The comprehensive equipment involved is a disadvantage.

Patent application DE 195 06 648 critically reviews, in the context of prior art in 3D imaging, the sudden change in perspective that occurs when the observer moves and that is due to the discrete number of views presented. The authors describe an autostereoscopic arrangement that avoids these disadvantages, and in which several views are presented in observable zones so that overlapping ranges are produced between the observation zones and so that the illumination intensity of the various observation zones is reduced at the margins. The optical imaging devices described include, among others, aperture diaphragms which, in transition regions, produce overlapping observation zones of two views each. The principle on which this patent application is based call for a considerable technical outlay if 3D images of larger size are required.

In DE 100 03 326 C2, the present applicant describes autostereoscopic methods and corresponding arrangements, in which the spatial impression for several observers without personal optical aids is produced by means of a wavelength filter array. The filter array, which is located in front of or behind an image display device, consists of a multitude of wavelength filters arranged in rows and columns, which are transparent to light of specified wavelengths or wavelength ranges and thus define discrete wavelength-dependent light propagation directions for the light emitted by the image display device. On the image display device, with its image rendering elements arranged in rows and columns, an image composed of several views of a scene or object is presented so that, due to the filter array, the observer's two eyes will see predominantly different selections of views. The disadvantage is that large-image projectors cannot readily be implemented in this way.

SUMMARY OF THE INVENTION

Description of the Invention

Proceeding from the prior art as described, it is the object of the invention to improve arrangements of the type described above in such a way that improved perception is achieved even with images of larger size. Preferably, this object should be accomplished by means of simple, or easily manufacturable, components. It is another object of the invention to provide a spatial impression to several observers at a time.

According to the invention, the object is accomplished by an autostereoscopic projection arrangement, comprising:
at least one projector and
at least one filter array having a multitude of filter elements arranged in columns and rows, in which
by means of the projector/the projectors, bits of partial information from views of a scene or object are projected onto a projection screen, where these bits of partial information are rendered on image rendering elements and, after passing one or several of the filter arrays, are made visible to at least one observer, and in which
the image rendering elements correspond with correlated filter elements, as regards the propagation direction of the bits of partial information, in such a way that an observer will see predominantly bits of partial information from a first selection of views with one eye and predominantly bits of partial information from a second selection of views with the other eye, so that the observer gets a spatial impression.

In a preferred embodiment of the invention, the autostereoscopic projection arrangement comprises at least two projectors, one projection screen, and at least two filter arrays ($F_1$, $F_2$, ... $F_A$, ...), with at least one filter array ($F_1$) being arranged between the projection screen and the at least two projectors, i.e. (in viewing direction) behind the projection screen, and at least one filter array ($F_2$) being arranged (in viewing direction) in front of the projection screen, and in which all filter arrays ($F_1$, $F_2$, ... $F_A$, ...) have wavelength filter elements arranged in columns and rows, which are transparent to light of different wavelengths ($\lambda$) or different wavelength regions ($\Delta\lambda$), and in which, by means of the projectors, bits of partial information from n views $A_k$ (with $k=1 \ldots n$; $n \geq 2$) of a scene or object are projected onto projection screen through at least one filter array ($F_1$) so that bits of partial information from the views ($A_k$) are made visible on the projection screen in a combination or mix determined by the geometry of the arrangement, and in which the projection screen is divided into a grid of image rendering elements ($\alpha_{ij}$) of sufficient resolution arranged in columns (i) and rows (j), which, depending on the configurations of the filter arrays ($F_1$, $F_2$, ... $F_A$, ...) and the projectors, deliver light of particular wavelengths ($\lambda$) or wavelength ranges, and in which each image rendering element ($\alpha_{ij}$) renders a bit, or bits, of partial information from at least one of the views $A_k$, and in which propagation directions are defined for the light radiated toward the observer by the projection screen through the at least one filter array ($F_2$), arranged (in viewing direction) in front of the projection screen, so that each single image rendering element ($\alpha_{ij}$) corresponds with several correlated wavelength filters of the filter array ($F_2$), or each single wavelength filter of the filter array ($F_2$) corresponds with several correlated image rendering elements ($\alpha_{ij}$) in such a way that the straight line connecting the centroid of the cross-section area of a visible portion of the image rendering element ($\alpha_{ij}$) with the centroid of the cross-section area of a visible portion of the wavelength filter corresponds to one propagation direction, so that, from every viewing position, an observer will see predominantly bits of partial information of a first selection of views ($A_k$) with one eye and predominantly bits of partial information of a second selection of views ($A_k$) with the other eye, resulting in a spatial impression for the observer from many viewing positions.

Preferably, a total number of 2, 4, 8, 16, 32 or 40 projectors can be used. Excellent spatial impressions, with good brightness and convenient freedom of movement for several observers are obtained with about 8 or more views presented, with preferably 8 or more projectors being used for projecting the views.

Preferably, the arrangement described above uses exactly two filter arrays, ($F_1$) and ($F_2$). Special configurations in which more than two filter arrays are of advantage are described below. The wavelength filter elements contained in the wavelength filter arrays may be transparent, e.g., for red, green, blue, yellow, cyan or magenta and/or transparent or opaque for the total visible wavelength range.

Further, the filter elements of the filter arrays ($F_1$, $F_2$, ... $F_A$, ...) have shapes of any, preferably polygonal, and particularly preferably rectangular outline. As a rule, a filter element has a surface area of approximately a few 10,000 $\mu m^2$ up to several $mm^2$. Deviations from that range are possible in particular cases. The shape and/or size of the filter element may vary within a filter array or even within a row or column of a filter array. The shape of the image rendering elements on the projection screen essentially depends on the filter arrays on the projector side, so that the said variations in the shape and/or size of the filter elements have an essential influence on the image rendering elements.

The image produced on the projection screen, which is composed of different bits of partial information from the views ($A_k$), shows a grid of image rendering elements ($\alpha_{ij}$) in columns (i) and rows (j), varying with the structure of the filter array(s) and the geometric arrangement of the projectors. This grid structure is not necessarily visible. The image rendering elements ($\alpha_{ij}$) may radiate light of quite different wavelength ranges, depending on the kind of light incident from the projector at the respective locations of the projection screen. Depending on the embodiment of the invention, there may be minor partial areas among the image rendering elements of the projection screen that remain without any partial information from any view ($A_k$) because, e.g., no light from any projector arrives at these partial areas. Such areas are not necessarily to be considered as image rendering elements ($\alpha_{ij}$) in the grid (i,j). Although such arrangements also lead to the desired result, they are not necessarily preferable.

It is also feasible that one image rendering element ($\alpha_{ij}$) renders fully colored bits of partial image information, which especially result from an optical mix of bits of partial information from different wavelengths/wavelength ranges. Moreover, also depending on the structure of the arrangement, such an image rendering element may simultaneously render bits of partial information from different image rendering element positions within a view or even from different views, if, for example, the light rays coming from two or several projectors superimpose on the projection screen.

It is of advantage if each of the filter arrays ($F_1, F_2, \ldots F_A, \ldots$) contains wavelength filter elements ($\beta_{Apq}$) in a separate matrix of rows ($q_A$) and columns ($p_A$) assigned to the respective filter array, these rows and columns being arranged on the filter array, depending on their transmission wavelength or their transmission wavelength range ($\lambda_{Ab}$), according to the following function:

$$b = p_A - d_{Apq} \cdot q_A - n_{Am} \cdot \text{IntegerPart}\left[\frac{p_A - d_{Apq} \cdot q_A - 1}{n_{Am}}\right],$$

A being the index of the respective array ($F_A$), ($p_A$) the index of one wavelength filter ($\beta_{Apq}$) in a row of the respective array ($F_A$), ($q_A$) the index of one wavelength filter ($\beta_{Apq}$) in a column of the respective array ($F_A$), (b) an integral number that specifies one of the intended transmission wavelengths/transmission wavelength ranges ($\lambda_{Ab}$) for a wavelength filter ($\beta_{Apq}$) of the filter array ($F_A$) in the position ($p_A,q_A$) and which may adopt values between 1 and $b_{Amax}$, ($n_{Am}$) an integral value greater than zero that preferably corresponds to the total number (n) of the views ($A_k$) projected by the projectors, ($d_{Apq}$) a selectable mask coefficient matrix for varying the arrangement of wavelength filters on the respective array ($F_A$), and IntegerPart a function for generating the greatest integer not exceeding the argument put in square brackets.

The entries in matrix ($d_{Apq}$) may be real numbers, with ($p_A$) in the above equation corresponding to index (p), and ($q_A$) to index (q) for the matrix ($d_{Apq}$) or for the filter elements ($\beta_{Apq}$).

It is also possible to specify, for different values of (b), transmission wavelengths/transmission wavelength ranges ($\lambda_{Ab}$) of identical contents: If, e.g., $b_{Amax}=8$, $\lambda_{A1}$ to $\lambda_{A3}$ may stand for R,G,B in this order, and $\lambda_{A4}$ to $\lambda_{A8}$ for wavelengths outside the visible light region, in which case $\lambda_{A1}$ to $\lambda_{A3}$ transmit the colors R,G,B, and $\lambda_{A4}$ to $\lambda_{A8}$ block the visible spectrum. The combination rule for a Filter ($F_A$) with the index (A) and for the parameters $d_{Apq}=-1=\text{const}$ and $n_{Am}=8$, then, supplies a filter structure that periodically generates oblique stripes in the RGB colors on an opaque background. Between every two of these colored stripes, five of the filter elements in every row remain opaque. The angle of inclination of the colored stripes depends on the dimensions of the filter elements ($\beta_{Apq}$) In preferable embodiments of the invention, $b_{Amax}$ and $n_{Am}$ are of equal size.

In another exemplary embodiment, again several of the transmission wavelengths/wavelength ranges $\lambda_{Ab}$ may have identical filter actions: If $\lambda_{A1} \ldots \lambda_{A6}$ are wavelength ranges blocking the entire visible spectrum, $\lambda_{A7}$ and $\lambda_{A8}$ filter ranges transparent to the visible spectrum, and if $n_{Am}=8$ and $d_{Apq}=-1=\text{const}$, there results, from the rule for generating a filter structure, an essentially opaque filter array ($F_A$), which contains oblique, stepped transparent stripes equally distributed over the area and occupying about one quarter of it.

It is further advantageous in that connection if at least two of the filter arrays ($F_1, F_2, \ldots F_A, \ldots$) cannot be made to be completely congruent by horizontal and/or vertical linear scaling of their structures. In other words, the structures of the respective filter arrays do not turn into each other by one- or two-dimensional magnification or demagnification. With regard to the spatial impression, this lack of congruence has the effect that the eye of an observer will, from actually every viewpoint, always see a mix of bits of partial information from several views ($A_k$). This completely excludes the case that an observer's eye in any position sees bits of partial information from exactly one of the views ($A_k$).

Moreover, such properties of the filter arrays have a special effect: Suitable geometric arrangements provided, the structure of a 2D view predominantly seen with one eye may change while the observer moves. It is feasible, e.g., that 90% of the image seen by an observer's eye in a particular position of the observation space consists of bits of partial information from view $A_1$ (k=1), whereas the residual 10% is a mix of bits of partial information from other views ($A_k$) with k>1, with the bits of partial information seen from view $A_1$ (k=1) having a resolution of, e.g., 600×400 pixels. Under the conditions mentioned above, the structure of this predominantly seen view $A_1$ (k=1) may change in another viewing position so as to have a visible resolution of, e.g., 400×600.

Sometimes the filter arrangement can be selected so that the visible resolution per view differs from that of a single projector.

For some applications it may further be of advantage if at least part of the filter elements of at least one of the filter arrays ($F_1, F_2, \ldots F_A, \ldots$) are configured as neutral filters for the wavelength-independent attenuation of the light intensity. For example, such filter elements may transmit 0% (opaque), 25%, 50%, 75% or 100% (fully transparent) of the visible light, irrespective of its wavelength. Such neutral filter elements or stepped neutral density filter elements may be easier and cheaper to make than colored wavelength filter array elements. Moreover, it is possible, by means of a filter array with neutral filter elements, to produce special effects, such as, for example, the variation of the perceived light intensity of or several views as the observer moves.

The filter arrays ($F_1, F_2, \ldots F_A, \ldots$) are arranged at a distance ($z_A$) (in viewing direction) before or behind the projection screen. ($z_A$) adopts values within a range of $-60 \text{ mm} \leq z_A \leq +60 \text{ mm}$, with a negative value of ($z_A$) means arrangement (in viewing direction) in front of the projection screen, and a positive value for ($z_A$) means arrangement (in viewing direction) behind the projection screen at the distance of the absolute value of ($z_A$). In exceptional cases, the absolute amount ($z_A$) may even have greater values than 60 mm, for example, if the diagonal of the projection screen is extremely large.

In another particular embodiment, part of the filter elements of at least one of the filter arrays ($F_1, F_2, \ldots F_A, \ldots$), preferably the one that is next to observer(s), is designed in such a way that the said filter elements transmit light of selected directions of incidence only. This can be ensured, e.g., by the use of certain crystals or a polymer coating.

Further it is feasible to design at least one filter element of at least one of the filter arrays ($F_1, F_2, \ldots F_A, \ldots$) as a lens, preferably a cylindrical lens, or as a prism; the cylindrical lenses or prisms may be arranged in columns only or rows only. In this way, a comparatively high light transmission is achieved. Such embodiments are of interest especially with regard to systems presenting significantly more than eight views.

Whereas in simple embodiments of the invention each projector projects bits of partial information of a single view ($A_k$) only, e.g. the respective 2D perspective view of the scene to be imaged, it may be of advantage for the purposes of the invention if at least one of the two or more projectors projects a combination image composed of bits of partial information of at least two views ($A_k$). As an extension of this feature, it is sometimes advantageous if (at least) two projectors each project a combination image composed of bits of partial information of at least two views ($A_k$), and if the views ($A_k$) for the said two projectors have different image combination structures.

Regarding the combination of bits of partial information of several views, reference is made to the applicant's patent specification DE 100 03 326 C2 quoted above, in which a rule for general image combination is given that is similar in kind to the rule used herein for structuring the filter arrays.

In some embodiments of the invention, e.g. if at least one of the projectors is directed at the projection screen under a certain angle, the bits of partial information of the views can be projected using a suitable image pre-rectification function, e.g. a trapezoidal correction. In this connection, modern projectors already offer continuous Scheimpflug and/or Seagull correction functions which apply geometrical corrections to the projected image. If transparencies are used as projection data, these can also be made with a corresponding precorrection.

The arrangement according to the invention is particularly efficient with regard to light and area utilization if the structure of the filter array(s) and its/their alignment between the projectors and the projection screen are selected in such a way that each area element on projection screen can receive light from at least one of the projectors. In that way, no "permanently black areas" will result on the screen, so that each area element of the projection screen presents a bit of partial information of at least one view ($A_k$). As mentioned above, however, this advantageous embodiment is mandatory condition for maintaining the mode of operation of the arrangements according to the invention.

The projection screen is preferably translucent. In addition it may have a light-concentrating effect, i.e. have a positive gain. Translucent and light-concentrating projection screens are well known and need not be explained to those skilled in the art. Excellent definition of the image rendering elements on the projection screen is achieved if the projection screen is designed as a very thin wafer, preferably with a thickness of less than one millimeter.

In many embodiments of the invention, the projection screen will be a flat wafer. Under special conditions, though, it may be advantageous for the projection screen to be curved. In that case it is recommendable that the filter arrays are provided with a corresponding curvature.

For every projector, in general, a separate projection position and a separate projection direction relative to the projection screen are specified; preferably, the projection directions and projection distances differ from projector to projector. In conjunction with a curved projection screen, the result is, e.g., that the light from the various projectors strikes the projection screen essentially under the same angle of incidence. Herein, the term "angle of incidence" describes the angle under which the principal direction of light propagation of a projected image is incident to the projection screen.

If all projector lenses are positioned at the same height behind the projection screen, this height should preferably be approximately that of the center point of the projection screen surface. To ensure this positioning, one can use, e.g., a suitably dimensioned mechanical stand.

The brightness of one or several projectors may sometimes be variable within specified limits. This property, which is a feature of some modern projectors, can be used here to ensure uniform illumination of the projection screen. If, e.g., one of the views of a scene should be somewhat brighter than the others because of the taking conditions, brightness control of the respective projector provides sufficient compensation.

Eligible projectors are, e.g., liquid crystal projectors, DLP/DMD projectors, CRT projectors or slide projectors. Also feasible is laser projection with, e.g., three lasers as separate RGB image display devices. Of course, more than three lasers may be used as well. The above enumeration of eligible projector types is open to additions and is not meant to exclude arrangements according to the invention using other projector types. Besides, arrangements according to the invention may incorporate projectors of different types simultaneously. The projectors may differ with regard to their light modulation principle and/or individual parameters, such as, e.g., light flux or image resolution.

As a rule, the projectors are furnished with image data by an electronic control system, which may comprise one or several separate units. In this connection it is also feasible to use an image data source consisting of one video recorder per projector. Each video recorder feeds the image sequence of one view ($A_k$) to the correlated projector. The video recorders are coupled to each other via a trigger, so that all n views ($A_k$) can be displayed in synchronism.

It is further feasible to control each projector via a separate computer, with all computers being synchronized, e.g., by networking. The use of computers permits, in particular, an embodiment in which at least one projector projects bits of partial information from at least two different views ($A_k$). With regard to the possible combination of bits of partial information from at least two different views ($A_k$), reference is made again to the patent specification DE 100 03 326 C2. Further, commercial image signal-splitting computers can be used for triggering several projectors simultaneously.

For image contrast enhancement, the filter array arranged most closely to the observer may be provided with an antireflective coating. This avoids reflections of extraneous light and further improves the perception of the spatial image.

Each of the filter arrays ($F_1, F_2, \ldots F_4, \ldots$) is designed, e.g., as an exposed film, a printed image or an optical grating. Other ways of preparation are also feasible. Preferably, at least one of the filter arrays ($F_1, F_2, \ldots F_4, \ldots$) is laminated to a substrate, e.g., of glass. This will provide good mechanical fixation. In another embodiment, at least one of the filter arrays ($F_1, F_2, \ldots F_4, \ldots$) is arranged within a sandwich structure consisting of several substrates, with the substrates optionally having certain optical properties, such as specified refractive indices. The sandwich structure also provides good mechanical fixation, together with a long service life of the filter arrays.

In a very special embodiment of the invention, parts of at least one filter array are provided with a reflecting surface, which is arranged on the side(s) of the filter array(s) facing the projectors, and preferably only on the non-transparent filter elements, so that part of the light projected is reflected back into the projectors. If the respective projector is capable of re-using such light ("transflective projection"), a higher degree of light utilization can be achieved.

In further embodiments of the invention, at least some of the filter elements of at least one of the filter arrays ($F_1$, $F_2$, ... $F_4$, ...) are polarizing filters, and at least one of the projectors radiates polarized light. The polarizing filters may, e.g., be transparent for horizontally or vertically linearly polarized light and at the same time, optionally, be transparent only to light of particular wavelengths/wavelength ranges. It is also feasible in that connection to have a combination of wavelength-independent neutral filters and polarizing filter properties. The polarization-dependent transmission filters will pass the light of those projectors only that have matching polarizing properties.

In another embodiment, at least one projector that radiates polarized light emits the light in temporally alternating polarization forms, preferably alternating between horizontally linear and vertically linear polarization. This results in a temporal change of the structure of the combination image formed on the projection screen.

Further, at least part of the filter elements of at least one of the filter arrays ($F_1$, $F_2$, ... $F_4$, ...) may generally be configured as photochromic or electrochromic optical elements. In this way, a switching between 2D and 3D projection can be effected, if the photochromic or electrochromic elements permit, in a first state, the specified wavelength/wavelength range transmission so as to create a spatial impression ("3D mode"), whereas they are, in a second state, largely transparent for practically the entire visible wavelength spectrum. In the latter state, projection onto the projection screen is almost uninfluenced by the said filter elements. If all filter elements of all existing filter arrays are brought into that state, it is possible for the observer(s) to have a practically fully resolved 2D perception. Whereas in the 3D mode the projectors project at least bits of partial information of two views, the 2D mode projects exactly one view. In the simplest case, only one projector projects one view in the common way, possibly also with image rectifying correction. To improve brightness in the 2D mode, several projectors may project on and the same image onto the screen. In this case care should be taken to ensure that the projectors project the images in such a way that all identical views are superimposed on the screen in perfect registration.

It is just as well possible to use optical elements other than photochromic or electrochromic ones. For switching between a 2D and a 3D mode in an embodiment of the invention, it is decisive and essential that the optical elements, in a first state, transmit defined wavelengths/wavelength ranges n or have defined transmittances for the wavelength-independent attenuation of the light intensity, whereas, in a second state, they have the highest possible transmittance to essentially the full visible wavelength spectrum.

In a particularly simple case which does not require any electrochromic filter array elements, the filter arrays are simply designed to be removable from the arrangement according to the invention, to achieve a 2D projection.

In another embodiment of the arrangements according to the invention, at least one of the projectors is provided with a color filter, so that the light projected by the said projector can only penetrate wavelength filters of the respective transmission wavelength or the respective transmission wavelength range. In this way it is possible to achieve particular combination structures of the bits of partial information on the projection screen. For special applications it will then also be possible for a moving observer to perceive a color change of the views seen.

Instead of providing one or several projectors with color filters it is also possible to use, e.g., DMD projectors, which alternatingly project the red, green and blue partial images of a full-color image. As this alternation is functionally inherent in such a projector, no color filter is required.

Moreover, in other special embodiments of the invention, the projectors may be arranged in at least two—essentially horizontal—tiers. This has two advantages: On is that the structure of the combination image formed on the projection screen can be influenced. The other is that, if two projectors whose lenses are arranged essentially one above the other project the same image, the brightness of certain views, or parts of views, in the combination image formed on the projection screen, can be increased. It is also feasible to provide for a spatial offset between the two tiers, e.g., in order to horizontally arrange the projection lenses approximately at an observer's interpupillary distance although the projector housings are distinctly broader than the distance between a pair of human eyes.

For easy handling, the arrangement may optionally have means for automatically aligning the projectors, e.g., via electromechanical control elements. The projectors will then be brought to a specified position after or during the process of switching on.

Synchronization of the projectors may just as well be effected manually as required. Preferably, this can be done by means of projected test images featuring reference marks that can be aligned with each other.

Further, the beam path of the light projected by at least one projector may be folded by the provision of at least one mirror. Such folding is common in prior art especially for the purpose of saving space in optical assemblies. In the present case, such folding has an additional favorable effect: The folded beam path strikes the projection screen at an angle that is not perpendicular relative to the main propagation direction of the light. If the projection screen is designed as a holographic disk that, in transmitting, concentrates especially light that is not incident perpendicularly (such as, e.g., the product "HOPS" of Sax3D GmbH, Chemnitz/Germany), a brilliant and high-contrast 3D image is achieved even with ambient daylight.

As mentioned at the beginning, more than two filter arrays ($F_1$, $F_2$, ... $F_4$, ...) may be used. It is of advantage then to use three filter arrays, two of which are preferably arranged between the projection screen and the projectors, and one between the projection screen and the observers. In this case, the light projected by the projectors passes two filter arrays so that it gets particularly well structured before it strikes the projection screen. In other embodiment versions, more than three filter arrays may be used.

The object of the invention is also accomplished with the following embodiment version of an autostereoscopic projection arrangement, in this case by a 3D front projection arrangement. This comprises at least two projectors, one projection screen suitable for front projection, one filter array arranged between the projection screen and the at least two projectors, in which the filter array has wavelength filter elements arranged in columns and rows, which are transparent to light of different wavelengths ($\lambda$) or different wavelength regions ($\Delta\lambda$) and which absorb at least some, but preferably a high proportion, of the non-transmitted light, and in which the projectors project bits of partial information of n views ($A_k$ with k=1 ... n; n≧2) of a the scene or object through the filter array onto the projection screen, so that the projection screen displays bits of partial information of the views ($A_k$) in a combination or mix defined by the geometry of the arrangement, with the projection screen being divided into a grid of image rendering elements ($\alpha_{ij}$) of sufficient resolution arranged in columns (i) and rows (j), which, depending on the embodiment of the filter array and the projectors, deliver light of particular wavelengths ($\lambda$) or wavelength ranges, and with each image rendering element ($\alpha_{ij}$) rendering bit(s) of partial information of at least one of the views ($A_k$), and in which the filter array defines propagation directions for the light delivered by the projection screen towards the observer on the projector side, with every one image rendering element ($\alpha_{ij}$) corresponding to several wavelength filters correlated to it, and each wavelength filter of the filter array corresponding to several image rendering elements ($\alpha_{ij}$) correlated to it, in such a way that the straight line connecting the centroid of the cross-section area of a visible segment of the image rendering element ($\alpha_{ij}$) and the centroid of the cross-section area of a visible segment of the wavelength filter corresponds to one propagation direction, so that, from every viewing position, an observer will see predominantly bits of partial information of a first selection of views ($A_k$) with one eye and predominantly bits of partial information of a second selection of views ($A_k$) with the other eye and thus will have a spatial impression from a great number of viewing positions.

In such a 3D front projection, the observer(s) is/are on the projector side, but should, as a rule, be positioned where they do not obstruct any of the projection beam paths.

In this embodiment, too, the wavelength filter elements contained in the wavelength filter arrays may be transparent to, e.g., red, green, blue, yellow, cyan or magenta, and/or transparent or opaque to the total visible wavelength range.

The image formed on the projection screen as a combination of different bits of partial information of the views ($A_k$) has a grid of image rendering elements ($\alpha_{ij}$) in columns (i) and rows (j) that varies with the structure of the filter array and the geometric arrangement of the projectors. This grid is not necessarily visible. The image rendering elements ($\alpha_{ij}$) may deliver light of different wavelength ranges, depending on the light arriving from the projectors in the respective positions of the projection screen. It is also feasible that an image rendering element renders a full-color bit of partial information, which especially originates from an optical mix of bits of partial information from different wavelengths/wavelength ranges. Moreover, also depending on the structure of the arrangement, such an image rendering element may render bits of partial information from different image rendering element positions within a view ($A_k$) or even from different views ($A_k$).

Further, it is of advantage if the filter array contains wavelength filter elements ($\beta_{pq}$) in a grid of rows (q) and columns (p), which, depending on their transmission wavelength/transmission wavelength range ($\lambda_b$), are arranged on the filter array according to the following function:

$$b = p - d_{pq} \cdot q - n_m \cdot IntegerPart\left[\frac{p - d_{pq} \cdot q - 1}{n_m}\right],$$

(p) is the index of one wavelength filter s ($\beta_{pq}$) in a row of the array, (q) is the index of one wavelength filter ($\beta_{pq}$) in a column of the array, (b) is an integral number that specifies one of the intended transmission wavelengths/transmission wavelength ranges ($\lambda_b$) for a wavelength filter ($\beta_{pq}$) of the filter array in the position (p,q) and which may adopt values between 1 and $b_{max}$, ($n_m$) is an integral value greater than zero that preferably corresponds to the total number n of the views ($A_k$) projected by the projectors, ($d_{pq}$) is a selectable mask coefficient matrix for varying the arrangement of the wavelength filters on the array, and IntegerPart is a function for generating the largest integral number that does not exceed the argument put in square brackets.

The filter elements of the filter array have any, preferably polygonal, more preferably rectangular, outlines. In special embodiments also of this front projection version, several filter arrays ($F_A$) can be used between den projectors and the projection screen; the following description assumes only one filter array, though.

For some applications it may be of advantage if at least part of the filter elements are designed as neutral density filters for the wavelength-independent attenuation of the light intensity. Such neutral density filter elements or stepped neutral density filter elements can sometimes be fabricated more economically than wavelength filter array elements. In addition it is possible, by means of a filter array with neutral density filter elements, to produce special effects, such as the variation of the light intensity of one or several views perceived by a moving observer.

The filter array is arranged at a distance (z) (in viewing direction) in front of the projection screen, i.e. on the observer and projector sides, with (z) having an order of magnitude of 0 mm$\leq$z$\leq$60 mm. In exceptional cases, (z) may even be bigger, e.g., if the diagonal of the projection screen is extremely long.

In this embodiment, the projection screen will be a flat plate, as a rule. It is feasible, though, to have a projection screen that is not a plane but has a spatial structure; for example, a cylindrical-periodical, reflecting surface is of advantage in conjunction with front projection, because the very structure of the projection screen will produce a certain pattern of directions of the reflected light.

In another special embodiment, part of the filter elements are designed to transmit light of selected directions of incidence only. This can be effected, e.g., by the use of certain crystals or a polymer coating. Furthermore it is feasible to design at least one filter element as a lens, preferably a cylindrical lens, or as a prism, such cylindrical lenses or prisms being possibly arranged in columns only or rows only. In this way, a comparatively high light transmission is achieved. Such embodiments are of special interest in conjunction with systems displaying significantly more than eight views.

The object of the invention is also accomplished with an autostereoscopic projection arrangement comprising:

a projector, a projection screen suitable for front projection, a filter array arranged between the projection screen and the projector, in which the filter array has wavelength filter elements arranged in columns and rows, which are transparent to light of different wavelengths ($\lambda$) or different wavelength regions ($\Delta\lambda$) and which absorb at least some, but preferably a high proportion, of the non-transmitted light, and in which the projector projects bits of partial information of n views ($A_k$ with k=1 ... n; n$\geq$2) of a the scene or object through the filter array onto the projection screen, so that the projection screen displays bits of partial information of the views ($A_k$) in a combination or mix defined by the geometry of the arrangement, with the projection screen being divided into a grid of image rendering elements ($\alpha_{ij}$) of sufficient resolution arranged in columns (i) and rows (j), which, depending on the embodiment of the filter array and the projector, deliver light of particular wavelengths ($\lambda$) or wavelength ranges, and with each image rendering element ($\alpha_{ij}$) rendering bit(s) of partial information of at least one of the views ($A_k$), and in which the filter array defines propagation directions for the light delivered by the projection screen towards the observer on the projector side, with every one image rendering element ($\alpha_{ij}$) corresponding to several wavelength filters correlated to it, and each wavelength filter of the filter array corresponding to several image rendering elements ($\alpha_{ij}$) correlated to it, in such a way that the straight line connecting the centroid of the cross-section area of a visible segment of the image rendering element ($\alpha_{ij}$) and the centroid of the cross-section area of a visible segment of the wavelength filter corresponds to one propagation direction, so that, from every viewing position, an observer will see predominantly bits of partial information of a first selection of views ($A_k$) with one eye and predominantly bits of partial information of a second selection of views ($A_k$) with the other eye and thus will have a spatial impression from a great number of viewing positions.

The object of the invention is also accomplished with the following autostereoscopic projection arrangement, comprising:

a projector,
a translucent projection screen,
at least two filter arrays ($F_1, F_2, \ldots F_A, \ldots$), with at least one filter array ($F_1$) being arranged between the projection screen and the projector, i.e. (in viewing direction) behind the projection screen, and at least one filter array ($F_2$) being arranged (in viewing direction) in front of the projection screen, in which all filter arrays ($F_1, F_2, \ldots F_A, \ldots$) have wavelength filter elements arranged in columns and rows, which are transparent to light of different wavelengths ($\lambda$) or different wavelength regions ($\Delta\lambda$), and in which the projector projects bits of partial information of n views ($A_k$ with k=1 . . . n; n$\geq$2) of a scene or object through at least one filter array ($F_1$) onto the projection screen, so that the projection screen displays bits of partial information of the views ($A_k$) in a combination or mix defined by the geometry of the arrangement, with the projection screen being divided into a grid of image rendering elements ($\alpha_{ij}$) of sufficient resolution arranged in columns (i) and rows (j), which, depending on the embodiment of the filter arrays ($F_1, F_2, \ldots F_A, \ldots$) and the projector, deliver light of particular wavelengths ($\lambda$) or wavelength ranges, and with each image rendering element ($\alpha_{ij}$) rendering bit(s) of partial information of at least one of the views ($A_k$), and in which the at least one filter array ($F_2$), arranged (in viewing direction) in front of the projection screen, defines propagation directions for the light delivered by the projection screen towards the observer, with every one image rendering element ($\alpha_{ij}$) corresponding to several wavelength filters of the filter array ($F_2$), and each wavelength filter of the filter array ($F_2$) corresponding to several image rendering elements ($\alpha_{ij}$) correlated to it, in such a way that the straight line connecting the centroid of the cross-section area of a visible segment of the image rendering element ($\alpha_{ij}$) and the centroid of the cross-section area of a visible segment of the wavelength filter corresponds to one propagation direction, so that, from every viewing position, an observer will see predominantly bits of partial information of a first selection of views ($A_k$) with one eye and predominantly bits of partial information of a second selection of views ($A_k$) with the other eye and thus will have a spatial impression from a great number of viewing positions.

In the two embodiment versions of the autostereoscopic projection arrangements described above, which have only one projector, the projector delivers, preferably in temporal succession, light of different wavelengths or wavelength ranges. Moreover, the bits of partial information of each of the n views $A_k$ (with k=1 . . . n) are projected in pairs of different wavelengths or wavelength ranges.

This approach can be implemented, e.g., by displaying bits of partial information of n=3 views $A_k$ with a DMD/DLP projector so as to display view $A_1$ (k=1) exclusively in red, view $A_2$ (k=2) exclusively in green, and view $A_3$ (k=3) exclusively in blue. The color assignments can, of course, be permutated and are not restricted to the assignment given here. As a result, views of different color are made visible to the observer(s).

The object of the invention is also accomplished with an autostereoscopic projection arrangement, comprising:

a translucent projection screen,
a projector arranged (in viewing direction) behind the projection screen,
at least one filter array, arranged (in viewing direction) in front of the projection screen, in which the filter array has wavelength filter elements arranged in columns and rows, which are transparent to light of different wavelengths ($\lambda$) or different wavelength regions ($\Delta\lambda$), the projector projects bits of partial information of n views ($A_k$ with k=1 . . . n; n$\geq$2) of a scene or object in a defined combination of the bits of partial information onto the projection screen directly, so that the projection screen displays bits of partial information of the views ($A_k$), with the projection screen being divided into a grid of image rendering elements ($\alpha_{ij}$) of sufficient resolution arranged in columns (i) and rows (j), which, depending on the embodiment of the projector, deliver light of particular wavelengths ($\lambda$) or wavelength ranges, and with each image rendering element ($\alpha_{ij}$) rendering bit(s) of partial information of at least one of the views ($A_k$), and in which the at least one filter array defines propagation directions for the light delivered by the projection screen towards the observer, with every one image rendering element ($\alpha_{ij}$) corresponding to several wavelength filters of the filter array, and each wavelength filter of the filter array corresponding to several image rendering elements ($\alpha_{ij}$) correlated to it, in such a way that the straight line connecting the centroid of the cross-section area of a visible segment of the image rendering element ($\alpha_{ij}$) and the centroid of the cross-section area of a visible segment of the wavelength filter corresponds to one propagation direction, so that, from every viewing position, an observer will see predominantly bits of partial information of a first selection of views ($A_k$) with one eye and predominantly bits of partial information of a second selection of views ($A_k$) with the other eye and thus will have a spatial impression from a great number of viewing positions.

The combination of the bits of partial information of the views ($A_k$), which the projector projects onto the projection screen, is preferably effected in the way described in DE 10003326 C2, which also gives exemplary image combination rules and describes suitable filter arrays that can be employed, for example, in connection with the last of the embodiments of the invention described above. Apart from that, what has been said for the embodiments of the invention described earlier herein with regard to the configuration of the filter elements and the geometry of the arrangement applies also to the embodiment described last.

To compensate imaging aberrations of the projector lens in the embodiment described last, it may be particularly advantageous if the form of the filter elements is varied at least in part.

All arrangements described so far may also be assembled in a modular embodiment so as to achieve particularly long image diagonals. Moreover it is feasible, for special purposes, to provide a lens, preferably a Fresnel lens, in front of the arrangements according to the invention, so that the observer(s) can see a real or virtual image of the autostereoscopic projection device.

With all embodiments described, the object of the invention can be accomplished superbly: The autostereoscopic projection devices as disclosed by the invention provide improved perception even of images of larger dimensions, and they are made from simple or easily manufactured units or subassemblies. Depending on the geometry of the arrangement, a spatial impression is provided several observers.

The advancement of the invention described below provides improved perception of images of yet larger dimensions.

In that respect, the invention provides for a method for autostereoscopic projection in which at least one projector projects bits of partial image information of at least two views $A_k$ (k=1 . . . n, n≧2) of a scene or object onto the rear side of a holographic screen, in which the holographic screen has a multitude of holographic optical elements (HOE) arranged in a grid of columns and/or rows, and each HOE displays the light incident from the at least one projector by means of at least one of the following types, or combination of types, of optical imaging:
 a) Imaging by means of a lens, preferably a cylindrical lens arranged vertically or obliquely to the vertical,
 b) Diffusely transparent or translucent imaging, with subsequent imaging by means of a lens, preferably a cylindrical lens arranged vertically or obliquely to the vertical,
 c) Imaging by means of a prism,
 d) Diffusely transparent or translucent imaging, with subsequent imaging by means of a prism,
 e) Imaging through a polygonal polarizing filter and/or stepped neutral density filter and/or wavelength filter, with a wavelength filter transmitting light of a specified wavelength or of one or several specified wavelength ranges,
 f) Imaging according to e) plus diffusely transparent or translucent imaging,
 g) Imaging according to f) and subsequently according to e),
 h) Imaging by means of an optical flat,
 i) Imaging by diffraction, so that the imaging actions of the multitude of HOEs define a multitude of propagation directions for the light cast toward the observer by the front side of the holographic screen, with each HOE defining one or several light propagation directions for the light incident on it, which corresponds to bits of partial image information of at least one of at least two views projected, so that, from every viewing position, an observer will see predominantly bits of partial information of a first selection of views ($A_k$) with one eye and predominantly bits of partial information of a second selection with the other eye and thus will have a spatial impression from a great number of viewing positions.

"Predominantly" in this context means, e.g., that about 90% of the bits of partial information seen by the left eye of an observer originates from a first, and about 10% from a second view of a scene or object, so that in this case the first view is predominant. Simultaneously, about 80% of the bits of partial information seen by the observer's right eye may originate from the second view while about 20% may be a mix of a third and a fourth view, without any detriment to the spatial impression.

In the context of the invention, "holographic optical elements (HOEs)" means individual surface segments of the holographic screen.

The method according to the invention is characterized by the fundamental relationship that the light propagation direction defined by each HOE for every light ray incident on it is a one-to-one function of the ray's direction of incidence. The term "light propagation directions" also includes the (possibly many) light exit directions that represent the highest intensity of the light projected within a certain solid angle.

Under certain circumstances, types of imaging other than those given under a) through h) above may also be feasible for display by the HOEs.

It may be advantageous that all HOEs implement the same type, or combination of types, of imaging out of a) through h). For certain applications, however, it may be preferable that at least two of the HOEs implement a pair of different types, or combination of types, of imaging out of a) through h).

Furthermore, the method according to the invention may provide that at least one HOE implements at least two of the types, or combination of types, of imaging out of a) through h); in particular, for example, one HOE may simultaneously implement many (different) images according to e) by implementing a whole array of several filter elements.

Furthermore, an HOE can be designed in such a way that it implements different imaging types for light incident from two different directions. By means of such a design it would be possible, e.g., that a scattering surface belonging to the imaging features of an HOE receives light quantities from different projectors, which are imaged by one and the same HOE in different ways, especially in different directions.

Diffusely imaging features of the HOEs, if provided, may widely differ in embodiment. Preferably, diffuse scattering within the optical imaging is implemented in such a way that the light is scattered essentially along the vertical, or along a direction that is inclined relative to the vertical. Diffuse scattering by the HOEs may also be accomplished through diffraction.

The order of magnitude of the HOEs or the optical components represented by them such as prisms, lenses or filters approximately corresponds to the order of magnitude of the pixels of the images seen on the holographic screen. The respective height of an HOE corresponds to the size of a pixel or subpixel, whereas the width of an HOE may vary between approximately the width of one pixel of a view and approximately the width of one cycle of pixels of several views. Deviations from these sizes are possible, of course; in particular, light of a pixel projected by the projector or one of the projectors may simultaneously be incident on several HOEs.

In another embodiment, at least two of the HOEs on the holographic screen deviate from one another in their outer dimensions and/or their outer shape. This design contributes to the circumstance that an observer's eye will, from many viewing positions, predominantly but not exactly see bits of partial image information of a selection of views. This also helped if the relative positions of the area centroids of at least two of the HOEs on the holographic screen deviate from each other by an offset equal to a non-integral multiple of the width and/or height of one of the said HOEs. If then, for example, all HOEs had the same dimensions, this property would correspond to the relative partial offset between them, e.g., by one third or one quarter of the (in this case, common) HOE width and/or height.

In another advantageous embodiment, at least one of the HOEs displays light of different wavelength ranges in pairs of disjoint directions. Thus it is possible, especially in case of projection devices with full-color pixels (e.g. DMD or color slide), to apparently increase the perceived resolution of the 3D image, e.g., by a factor of 3 for the horizontal screen direction.

Further, the grid in which the HOEs are arranged on the holographic screen is preferably an orthogonal grid. It is also possible, though, that the said grid in which the HOEs are arranged on the holographic screen is a non-orthogonal one, preferably one in which the row direction intersects the column direction at an angle unequal to 90 degrees. In this connection, columns or rows may also be of a wavy shape. The latter properties can be used to advantage especially if imaging aberrations of the projection lenses are to be compensated by means of a correspondingly pre-distorted arrangement of the HOEs on the holographic screen.

Furthermore, the method according to the invention may also be characterized in that at least one HOE defines, for the light from at least one direction of incidence, at least two light propagation directions simultaneously. This can have the favorable effect that there results, along a certain line in the viewing space (e.g., a line parallel to the holographic screen), a repetitive cycle of views, e.g., a cycle repeated several times in which the observer will, in succession along the said line, predominantly see bits of partial image information of view 1, followed by views 2, 3 etc., up to view 8, upon which the cycle starts again with bits of partial image information of view 1.

Furthermore, the action of the HOEs also defines how often the cycles of views (e.g., from view 1 through view 8) are essentially perceived by a defined observer eye moving along a line as described above. Depending on the application, the cycle may be repeated once, twice or more often along a line that is, e.g., parallel to the holographic screen.

Besides, the method can be implemented in such a way that at least two projectors are provided, with each projector projecting either bits of partial image information of only one view of a scene or object, or simultaneously bits of partial image information of at least two views of a scene or object. Of course, this applies also to more than two projectors. The decisive point is that bits of partial image information of at least two views are projected.

To avoid pseudoscopic effects, the method according to the invention may further provide, for an observer's eye in the viewing space, at least one viewing position in which the holographic screen essentially displays none of the light projected by the projectors. This is easily possible in that the types of imaging, or their combinations, implemented by the HOEs are so designed that a certain zone of the viewing space is essentially kept free of light. Avoiding pseudoscopy is possible here especially if such a dark zone is located between the end and the start of a cycle of (e.g., eight) views.

Further, the holographic screen can be so designed with regard to its action that the respective projectors are spaced at a distance from each other that is greater than their spatial dimensions. This makes the effort involved in a both vertical and lateral arrangement of the projectors for adjusting the projection lenses at an observer's interpupillary distance obsolete. The desired effect is accomplished by appropriately defined imaging types or light propagation directions.

In addition, the projection may also be performed in a time sequence. For this purpose, at least one, but preferably each projector projects bits of partial image information of at least one view of the scene or object at particular times only, preferably at a specified frequency between 10 Hz and 60 Hz. This can be done in several versions: Firstly, a projector may, at a first point of time, project only one view. This is followed by a second view projected onto the holographic screen by a second projector from a different direction, etc. The last projector is, in turn, followed by the first one, etc.

Further, the combination structure for combining the bits of partial image information of different views on at least one of the projectors may vary in time. Of course, the respective projector simultaneously projects bits of image formation of at least two views. In addition, the number of views from which the respective bit of partial information projected by a projector originates may also vary in time. Further sequential embodiments of the method according to the invention can be derived.

The sequential illumination is especially used for an improvement in separation of the light projected, i.e. of the projected bits of partial image information of several views with regard to different light exit directions. With the projections by different projectors from different directions being sequenced in time, it is possible, e.g., to partially compensate imperfections of the HOEs.

In another special embodiment, at least two projectors are provided, and the light from at least one projector is displayed in such a way that it can be perceived from the front side within a solid angle of at least $0.3\ \pi*sr$, so that the light from the said projector is seen by the observer as an essentially two-dimensional image, because both eyes of the observer are located within the said solid angle and thus are offered essentially non-disparate image information. Here again it is feasible, e.g., that the projector, the light of which is seen as a two-dimensional image, is switched on only temporarily, i.e. exactly at the point in time at which a 2d display is desired. In some cases, the solid angle may be smaller than $0.3\ \pi*sr$ while the display may still be two-dimensional.

Each projector used comprises, e.g., either at least one DMD chip, one LCD component, one CRT or one laser. Of course, other projector types are feasible as well.

The object of the invention is also accomplished with an autostereoscopic projection arrangement, comprising
  at least one projector for the backprojection of bits of partial image information from at least two views Ak ($k=1\ldots n$, $n\geq 2$) of a scene or object onto a holographic screen, in which
  the holographic screen has a multitude of holographic optical elements (HOEs) arranged in a grid of columns and/or rows, and in which
  each HOE displays the light incident from at least one projector by means of at least one of the following optical imaging types or combinations of imaging types:
  a) Imaging by means of a lens, preferably a cylindrical lens arranged vertically or obliquely to the vertical,
  b) Diffusely transparent or translucent imaging, with subsequent imaging by means of a lens, preferably a cylindrical lens arranged vertically or obliquely to the vertical,
  c) Imaging by means of a prism, d) Diffusely transparent or translucent imaging, with subsequent imaging by means of a prism,
e) Imaging through a polygonal polarizing filter and/or stepped neutral density filter and/or wavelength filter, with a wavelength filter transmitting light of a specified wavelength or one or several specified wavelength ranges,
f) Imaging according to e) plus diffusely transparent or translucent imaging,
g) Imaging according to f) and subsequently according to e),
h) Imaging by means of an optical flat,
i) Imaging by diffraction, so that the imaging actions of the multitude of HOEs define a multitude of propagation directions for the light cast toward the observer by the front side of the holographic screen, with each HOE defining one or several light propagation directions for the light incident on it, which corresponds to bits of partial image information of at least one of at least two views projected, so that, from every viewing position, an observer will see predominantly bits of partial information of a first selection of views ($A_k$) with one eye and predominantly bits of partial information of a second selection with the other eye, and thus will have a spatial impression from a great number of viewing positions.

"Predominantly" in this context means, e.g., that about 90% of the bits of partial information seen by the left eye of an observer originates from a first, and about 10% from a second view of a scene or object, so that in this case the first view is predominant. Simultaneously, e.g., about 80% of the bits of partial information seen by the observer's right eye may originate from the second view while about 20% may be a mix of a third and a fourth view, without any detriment to the spatial impression. The method according to the invention is characterized by the fundamental relationship that the light propagation direction defined by each HOE for every light ray incident on it is a one-to-one function of the ray's direction of incidence. Under certain circumstances, types of imaging other than those given under a) through i) above may also be feasible for display by the HOEs.

Further advantageous embodiments of this version of the invention are described in the dependent claims.

The object of the invention is also accomplished by a method of autostereoscopic projection in which at least one projector projects bits of partial image information from at least two views $A_k$ (k=1 . . . n, n≧2) of a scene or object onto the front side of a holographic screen, in which the holographic screen has a multitude of holographic optical elements (HOEs) arranged in a grid of columns and/or rows, and in which each HOE displays the light incident from at least one projector by means of at least one of the following optical imaging types or combinations of imaging types:
a) Imaging by means of a concave or convex mirror, preferably a cylindrical mirror arranged vertically or obliquely to the vertical,
b) Diffuse reflection, with subsequent imaging by means of a concave or convex mirror, preferably a cylindrical mirror arranged vertically or obliquely to the vertical,
c) Imaging by means of a doublet or triplet of mirrors,
d) Diffuse reflection, with subsequent imaging by means of a doublet or triplet of mirrors,
e) Imaging through a polygonal polarizing filter and/or stepped neutral density filter and/or wavelength filter, with a wavelength filter transmitting light of a specified wavelength or one or several specified wavelength ranges,
f) Imaging according to e), plus diffuse reflection and subsequent imaging according to e) again,
g) Diffuse reflection, and subsequent imaging by means of an optical flat,
h) Diffuse reflection, and subsequent imaging by means of a prism,
i) Imaging by diffraction, so that the imaging actions of the multitude of HOEs define a multitude of propagation directions for the light cast toward the observer by the front side of the holographic screen, with each HOE defining one or several light propagation directions for the light incident on it, which corresponds to bits of partial image information of at least one of at least two views projected, so that, from every viewing position, an observer will see predominantly bits of partial information of a first selection of views ($A_k$) with one eye and predominantly bits of partial information of a second selection with the other eye, and thus will have a spatial impression from a great number of viewing positions.

"Predominantly" in this context means, e.g., that about 90% of the bits of partial information seen by the left eye of an observer originates from a first, and about 10% from a second view of a scene or object, so that in this case the first view is predominant. Simultaneously, e.g., about 80% of the bits of partial information seen by the observer's right eye may originate from the second view while about 20% may be a mix of a third and a fourth view, without any detriment to the spatial impression. The method according to the invention is characterized by the fundamental relationship that the light propagation direction defined by each HOE for every light ray incident on it is a one-to-one function of the ray's direction of incidence. Under certain circumstances, types of imaging other than those given under a) through i) above may also be feasible for display by the HOEs.

Further advantageous embodiments of this version of the invention are described in the dependent claims.

The object of the invention is also accomplished with autostereoscopic projection arrangement comprising
at least one projector for the projection von bits of partial image information from at least two views $A_k$ (k=1 . . . n, n≧2) of a scene or object onto the front side of a holographic screen, in which
the holographic screen has a multitude of holographic optical elements (HOEs) arranged in a grid of columns and/or rows, and in which
each HOE displays the light incident from at least one projector by means of at least one of the following optical imaging types or combinations of imaging types:
a) Imaging by means of a concave or convex mirror, preferably a cylindrical mirror arranged vertically or obliquely to the vertical,
b) Diffuse reflection, with subsequent imaging by means of a concave or convex mirror, preferably a cylindrical mirror arranged vertically or obliquely to the vertical,
c) Imaging by means of a doublet or triplet of mirrors (corner reflector),
d) Diffuse reflection, with subsequent imaging by means of a doublet or triplet of mirrors,
e) Imaging through a polygonal polarizing filter and/or stepped neutral density filter and/or wavelength filter, with a wavelength filter transmitting light of a specified wavelength or one or several specified wavelength ranges, f) Imaging according to e), plus diffuse reflection and subsequent imaging according to e) again,
g) Diffuse reflection, and subsequent imaging by means of an optical flat,
h) Diffuse reflection, and subsequent imaging by means of a prism,
i) Imaging by diffraction, so that the imaging actions of the multitude of HOEs define a multitude of propagation directions for the light cast toward the observer by the front side of the holographic screen, with each HOE defining one or several light propagation directions for the light incident on it, which corresponds to bits of partial image information of at least one of at least two views projected, so that, from every viewing position, an observer will see predominantly bits of partial information of a first selection of views ($A_k$) with one eye and predominantly bits of partial information of a second selection with the other eye, and thus will have a spatial impression from a great number of viewing positions.

Further advantageous embodiments are described in the dependent claims.

In principle, it applies to each embodiment of the arrangement according to the invention that an increase in the number of projectors permits an increase in resolution and/or the number of views perceived on the holographic screen. Besides it is feasible that a projected pixel represents a mix of bits of image information from at least two different views.

The invention also relates to methods for the manufacture of a holographic screen for use in one of the methods or arrangements described above. The method of manufacture comprises the following operations:
a) Manufacture of an optical arrangement containing a multitude of optical components providing the optical imaging types or type combinations, or combinations thereof, specified in the independent claim 1;
b) Positioning of an (undeveloped) holographic screen in the vicinity of the said optical arrangement;
c) Exposure of the holographic screen to one or several coherent light sources, in which the holographic screen is preferably struck by a reference beam coming directly from the light source and an object beam which, coming also from the light source, has passed the said optical arrangement; preferably, this operation c) is repeated several times, preferably in such a way that every time that operation c) is executed the light source is given a different position relative to the said optical arrangement and, optionally, a different optical arrangement is used;
d) Development of the holographic screen.

It will not be possible in every case to actually manufacture the optical arrangement needed. In such a case the method described below can be used alternatively to that described above. The alternative method comprises the following operations:
a) Selection of a multitude of optical components providing the optical imaging types or type combinations, or combinations thereof, specified in the independent claims 1 or 31, and arrangement of these components in a grid of rows and/or columns;
b) Computation of the respective holographic interference patterns for the imaging types or combinations;
c) Exposure of the holographic screen to one or several coherent light sources so that the computed holographic interference pattern(s) are written onto the holographic screen;
d) Development of the holographic screen.

In special cases it is further possible to manufacture the holographic screen in the following way:
Manufacture of at least two holographic screens according to either of the two methods described above;
Assembling the at least two holographic screens thus manufactured into one holographic screen.

It is thus possible to make the holographic screen as a stack of several layers. The layers may be joined to each other, e.g., by lamination.

With an additional advancement of the invention, described below, it is accomplished that the observer or observers can move about within the largest possible viewing range without any deterioration in the quality of the 3D display perceived, so that the arrangement can be used, in particular, for 3D projections of large images sized up to several square meters.

According to the invention, such an arrangement for the projection of a three-dimensionally perceived image comprises
at least one projection unit suitable for the projection of at least one image containing bits of image information from a number of n views (n≧2) of a scene or object;
a projection screen comprising a multitude of reflectors in an array-type arrangement, in which the reflectors reflect the light originating from the projection unit largely irrespective of the respective direction of light incidence in such a way that each illuminated reflector emits a cone of reflected light in which at least one line lying in a plane parallel to the plane of the projection screen and tangent to the spatial course of the intensity maximum in the said cone of reflected light has an angle of inclination of 0°<α<90° relative to the vertical extension of the edge of the said projection screen if this vertical extension is projected parallelly onto the said parallel plane.

Preferably, several such cones of reflected light are superimposed in such a way that the spatial courses of the respective intensity maximums are essentially equal. In this way it is accomplished that, from or several (monocular) viewing positions, different reflections (which function as partial image elements or partial image areas) are perceived with approximately equal brightness.

The object of the invention is also accomplished by the embodiment of an arrangement for the projection of a three-dimensionally perceived image, comprising
at least one projection unit suitable for the projection of at least one image containing bits of image information from a number of n views (n≧2) of a scene or object;
a projection screen comprising a multitude of reflectors in an array-type arrangement of essentially identical size and shape, in which the said reflectors reflect the light originating from the projection unit within a solid angle smaller than 1 π*sr, characterized in that at least two of the reflectors are horizontally and/or vertically offset relative to each other by a distance that is not an integral multiple of the width of one of these reflectors in case of a horizontal offset, or the height of a reflector in case of a vertical offset.

The object of the invention is also accomplished by the embodiment of an arrangement for the projection of a three-dimensionally perceived image, comprising
at least one projection unit suitable for the projection of at least one image containing bits of image information from a number of n views (n≧2) of a scene or object;
a projection screen comprising a multitude of shaped reflectors in an array-type arrangement, characterized in that at least two of the reflectors differ from each other in at least one of the parameters, viz. shape, size or direction-dependent reflectance.

In all embodiments of the arrangements according to the invention, the projection unit may contain a DMD chip or one or several LCD light modulators. The projection unit may further contain a laser projector.

In addition, one or several filter arrays may be provided in front of the projection screen (in viewing direction), with each filter array containing a multitude of filter elements which are arranged in columns and rows and which are either transmissive (with a defined transmittance) or opaque to light of particular wavelengths/wavelength ranges. This provides an added directional selectivity of the projected or reflected bits of partial image information.

For example, in all three embodiments, each individual reflector or simultaneously several reflectors on the projection screen may be formed by two plane mirrors arranged at a certain angle, preferably 90°, to each other, and a lenticular. In this case the intersection edge of the respective two plane mirrors would, e.g., be inclined at an angle of 7° relative to the vertical.

Instead of this it is also feasible that each individual reflector or simultaneously several reflectors on the projection screen may consist of a metal coat on a plastic substrate. Furthermore, the base surface of the projection screen may be either plane or curved.

In a special embodiment of each of the three basic embodiments described so far, one or several reflectors of the projection screen may be supported in a rotatable fashion, in which preferably the combination structure of the projected bits of image information of the n views (n≧2) of a scene or object are varied in time for at least one projection unit, so that the light originating from the projection unit or one of the projection units and projected onto one of the rotatable reflectors, preferably originates from bits of image information of different views alternating in time, so that the said reflector reflects bits of image information of different views in different directions at different times.

Moreover, one or several reflectors of the projection screen may have reflection properties that depend on wavelength. Preferably, in this embodiment, some reflectors specially reflect light of different wavelengths in different directions.

In further exemplary embodiments, means for folding the beam between the projection unit and the projection screen are provided in addition to decrease the spatial extension of the arrangement according to the invention. Beam folding in image projection is known to one skilled in the art and needs no further explanation here.

In an advantageous embodiment, at least four projection units are used, which project their images or bits of partial image information onto the projection screen from different directions. This permits the projection of a greater number of different views of a scene or object than it would be possible with, e.g., just one or two projection units, und thus is of great advantage in that it provides greater freedom of movement for observers.

The projection unit, or each of the projection units, is spaced from the projection screen by a distance of, e.g., between 0.5 and 20 meters.

The object of the invention is also accomplished by an embodiment of an arrangement for the projection of a three-dimensionally perceived image, comprising at least two projection units, each of which is suitable for the projection of at least one image, which contains bits of image information from a number of n views (n≧2) of a scene or object;

a projection screen comprising a multitude of reflectors in an array-type arrangement, characterized in that at least one reflector simultaneously receives light from at least two projection units, in which the light originating from different projection units is maximally reflected in essentially different spatial directions.

Even in this fourth embodiment of the invention, each projection unit preferably contains either a DMD chip or one or several LCD light modulators, or a laser projector. In the case of laser projectors, the low divergence of the light beams is of great advantage, as highly defined images can be produced without problems. Preferably, each projection unit can perform this completely without any convergent imaging optics.

For special embodiments, this arrangement is additionally provided with one or several filter arrays arranged in front of the projection screen (in viewing direction), with each filter array containing a multitude of filter elements which are arranged in columns and rows and which are either transmissive (with a defined transmittance) or opaque to light of particular wavelengths/wavelength ranges.

Each individual reflector or simultaneously several reflectors on the projection screen may, e.g., be formed by two plane mirrors arranged at a certain angle, preferably 90°, to each other, and a lenticular.

Instead of this it is also feasible that each individual reflector or simultaneously several reflectors on the projection screen may consist of a metal coat on a plastic substrate. Furthermore, the base surface of the projection screen may be either plane or curved.

In a special embodiment of the fourth embodiment described so far, one or several reflectors of the projection screen may be supported in a rotatable fashion, in which preferably the combination structure of the projected bits of image information of the n views (n≧2) of a scene or object are varied in time for at least one projection unit, so that the light originating from the projection unit or one of the projection units and projected onto one of the rotatable reflectors, preferably originates from bits of image information of different views alternating in time, so that the said reflector reflects bits of image information of different views in different directions at different times.

Moreover, one or several reflectors of the projection screen may have reflection properties that depend on wavelength. Preferably, in this embodiment, some reflectors specially reflect light of different wavelengths in different directions.

In further exemplary embodiments, means for folding the beam between the projection unit and the projection screen are provided in addition to decrease the spatial extension of the arrangement according to the invention. Beam folding in image projection is known to one skilled in the art and needs no further explanation here.

In an advantageous embodiment, at least four projection units are used, which project their images or bits of partial image information onto the projection screen from different directions. This permits the projection of a greater number of different views of a scene or object than it would be possible with, e.g., just one or two projection units, und thus is of great advantage in that it provides greater freedom of movement for observers.

The projection unit, or each of the projection units, is spaced from the projection screen by a distance of, e.g., between 0.5 and 20 meters.

In a particularly preferable embodiment of the autostereoscopic projection arrangement according to the invention, a filter array in the form of a color mask is provided in the beam path between the projector/the projectors and the projection screen, this color directs different colors, preferably red, green and blue, onto subpixels belonging to a pixel of the projection screen, so that the subpixels display not only the pure colors red, green and blue, but also mixed colors and, thus, a greater number of hues per subpixel can be displayed and the resolving capability of the projection screen is increased.

The width $l_{new}$ of the colors that can be displayed per pixel results, e.g., from $$l_{new} = l \frac{n}{2n-1}$$

in which l is the size of one subpixel and n the number of subpixels per pixel; alternatively, the number $p_{new}$ of the views displayable per pixel is increased according to the function $$p_{new} = p \frac{2n-1}{n}$$

in which n is the number of subpixels per pixel and p the number of different views of the scene or object that can be displayed, preferably with n=3 and p=8.

The width $l_{new}$ may vary from color to color. In this way it is feasible to influence and specify not only the width, but also the shapes or outline geometries of the image rendering elements. A filter element may be composed of several smaller partial filter elements.

The said color mask may be configured as a lens, an HOE or another optical element capable of effecting a spectral separation of the incident light.

In each of the embodiments described it is feasible that an image rendering element of the smallest physical size, of any of the projection units, is controlled either by the information of an individual image rendering element of a view of a scene or object, or by mixed image information resulting, e.g., as the weighted mean of the bits of image information of image rendering elements of at least two views of a scene or object. Exemplary image combination structures are given, e.g., in the patent specification DE 100 03 326 C2 mentioned before, and in DE 101 45 133 C1.

In each of the four general embodiments, the principle of displaying a spatially perceivable image is essentially identical: Bits of partial image information of different views of a scene or object are reflected essentially into different viewing directions, so that each observer will see predominantly a first selection of views with one eye, and predominantly a second selection of views with the other eye, so that a stereo contrast is accomplished that is sufficient for a spatial impression.

The number of projectors can be reduced if a projector sequentially projects bits of information of different views while the direction of the optical axis is varied at an appropriate frequency, e.g., by reflectors that deflect the beams as a function of time.

Moreover, the filter array positioned closest to the observer may be partially reflecting in order to generate a 2D display on this filter array, which in this case is used as a projection screen.

BRIEF DESCRIPTION OF THE DRAWINGS

Below, the invention will be explained in more detail with reference to the accompanying drawing in which:

FIG. 4 illustrates the image structure formed on the projection screen in the first embodiment of the invention, this image structure being composed of bits of partial information of different views (detail), FIG. 5 and FIG. 6 illustrate a possible mix of views each visible to an observer's eye in a viewing position in the first embodiment of the invention (detail), FIG. 9 illustrates the image structure formed on the projection screen in the second embodiment of the invention, this image structure being composed of bits of partial information of different views (detail), FIG. 13 illustrates the second projector-side filter array of a third embodiment of the invention (detail), FIG. 15 illustrates the image structure formed on the projection screen in the third embodiment of the invention, this image structure being composed of bits of partial information of different views (detail), FIG. 18 illustrates the image structure formed on the projection screen in the fourth embodiment of the invention, this image structure being composed of bits of partial information of different views (detail), FIG. 21 illustrates the projector-side filter array of a fifth embodiment of the invention (detail), suitable for a single DMD projector, FIG. 22 illustrates the observer-side filter array of the fifth embodiment of the invention (detail), FIG. 23 illustrates the image structure formed on the projection screen in the fifth embodiment of the invention, this image structure being composed of bits of partial information of different views (detail), the bits of partial information of the different views being rendered in colors (wavelength ranges) differing from view to view, FIG. 27 illustrates an exemplary second filter structure implemented by at least one HOE or simultaneously several HOEs (detail), FIG. 33 illustrates an exemplary image combination structure using four views, FIG. 36 illustrates an example with vertically aligned eye positions, FIG. 37 illustrates an example with obliquely aligned eye positions.

BRIEF DESCRIPTION OF THE INVENTION

Figure 1:
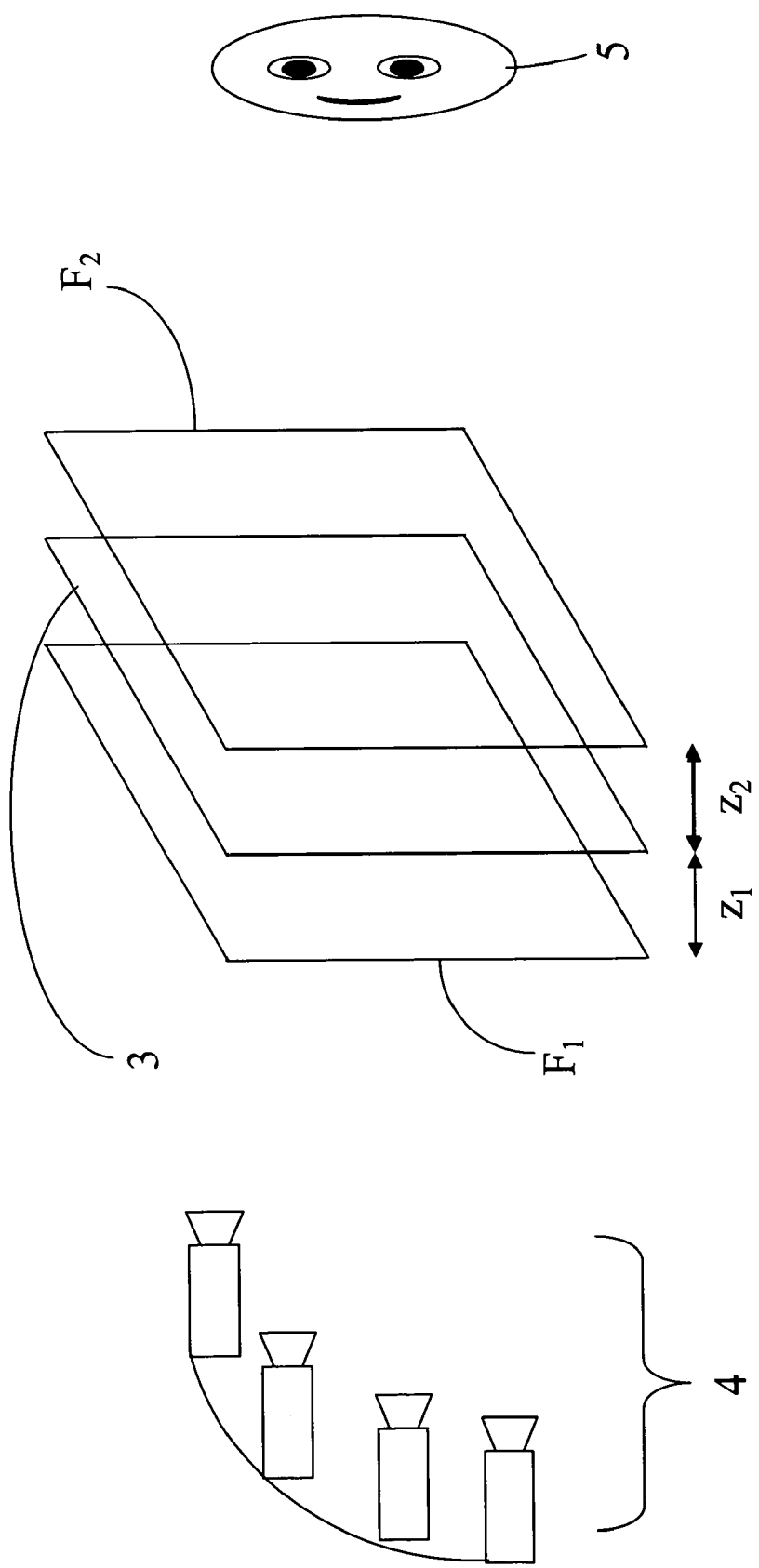
FIG. 1 is a sketch illustrating the principle of the arrangements according to the invention.

FIG. 1 is a sketch illustrating the principle of the arrangements according to the invention. The sketch is not to scale. As described above, the arrangement shown, according to the invention, comprises the following components:
- at least two projectors 4; (for the sake of clarity, the drawing shows only four projectors, although there might be, e.g., eight or more),
- a projection screen 3,
- at least two filter arrays $F_1$, $F_2$, with filter array $F_1$ arranged between the projection screen 3 and the projectors 4, i.e. behind the projection screen 3 (in the viewing direction of the observer 5), and filter array $F_2$ arranged in front of the projection screen 3 (in the viewing direction of the observer 5).

As will be explained in detail below for the various embodiment versions, all filter arrays $F_1$, $F_2$ have wavelength filter elements arranged in columns and rows, which are transparent to light of different wavelengths λ or different wavelength regions Δλ. The projectors 4 project bits of partial information from n views $A_k$ (with k=1 ... n; n≧2) of a scene or object through at least one filter array $F_1$ and onto the projection screen 3, so that the projection screen 3 makes optically visible bits of partial information of views $A_k$ in a combination or mix defined by the geometry of the arrangement, the projection screen 3 being divided into a grid of sufficient resolution consisting of image rendering elements $\alpha_{ij}$ in columns i and rows j, which, depending on the embodiment of the filter array $F_1$ and the projectors 4, deliver light of particular wavelengths λ or wavelength ranges, each image rendering element $\alpha_{ij}$ rendering a bit, or bits, of partial information of at least one of the views $A_k$.

Propagation directions are defined for the light radiated toward the observer 5 by the projection screen 3 through the at least one filter array $F_2$, arranged (in viewing direction) in front of the projection screen 3, so that each single image rendering element $\alpha_{ij}$ corresponds with several correlated wavelength filters of the filter array $F_2$, or each single wavelength filter of the filter array $F_2$ corresponds with several correlated image rendering elements $\alpha_{ij}$ in such a way that the straight line connecting the centroid of the cross-section area of a visible portion of the image rendering element $\alpha_{ij}$ with the centroid of the cross-section area of a visible portion of the wavelength filter corresponds to one propagation direction, so that, from every viewing position, an observer 5 will see predominantly bits of partial information of a first selection of views $A_k$ with one eye and predominantly bits of partial information of a second selection of views $A_k$ with the other eye, resulting in a spatial impression for the observer 5 from many viewing positions.

Advantageously, a total number of 2, 4, 8, 16, 32 or 40 projectors can be used. Excellent spatial impressions and convenient freedom of movement for several observers at a time are obtained with about eight or more views presented, with preferably eight or more projectors being used for projecting the views, and with each projector projecting exactly one view $A_k$ or bits of partial information thereof.

As shown in FIG. 1, the arrangement described above preferably uses exactly two filter arrays $F_1$ and $F_2$. Special configurations in which more than two filter arrays are of advantage are described below.

In a first exemplary embodiment, an arrangement as shown in FIG. 1 is used, but with eight instead of the four projectors 4 shown on the drawing. Each of the eight projectors projects a complete 2D view of the scene or object to be displayed; accordingly, eight views are presented. Such 2D views may be, e.g., 2D shots of a scene or object taken from directions having a slight horizontal offset between them. For technical reasons, the 2D views are provided with some raster; therefore they are projected by the projectors as bits of partial information, e.g., with a full-color resolution of 1024×768 pixels.

The optical axes of the projectors preferably intersect at the center of the face of the projection screen 3, with two neighboring optical axes including an angle of approximately 3.5 degrees. The projectors are aligned accordingly, and their projection lenses are spaced from the face center of projection screen 3 by, e.g., 2900 mm. Advantageously, the projectors may be arranged on a circular arc, the center of the circle being the said face center. Preferably, all projector lenses are at the same height behind the projection screen, viz. approximately at the height of the face center of the projection screen. To ensure such a location, an appropriately dimensioned mechanical stand can be used, for example.

Figure 2:
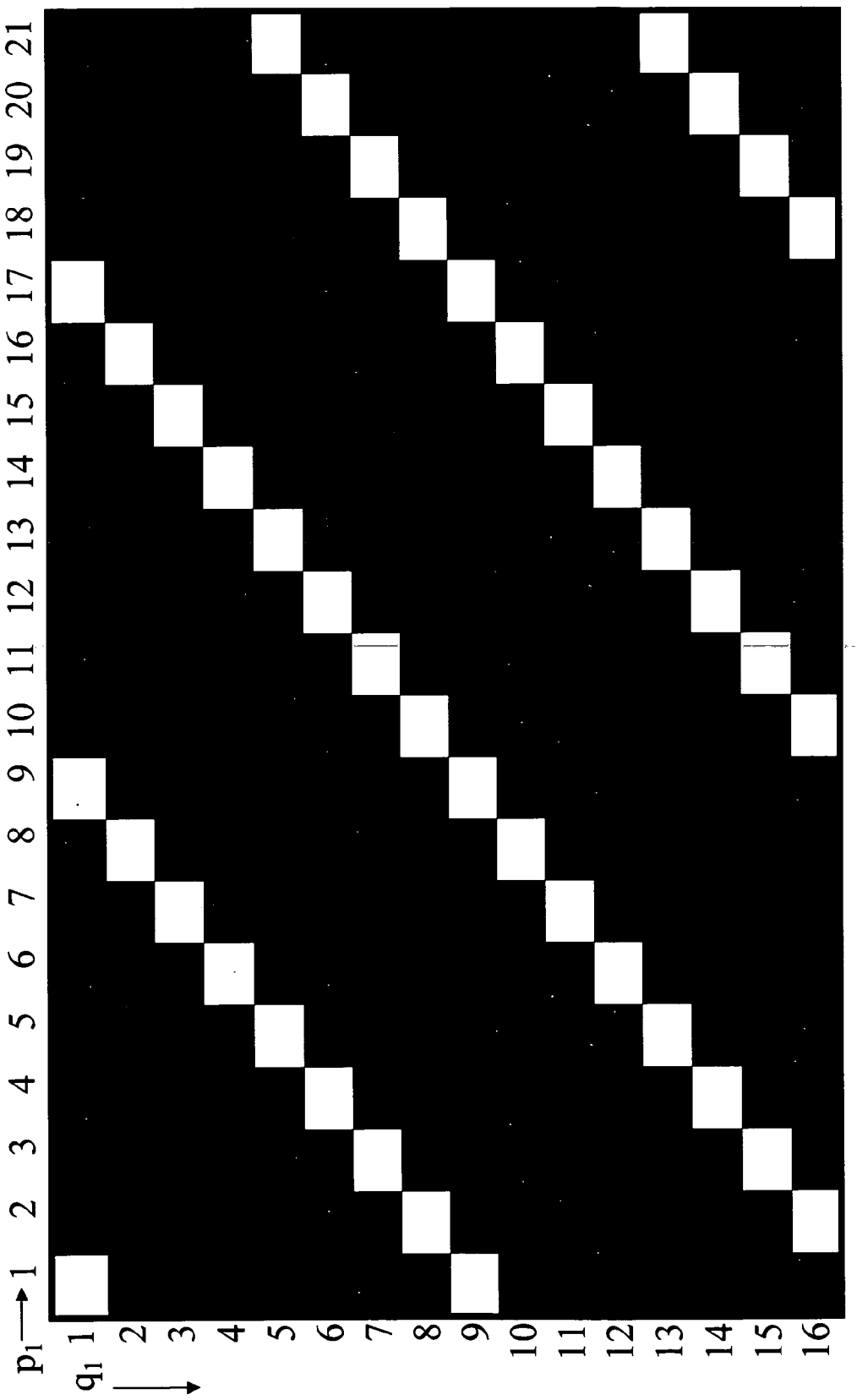
FIG. 2 illustrates the projector-side filter array of a first embodiment of the invention (detail), suitable for, e.g., eight projectors.

FIG. 2 illustrates a detail of the projector-side filter array $F_1$ of the first embodiment of the invention. This filter array $F_1$ comprises wavelength filter elements $\beta_{1pq}$ in a grid of rows $q_1$ and columns $p_1$, which are arranged on the filter array depending on their transmission wavelength or their transmission wavelength range $\lambda_{1b}$ according to the following function:

$$b = p_A - d_{Apq} \cdot q_A - n_{Am} \cdot IntegerPart\left[\frac{p_A - d_{Apq} \cdot q_A - 1}{n_{Am}}\right],$$

in which the index $A=1$, since the array $F_1$ is concerned, $p_1$ is the index of a wavelength filter $\beta_{1pq}$ in a row of the array $F_1$, $q_1$ is the index of a wavelength filter $\beta_{1pq}$ in a column of the array $F_1$, b is an integer that defines, for a wavelength filter $\beta_{1pq}$ of the filter array $F_1$ in the position $p_1, q_1$, one of the specified transmission wavelengths or wavelength ranges $\lambda_{1b}$ and may adopt values between 1 and $b_{1max}$, $n_{1m}$ is an integer greater than zero, which preferably corresponds to the total number n of the views $A_k$ shown by the projectors, $d_{1pq}$ is a selectable mask coefficient matrix for varying the arrangement of wavelength filters on the array $F_1$, and IntegerPart is a function for generating the greatest integer that does not exceed the argument put in square brackets.

In the above equation, $p_A = p_1$ corresponds to the index p, and $q_A = q_1$ to the index q for the matrix $d_{Apq} = d_{1pq}$ or for the filter elements $\beta_{1pq}$.

In this embodiment, several of the transmission wavelengths or wavelength ranges $\lambda_{1b}$ have the same filter effects: If $\lambda_{1,1}$ and $\lambda_{1,3} \ldots \lambda_{1,8}$ are wavelength ranges that block the entire visible spectrum, $\lambda_{1,2}$ is a filter range transparent to the visible spectrum, and if $n_{1m}=8$ and $d_{1pq}=-1=$const, the resulting filter array $F_1$, according to the rule for generating a filter structure, is essentially opaque and contains oblique, stepped transparent stripes evenly distributed over the area and occupying approximately one eighth of the total area. This is shown in FIG. 2. Here, a transparent or opaque filter element is, e.g., approximately 0.285 mm wide and 0.804 mm high. Other embodiments are also feasible, of course.

Figure 3:
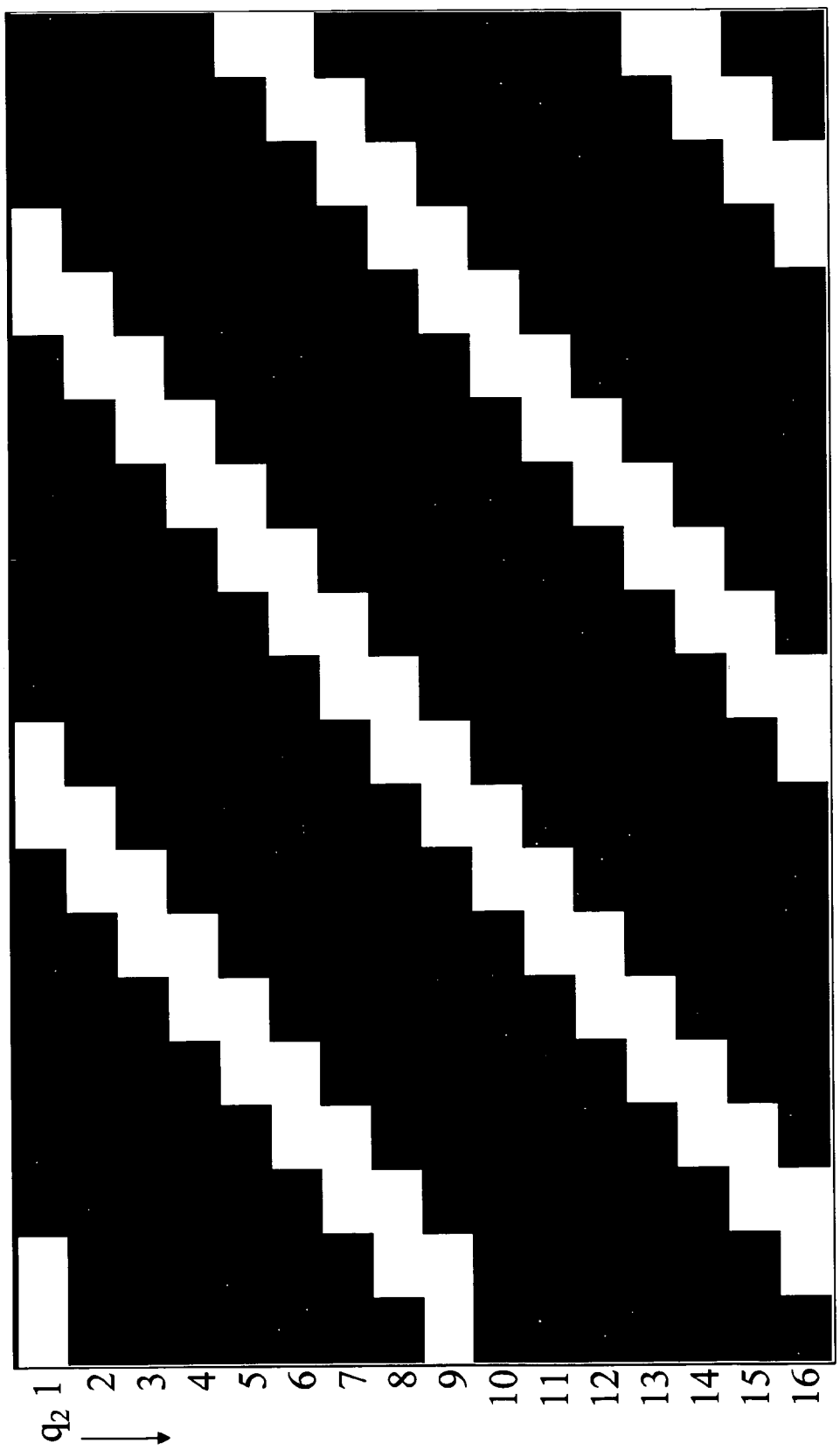
FIG. 3 illustrates the observer-side filter array of a first embodiment of the invention (detail)

FIG. 3 shows a detail of the observer-side filter array $F_2$ with $A=2$ of the first embodiment of the invention. The parameters used are similar, but not completely identical, to those of filter $F_1$, viz.: $\lambda_{2,1}$ and $\lambda_{2,4} \ldots \lambda_{2,8}$ are wavelength ranges blocking the entire visible spectrum; $\lambda_{2,2}$ and $\lambda_{2,3}$ are filter ranges transparent to the visible spectrum; $n_{2m}=8$, and $d_{2pq}=-1=$const. Here again, a transparent or opaque filter element is, e.g., approximately 0.285 mm wide and 0.804 mm high, other dimensions being feasible as well.

The filter array $F_1$ is arranged at a distance of $z_1=2$ mm behind the projection screen (in viewing direction). For the array $F_2$ the distance is $z_2=(-)45$ mm, but this array is arranged in front of the projection screen (in viewing direction), which is indicated by the minus sign. To improve the image contrast, the filter array $F_2$, which is located closest to the observer, is preferably provided with an antireflection coating. This reduces reflections of extraneous light and improves the visibility of the spatial image.

If the projectors are aligned as described above, an image structure results on the projection as shown as a detail in FIG. 4. The grid with columns i and rows j has been drawn as a reference only; of course it is not necessarily visible on the projection screen 3. In FIG. 4, a number inside a box indicates the view $A_k$ from which the partial information originates that is projected to this grid position on the projection screen. The image formed on the projection screen 3, which is composed of different bits of partial information from the views $A_k$, thus shows a grid of image rendering elements $\alpha_{ij}$ in columns i and rows j. The image rendering elements $\alpha_{ij}$ may display light of altogether different wavelength ranges, depending on what light arrives from the projectors at the respective spot of the projection screen 3. If, in this exemplary embodiment, DMD/DLP projectors are used, the image rendering elements are full-color pixels $\alpha_{ij}$.

With correct alignment, the arrangement according to the invention is particularly efficient with regard to the utilization of the light and of the area, since every element of the projection screen area can receive light from at least one of the projectors. In this way, there will not be any "permanently black spots" on the screen, so that every element of the projection screen area displays some bit of partial information of at least one of the views $A_k$.

Figure 5:
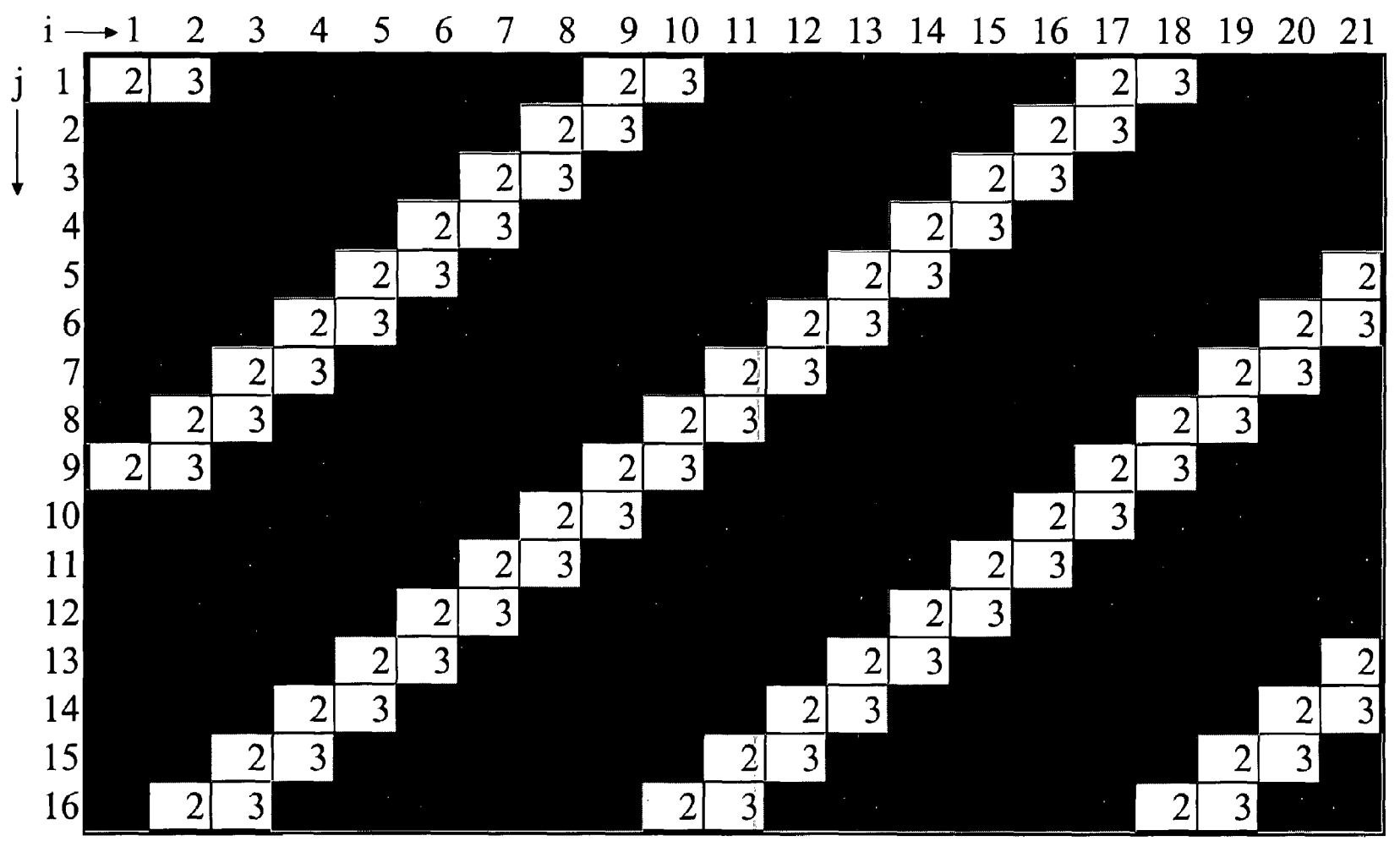
Figure 6:
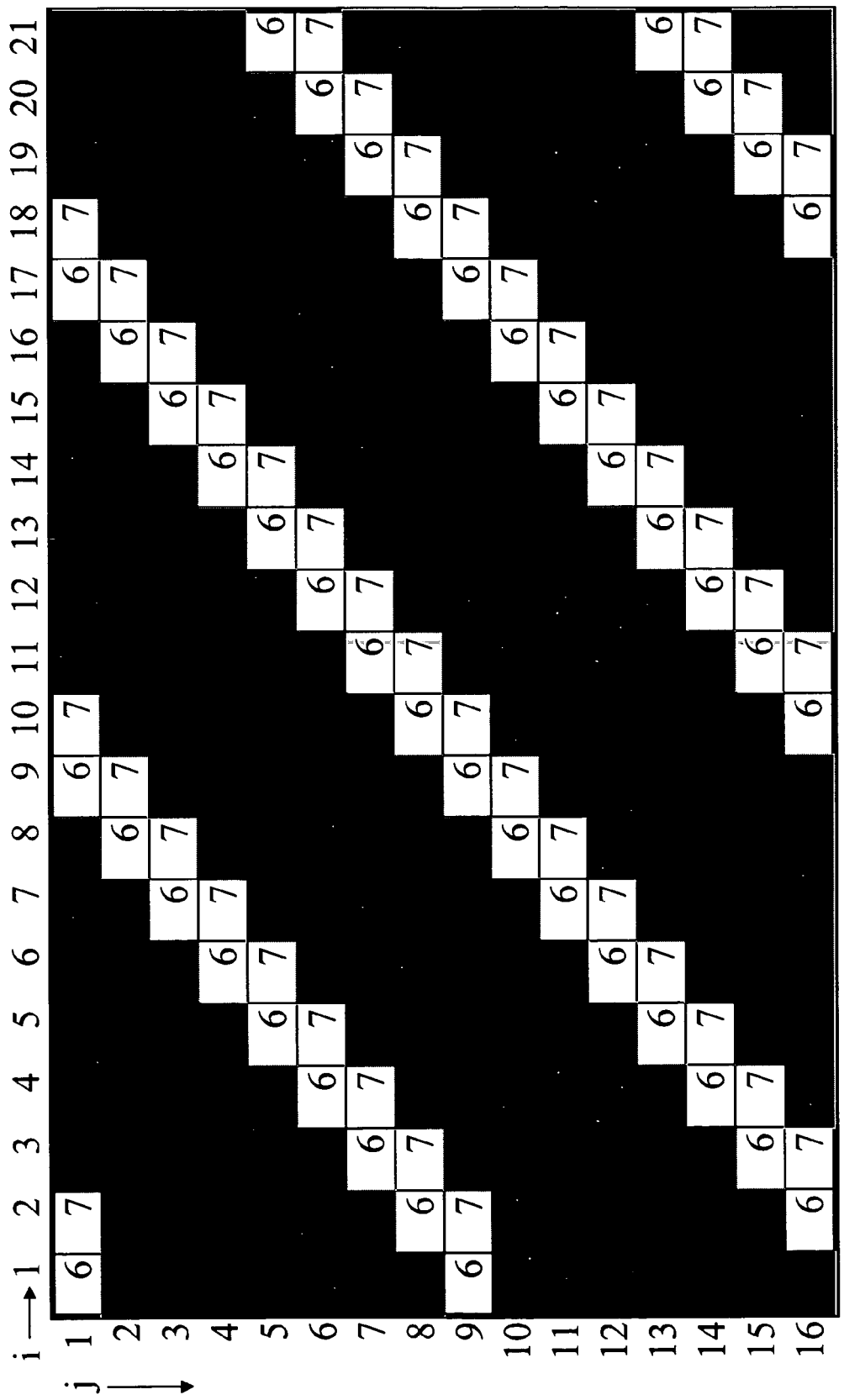

Because of the light propagation directions defined due to the filter $F_2$, an observer 5 will, from every viewing position, see predominantly bits of partial information of a first selection of views $A_k$ with one eye, and predominantly bits of partial information of a second selection of views $A_k$ with the other eye, so that, from a multitude of viewing positions, the observer 5 will have a spatial impression. FIG. 5 and FIG. 6 each show details of a possible mix of views that can be seen by an observer's eye in a viewing position if the first embodiment of the invention is used. In the first position acc. to FIG. 5, the observer's eye will, e.g., predominantly see the views 2 and 3, whereas in the second example position acc. to FIG. 6, it will predominantly see the views 6 and 7. If each of the observer's eyes sees one of the mixes of views, the observer will have a spatial impression.

Let it be noted here that in this first exemplary embodiment the two filter arrays $F_1$, $F_2$ cannot be made completely congruent by horizontally and/or vertically linear scaling. In other words, the structures of the respective filter arrays do not turn into each other by one- or two-dimensional magnification or demagnification. With regard to the spatial impression, this lack of congruence has the effect that the eye of an observer will, from actually every viewpoint, always see a mix of bits of partial information from several views (see also the exemplary view mixes in FIG. 5 and FIG. 6). This completely excludes the case that an observer's eye in any position in the viewing space sees bits of partial information from exactly one of the views.

The projection screen 3 is translucent and preferably also comprises a carrier substrate, e.g. a glass plate. In addition, it may have a light-concentrating effect, i.e. a positive gain. Excellent definition of the image rendering elements on the projection screen is achieved if the projection screen is designed as a very thin wafer, preferably with a thickness of less than one millimeter. In this first embodiment, the projection screen 3 is a flat plate with a face diagonal of approximately 50 inches and a side ratio of 16:9.

The projectors 4 receive image data from an electronic control system, which may comprise one or several separate units. In this connection, the said electronic control system may consist, e.g., of an image data source containing one PC per projector. In other words, there are eight PCs, with each PC feeding the image sequence of one particular view $A_k$ to one projector, as mentioned before. The PCs are linked to each other via a trigger, so that all eight views $A_k$ are displayed in synchronism. Embodiments with fewer PCs are feasible just as well.

Each of the filter arrays $F_1$ and $F_2$ is designed as an exposed film. Each of the filter arrays $F_1$, $F_2$ is laminated onto a substrate, e.g. a glass substrate. This provides for good mechanical stability. In the arrangement acc. to FIG. 1, both filter arrays $F_1$, $F_2$ are always arranged on the glass substrate side facing the projectors. This provides for the best results, since the beam offsets due to the substrates are thus minimized, compared to the reversed arrangement of the filter array sides on the substrates.

In a second exemplary embodiment, the arrangement also corresponds to that shown in FIG. 1, save that eight projectors 4 are used instead of the four shown on the drawing. Here again, each of the eight projectors 4 projects a complete 2D view of the scene or object to be displayed, so that eight views are presented. The optical axes of the projectors 4 again intersect preferably at the center of the face of projection screen 3, with two neighboring optical axes including an angle of approximately 3.5 degrees. The projectors 4 are aligned accordingly, and their lenses are spaced at a distance of, e.g., 2900 mm from the face center of the projection screen 3. Advantageously, the projectors 4 may be arranged on a circular arc, the center of the circle being the said face center. All projector lenses are at the same height behind the projection screen 3, viz. approximately at the height of the face center of the projection screen 3. To ensure such a location, an appropriately dimensioned mechanical tripod can be used, for example.

Figure 7:
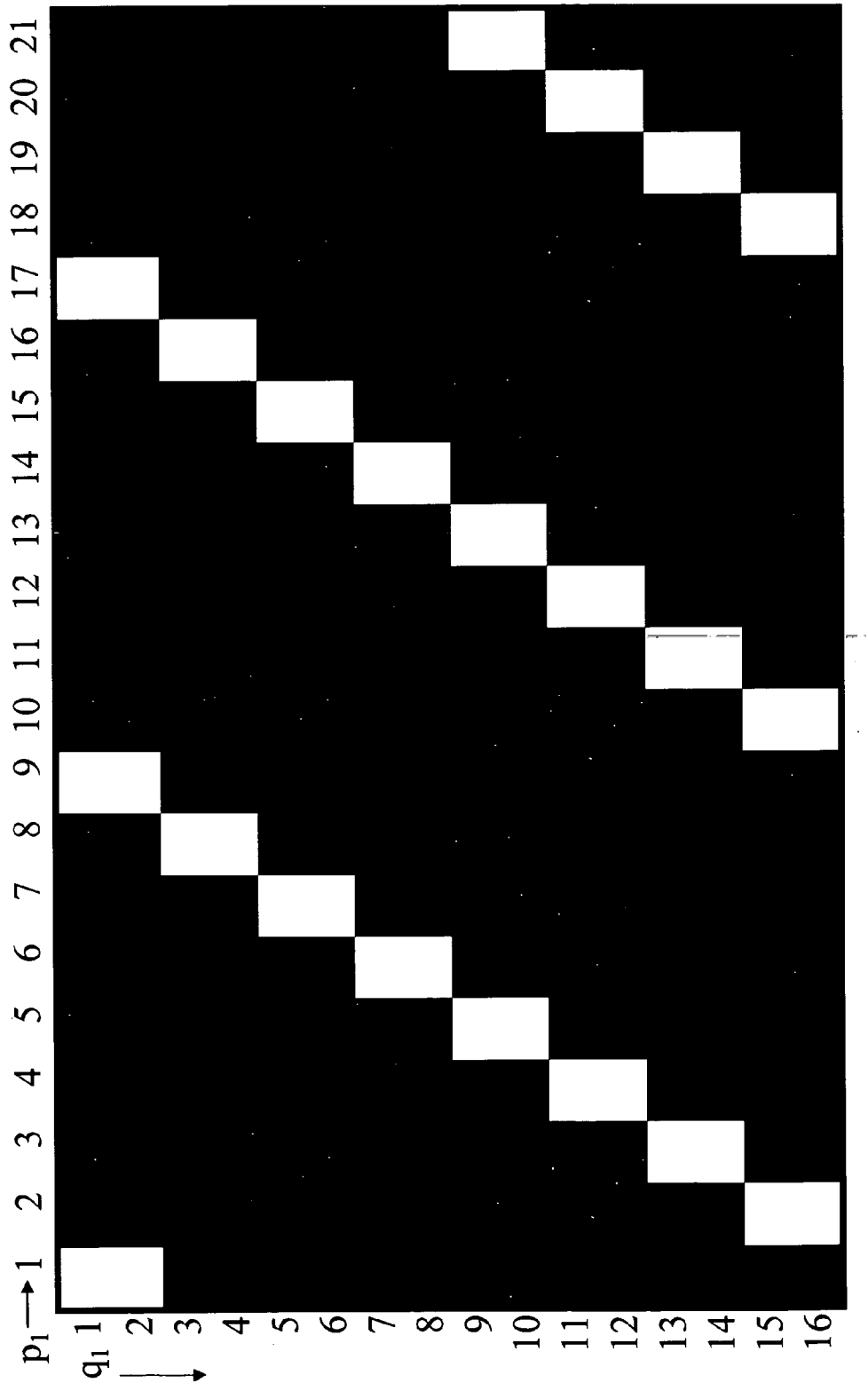
FIG. 7 illustrates the projector-side filter array of a second embodiment of the invention (detail), also suitable for eight projectors.

FIG. 7 illustrates a detail of the projector-side filter array $F_1$ with A=1 of the second embodiment of the invention. The wavelength filter elements $\beta_{1pq}$ in the grid of rows $q_1$ and columns $p_1$ are arranged in accordance with the rule described repeatedly before. The parameters applied here are as follows: $\lambda_{1,2} \ldots \lambda_{1,8}$ are wavelength ranges blocking the entire visible spectrum, $\lambda_{1,1}$ is a filter range transparent to the visible spectrum; further, $b_{1max}=8$, $n_{1m}=8$, and $$d_{1pq} = \frac{p_1 - \left(\left(\left(IntegerPart(q_1-1)\cdot\frac{1}{2}\right)+p_1\right)\bmod 8\right)}{q_1}$$

Here, the function "mod" denotes the residual class with regard of a divisor. Here, a transparent or opaque filter element is, e.g., approximately 0.285 mm wide and approximately 0.804 mm high. Other embodiments are also feasible, of course.

Figure 8:
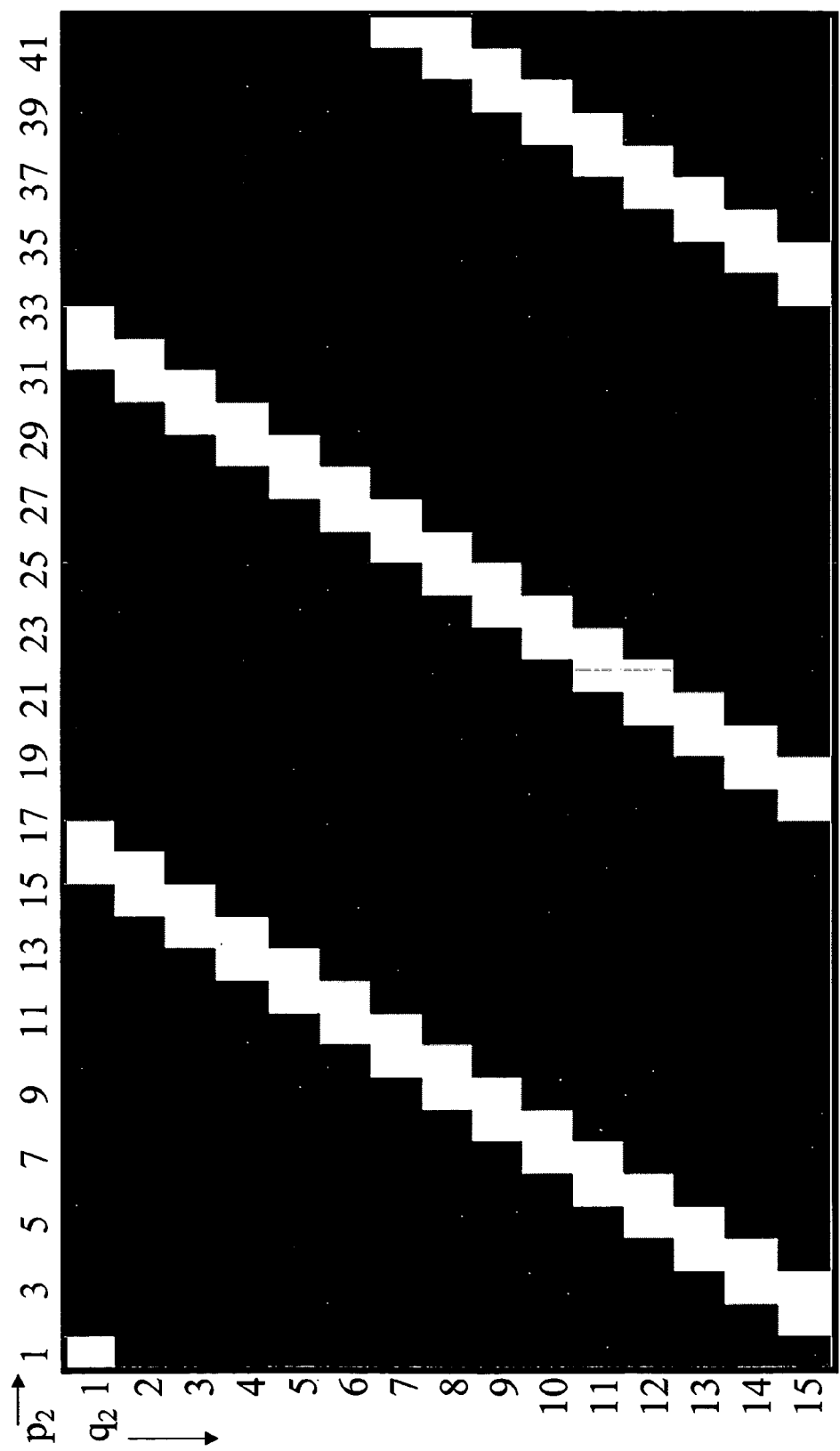
FIG. 8 illustrates the observer-side filter array of the second embodiment of the invention (detail)

FIG. 8 shows a detail of the observer-side filter array $F_2$ of the second embodiment of the invention. The parameters for generating the respective filter structure are: $\lambda_{2,3} \ldots \lambda_{2,16}$ are wavelength ranges blocking the entire visible spectrum; $\lambda_{2,1}$ and $\lambda_{2,2}$ are filter ranges transparent to the visible spectrum; $b_{2max}=16$, $n_{2m}=16$, and $d_{2pq}=-1$=const. Here, a transparent or opaque filter element is, e.g., approximately 0.14236 mm wide and 0.804 mm high, with other dimensions being possible as well.

The filter array $F_1$ is arranged at a distance of $z_1=2$ mm behind the projection screen. For the array $F_2$, the distance is $z_2=(-)45$ mm, but this array is arranged in front of the projection screen (in viewing direction), which is indicated by the minus sign. To improve the image contrast, the filter array $F_2$, which is located closest to the observer, is preferably provided with an antireflection coating. This reduces reflections of extraneous light and improves the visibility of the spatial image.

If the projectors are aligned as described above, an image structure results on the projection as shown as a detail in FIG. 9. The grid with columns i and rows j has been drawn as a reference only; of course it is not necessarily visible on the projection screen 3. The image formed on the projection screen, composed of different bits of partial information of the views $A_k$, thus shows a grid of image rendering elements $\alpha_{ij}$ in columns i and rows j. The image rendering elements $\alpha_{ij}$ may display light of altogether different wavelength ranges, depending on what light is received from the projectors at the respective spot of the projection screen. If, in this exemplary embodiment, DMD/DLP projectors are used, the image rendering elements are full-color pixels $\alpha_{ij}$.

With correct alignment, the arrangement according to the invention is particularly efficient with regard to the utilization of the light and of the area, since every element of the projection screen area can receive light from at least one of the projectors. In this way, there will not be any "permanently black spots" on the screen, so that every element of the projection screen area displays some bit of partial information of at least one of the views $A_k$.

Figure 10:
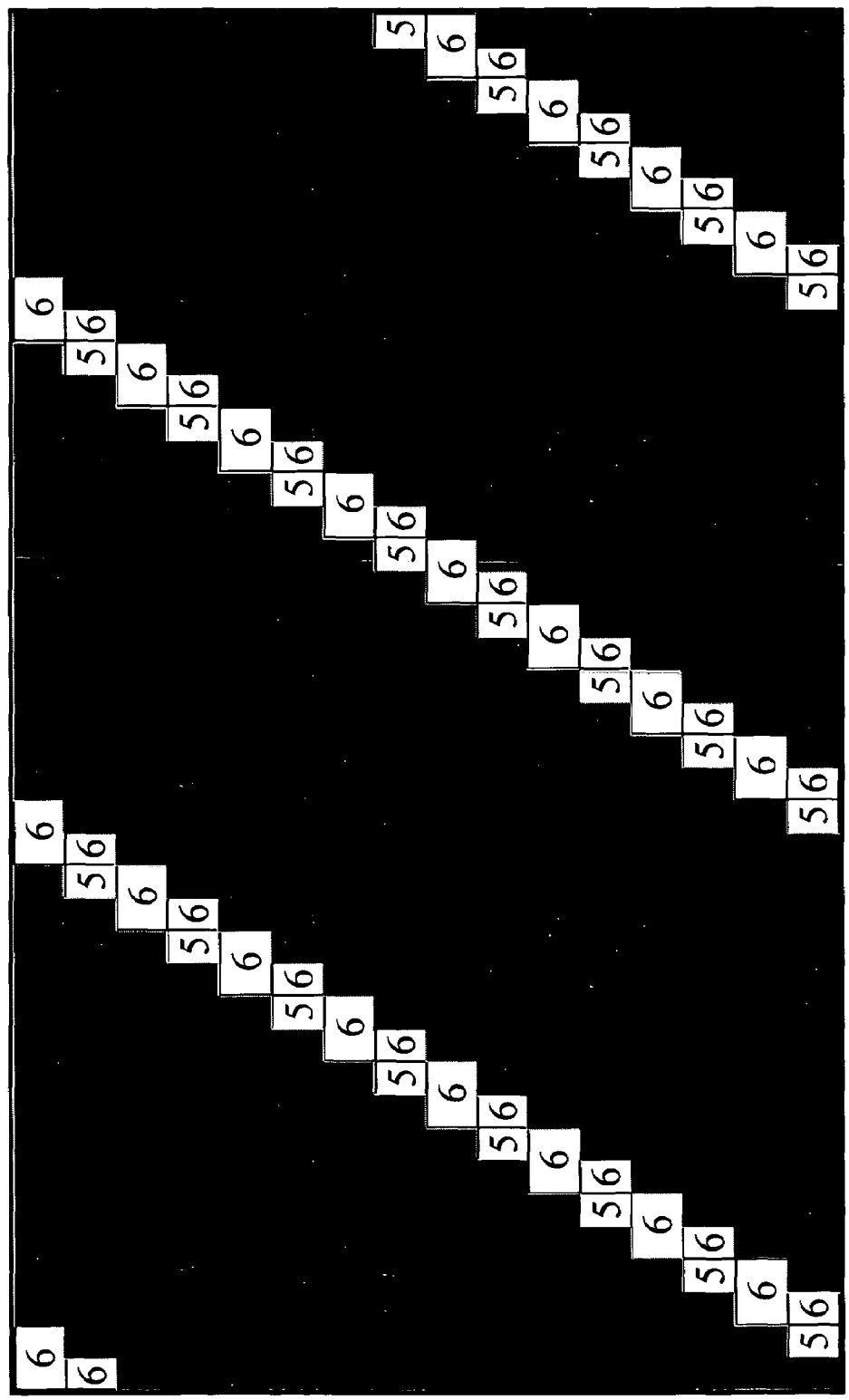
FIG. 10 and FIG. 11 illustrate a possible mix of views each visible to an observer's eye in a viewing position in the second embodiment of the invention (detail)
Figure 11:
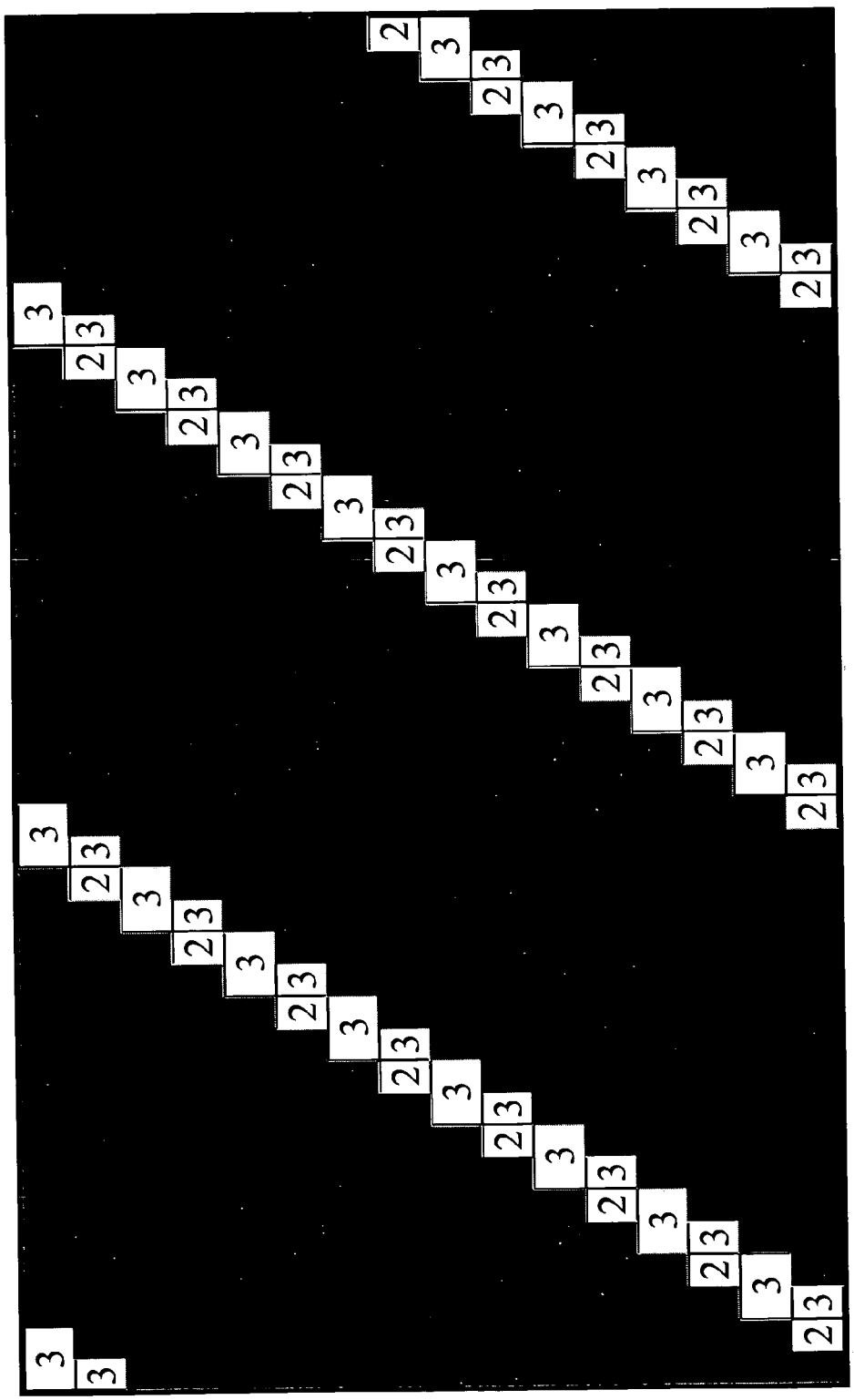

Because of the light propagation directions defined due to the filter $F_2$, an observer 5 will, from every viewing position, see predominantly bits of partial information of a first selection of views $A_k$ with one eye, and predominantly bits of partial information of a second selection of views $A_k$ with the other eye, so that, from a multitude of viewing positions, the observer 5 will have a spatial impression. FIG. 10 and FIG. 11 each show details of a possible mix of views that can be seen by an observer's eye in a viewing position if the first embodiment of the invention is used. In the first position acc. to FIG. 10, the observer's eye will, e.g., predominantly see the views 5 and 6, whereas in the second example position acc. to FIG. 11, it will predominantly see the views 2 and 3. If each of the observer's eyes sees one of the mixes of views, the observer will have a spatial impression.

Let it be noted here that, in this second exemplary embodiment, the two filter arrays $F_1$, $F_2$ cannot be made completely congruent by horizontally and/or vertically linear scaling. In other words, the structures of the respective filter arrays do not turn into each other by one- or two-dimensional magnification or demagnification.

The projection screen is translucent and preferably also comprises a carrier substrate, e.g. a glass plate. In addition, it may have a light-concentrating effect, i.e. a positive gain. In this second embodiment, the projection screen is a flat plate. Here again, the projectors used are furnished with image data by an electronic control system, which may comprise one or several separate units.

Each of the filter arrays $F_1$ and $F_2$ is designed as an exposed film. Each of the filter arrays $F_1$, $F_2$ is laminated onto a substrate, e.g., a glass substrate. This provides for good mechanical stability. In the arrangement acc. to FIG. 1, both filter arrays $F_1$, $F_2$ are always arranged on the glass substrate sides facing the projectors 4; the glass substrates are not shown in FIG. 1.

A third exemplary embodiment also uses an arrangement acc. to FIG. 1; here again, eight projectors are used instead of the four projectors on the drawing. In addition, a third filter $F_3$ is provided between filter $F_1$ and the projection screen 3. Filter $F_3$ is not shown in FIG. 1. Each of the eight projectors again projects a complete 2D view of the scene or object, so that eight views are displayed.

The optical axes of the projectors intersect preferably at the face center of the projection screen 3, with two neighboring optical axes including an angle of approximately 3.5 degrees. The projectors 4 are aligned accordingly, and their projection lenses have a distance of, e.g., 2900 mm from the face center of the projection screen 3. Advantageously, the projectors may be arranged on a circular arc, the center of the circle being the said face center. Preferably, all projector lenses are at the same height behind the projection screen, viz. approximately at the height of the face center of the projection screen. To ensure such a location, an appropriately dimensioned mechanical tripod can be used, for example.

Figure 12:
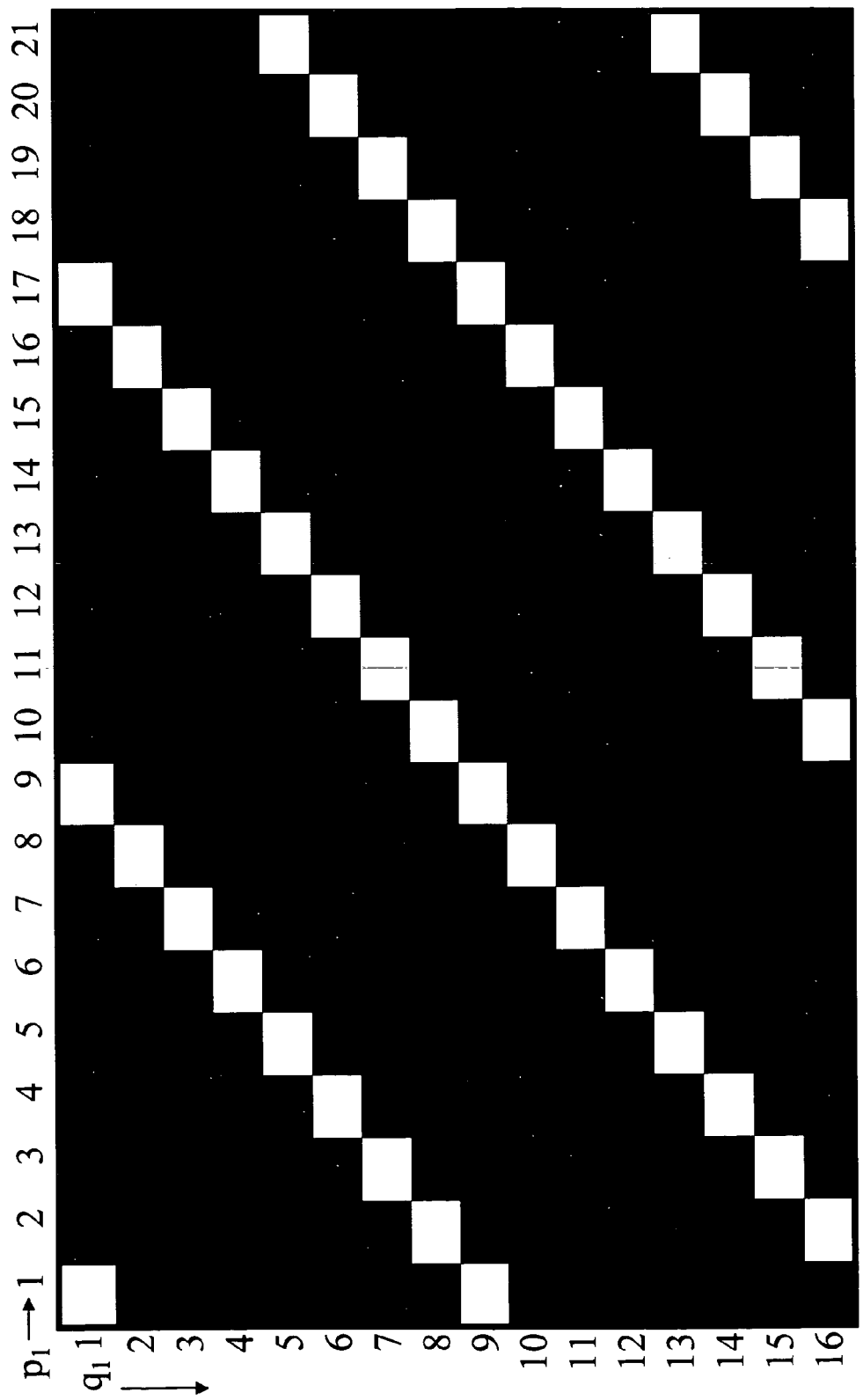
FIG. 12 illustrates the first projector-side filter array of a third embodiment of the invention (detail), also suitable for eight projectors.

FIG. 12 shows a detail of the first projector-side filter array $F_1$ of the third embodiment of the invention. The wavelength filter elements $\beta_{1pq}$ in the grid of rows $q_1$ and columns $p_1$ are arranged according to the rule described repeatedly before; the parameters selected here are as follows: In this embodiment again, several of the transmission wavelengths or wavelength ranges $\lambda_{1,b}$ have the same filter effects: $\lambda_{1,1}$ and $\lambda_{1,3} \ldots \lambda_{1,8}$ are wavelength ranges blocking the entire visible spectrum; $\lambda_{1,2}$ is a filter range transparent to the visible spectrum; $n_{1m}=8$, and $d_{1pq}=-1=$const. Here, a transparent or opaque filter element is, e.g., approximately 0.2847 mm wide and approximately 0.8044 mm high. Other embodiments are also feasible, of course.

Figure 13:
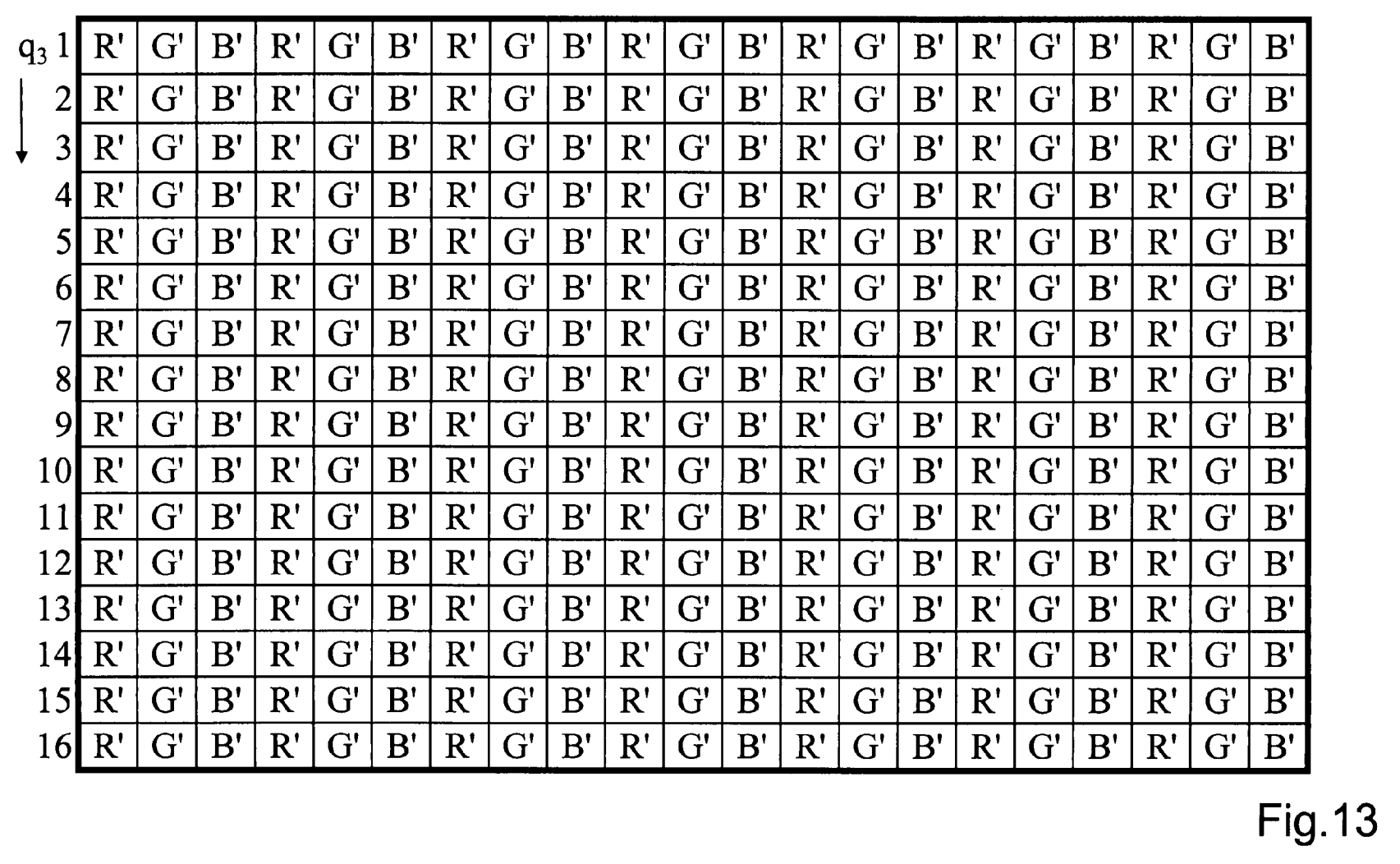

FIG. 13 shows a detail of the second projector-side filter array $F_3$, with A=3, of the third embodiment of the invention. The wavelength filter elements $\beta_{3pq}$ in the grid of rows $q_3$ and columns $p_3$ are arranged according to the rule described repeatedly before; the parameters selected here are as follows: $\lambda_{3,1} \ldots \lambda_{3,3}$ are wavelength ranges for the colors red, green and blue (in this order); $n_{3m}=3$, and $$d_{3pq} = \frac{p_3 - (p_3 \bmod 3)}{q_3}$$

Here, a filter element is, e.g., approximately 0.281 mm wide and approximately 0.796 mm high. Other embodiments are also feasible, of course. In FIG. 13, the color (i.e., wavelength) filter elements are marked by an apostrophe (R', G' and B'), to differentiate them from RGB pixels.

Figure 14:
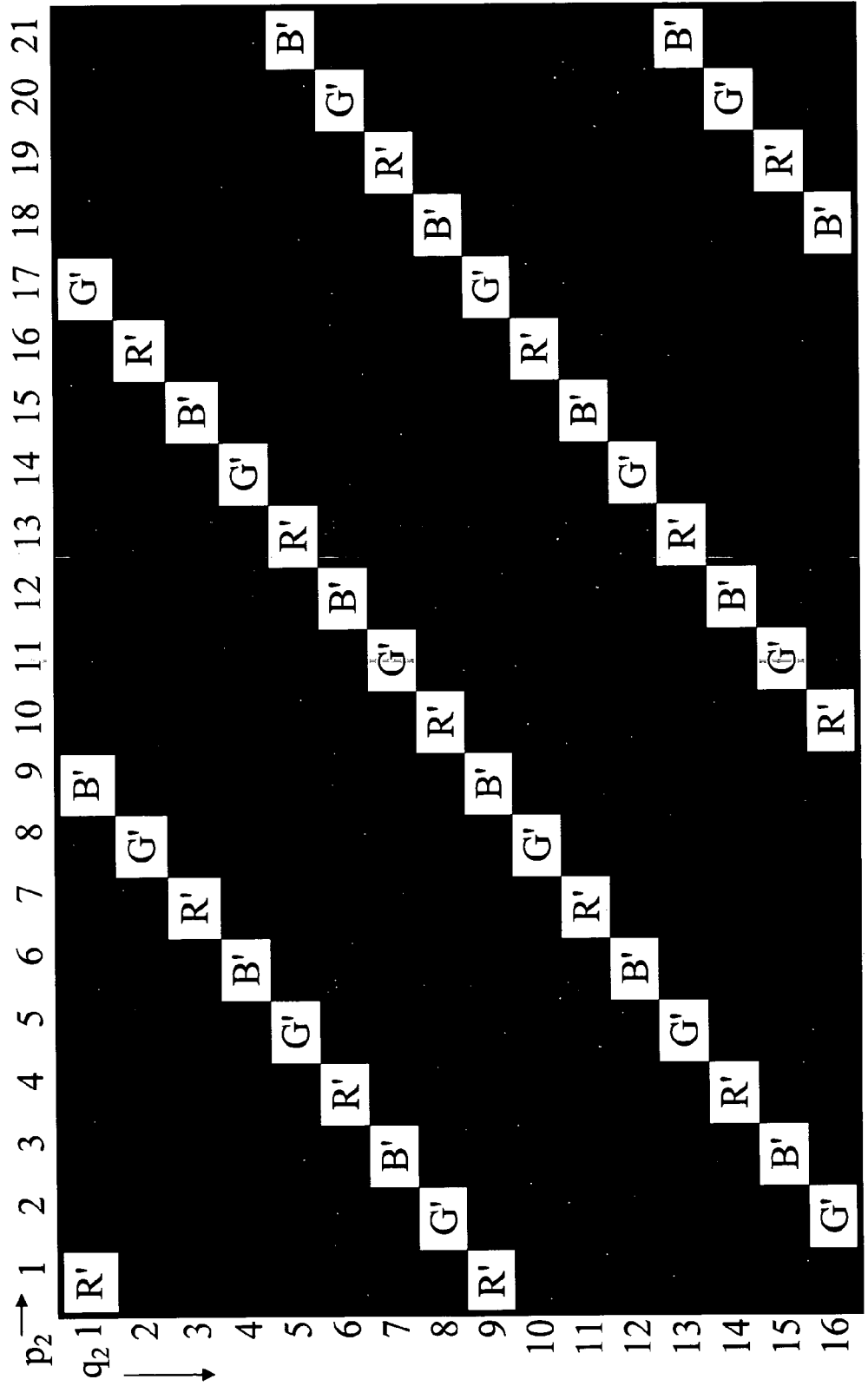
FIG. 14 illustrates the observer-side filter array of the third embodiment of the invention (detail)

FIG. 14 shows a detail of the observer-side filter array $F_2$ of the third embodiment of the invention. Here, $b_{2max}=4$, with three transmission wavelengths or wavelength ranges $\lambda_{2,1}, \lambda_{2,2}, \lambda_{2,3}$ being assigned to the transmission wavelength ranges red, green and blue (in this order), whereas a fourth transmission wavelength range $\lambda_{2,4}$ completely blocks visible light. The coefficient matrix $d_{2pq}$ is generated by the rule:

$$d_{2pq} = \frac{p_2 - 1 - (p_2 \bmod 3)}{q_2} \delta((p_2+q_2) \bmod 8) + \left(\frac{p_2-4}{q_2}\right) \delta[\delta((p_2+q_2) \bmod 8)]$$

in which $n_{2m}=8$, and "mod" designates the residual class with regard to a divisor. The function $\delta$ sets the value "zero" for all arguments that are unequal to zero; the value of the function resulting for the argument "zero" is 1, because $\delta(0)=1$ and $\delta(x \neq 0)=0$. The indices $p_2, q_2$ vary to adopt all possible values lying within the filter matrix to be generated; these are, e.g., values from 1 to 3840 for $p_2$, and from 1 to 768 for $q_2$. Here, a filter element is, e.g., approximately 0.285 mm wide and 0.804 mm high, other dimensions being feasible as well.

Filter array $F_1$ is arranged at a distance of $z_1=2$ mm, and filter array $F_3$ at a distance of $z_3=1$ mm, behind the projection screen. For filter array $F_2$, the distance $z_2=(-)45$ mm; this array is located in front of the projection screen (in viewing direction), which is indicated by the minus sign.

If the projectors are aligned as described above, the image structure produced is approximately like that shown as a detail in FIG. 15. The grid with columns i and rows j has been drawn as a reference only; of course it is not necessarily visible on the projection screen 3. The image formed on the projection screen, composed of different bits of partial information of the views $A_k$, thus shows a grid of image rendering elements $\alpha_{ij}$ in columns i and rows j. The image rendering elements $\alpha_{ij}$ may display light of altogether different wavelength ranges, depending on what light is received from the projectors at the respective spot of the projection screen. If, in this exemplary embodiment, DMD/DLP projectors are used, the image rendering elements here, because of the second projector-side filter array $F_3$, are no full-color pixels $\alpha_{ij}$ but pixels that display, as a rule, light of the wavelength ranges for red, green or blue. In FIG. 15 this is indicated by the columns designated R, G and B.

Because of the light propagation directions defined by means of filter array $F_2$, an observer 5 will see, from every viewing position, predominantly bits of partial information of a first selection of views $A_k$ with one eye and predominantly bits of partial information of a second selection with the other eye, so that he will have a spatial impression from a multitude of viewing positions.

Let it be noted here that, in this third exemplary embodiment, too, the three filter arrays $F_1, F_2$ cannot be made completely congruent by horizontally and/or vertically linear scaling. In other words, the structures of the respective filter arrays do not turn into each other by one- or two-dimensional magnification or demagnification. With regard to the spatial impression, this lack of congruence has the effect that the eye of an observer will, from actually every viewpoint, always see a mix of bits of partial information from several views.

The projection screen is translucent and preferably also comprises a carrier substrate, e.g. a glass plate. In addition, it may have a light-concentrating effect, i.e. a positive gain. Excellent definition of the image rendering elements on the projection screen is achieved if the projection screen is designed as a very thin wafer, preferably with a thickness of less than one millimeter. In this third embodiment, the projection screen 3 is a flat plate.

Here again, the projectors used are furnished with image data by an electronic control system, which may comprise one or several separate units. Each of the filter arrays $F_1, F_2$ and $F_3$ is designed as an exposed film. Each of them is laminated onto a substrate, e.g., a glass substrate.

A fourth exemplary embodiment also uses an arrangement acc. to FIG. 1; here again, eight projectors are used instead of the four projectors on the drawing. Each of the eight projectors again projects a complete 2D view of the scene or object, so that eight views are displayed. Again, the optical axes of the projectors 4 intersect preferably at the face center of the projection screen 3, with two neighboring optical axes including an angle of, e.g., approximately 3.5 degrees. The projectors 4 are aligned accordingly, and their projection lenses have a distance of, e.g., 2900 mm from the face center of the projection screen 3. Advantageously, the projectors may be arranged on a circular arc, the center of the circle being the said face center. Preferably, all projector lenses are at the same height behind the projection screen, viz. approximately at the height of the face center of the projection screen. To ensure such a location, an appropriately dimensioned mechanical tripod can be used, for example.

Figure 16:
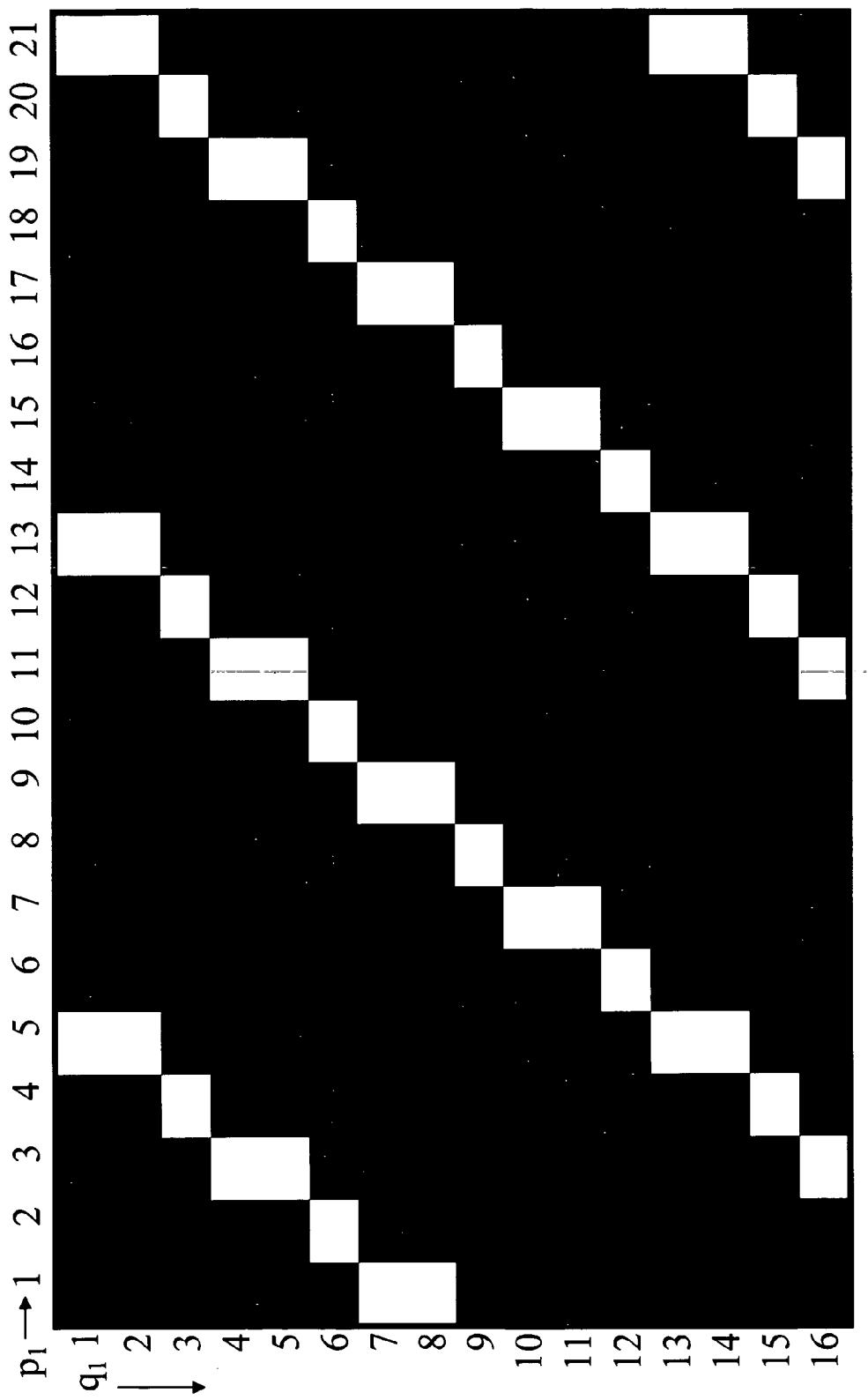
FIG. 16 illustrates the projector-side filter array of a fourth embodiment of the invention (detail), also suitable for eight projectors.

FIG. 16 illustrates a detail of the projector-side filter array $F_1$ of the fourth embodiment of the invention. The wavelength filter elements $\beta_{1pq}$ in the raster of rows $q_1$ and columns $p_1$ are arranged according to the rule described repeatedly before; the parameters selected here are as follows: $\lambda_{1,1} \ldots \lambda_{1,4}$ and $\lambda_{1,6} \ldots \lambda_{1,8}$ are wavelength ranges blocking the entire visible spectrum, $\lambda_{1,5}$ is a filter range transparent to the visible spectrum; $b_{1max}=8$, $n_{1m}=8$, and $$d_{1pq} = \frac{p_1 - \left(IntegerPart\left(p_1 + \frac{2q_1}{3}\right) \bmod 8\right)}{q_1}$$

Here, a transparent or opaque filter element is, e.g., approximately 0.2847 mm wide and approximately 0.8044 mm high. Other embodiments are also feasible, of course.

Figure 17:
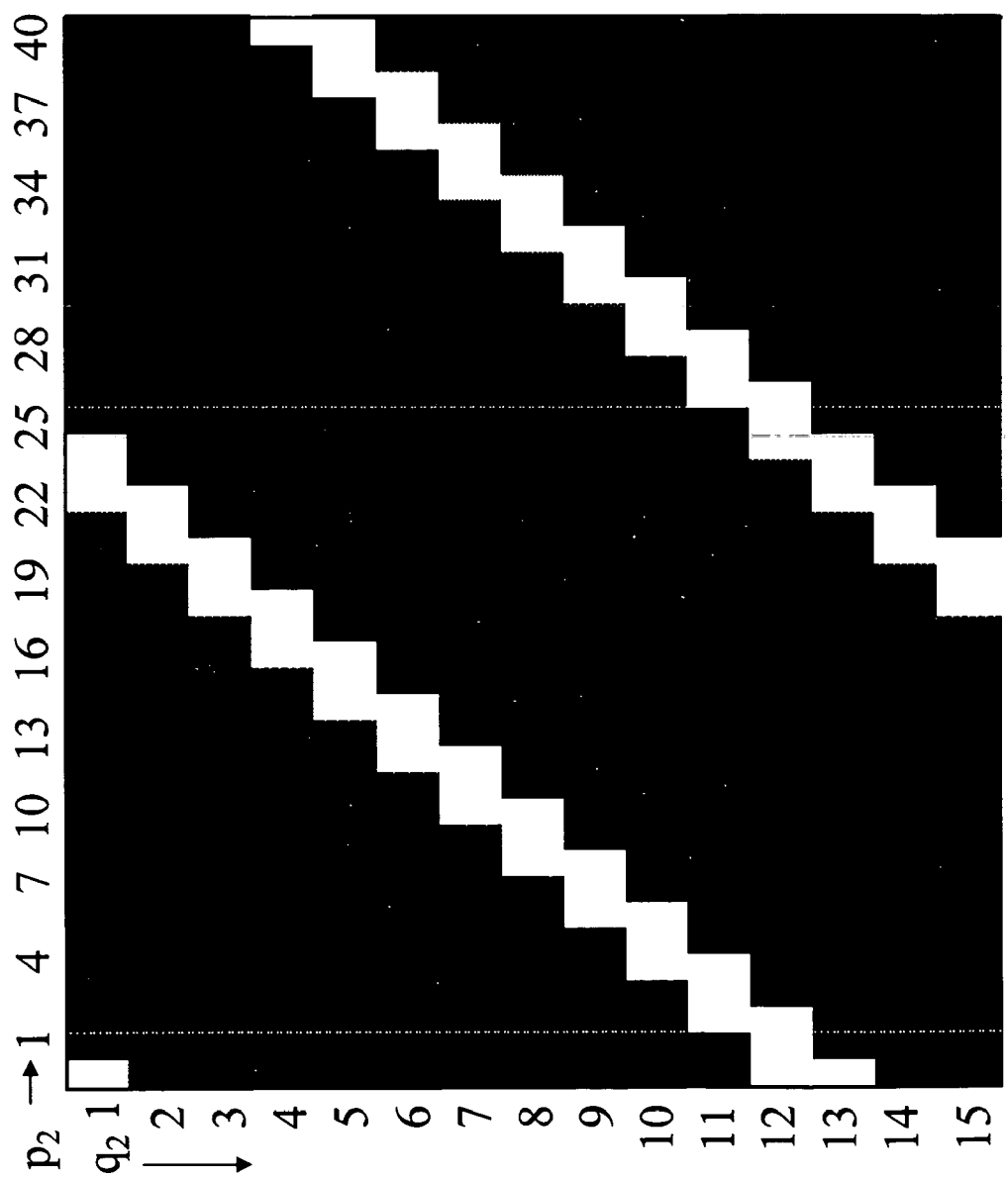
FIG. 17 illustrates the observer-side filter array of the fourth embodiment of the invention (detail)

FIG. 17 shows a detail of the observer-side filter array $F_2$ of the fourth embodiment of the invention. $\lambda_{2,4} \ldots \lambda_{2,24}$ are wavelength ranges blocking the entire visible spectrum; $\lambda_{2,1} \ldots \lambda_{2,3}$ are filter ranges transparent to the visible spectrum; $b_{2max}=24$, $n_{2m}=24$ and $$d_{2pq} = \frac{p_2 - (IntegerPart(p_2 + 2 \cdot q_1) \bmod 24)}{q_2}$$

Here, a transparent or opaque filter element is, e.g., approximately 0.095 mm wide and approximately 0.804 mm high, other dimensions being realistic as well.

Filter array $F_1$ is arranged at a distance of $z_1=2$ mm behind the projection screen. For array $F_2$, the distance is $z_2=(-)45$ mm; this array is located in front of the projection screen (in viewing direction), which is indicated by the minus sign.

To improve the image contrast, the filter array $F_2$, which is located closest to the observer, is preferably provided with an antireflection coating. This reduces reflections of extraneous light and improves the visibility of the spatial image.

If the projectors are aligned as described above, the image structure produced is approximately like that shown as a detail in FIG. 18. The grid with columns i and rows j has been drawn as a reference only; of course it is not necessarily visible on the projection screen 3. The image formed on the projection screen, composed of different bits of partial information of the views $A_k$, thus shows a grid of image rendering elements $\alpha_{ij}$ in columns i and rows j. The image rendering elements $\alpha_{ij}$ may display light of altogether different wavelength ranges, depending on what light is received from the projectors at the respective spot of the projection screen. If, in this exemplary embodiment, DMD/DLP projectors are used, the image rendering elements are full-color pixels $\alpha_{ij}$.

With correct alignment, the arrangement according to the invention is particularly efficient with regard to the utilization of the light and of the area, since every element of the projection screen area can receive light from at least one of the projectors. In this way, there will not be any "permanently black spots" on the screen, so that every element of the projection screen area displays some bit of partial information of at least one of the views $A_k$.

Figure 19:
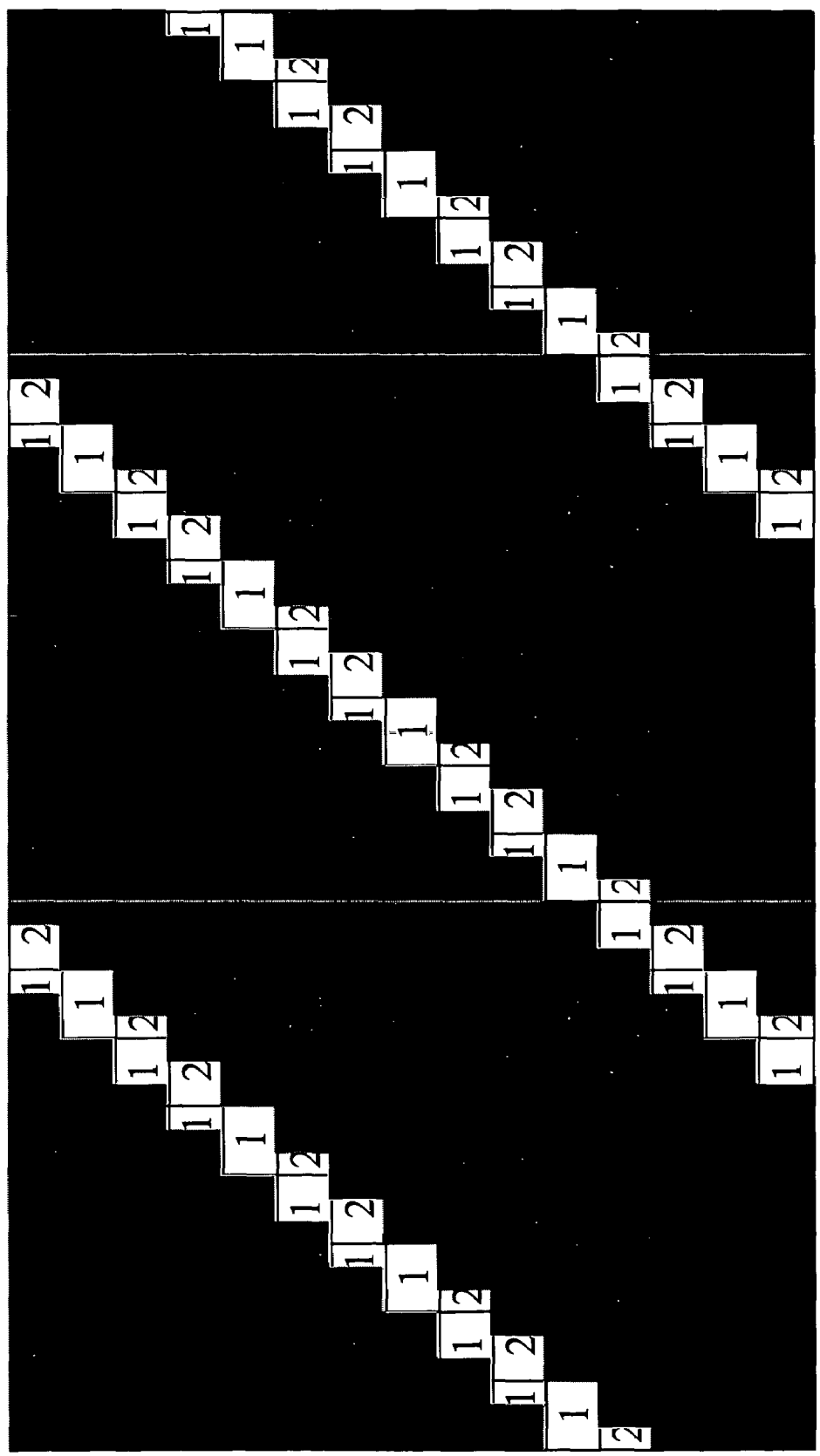
FIG. 19 and FIG. 20 illustrate a possible mix of views each visible to an observer's eye in a viewing position in the fourth embodiment of the invention (detail)
Figure 20:
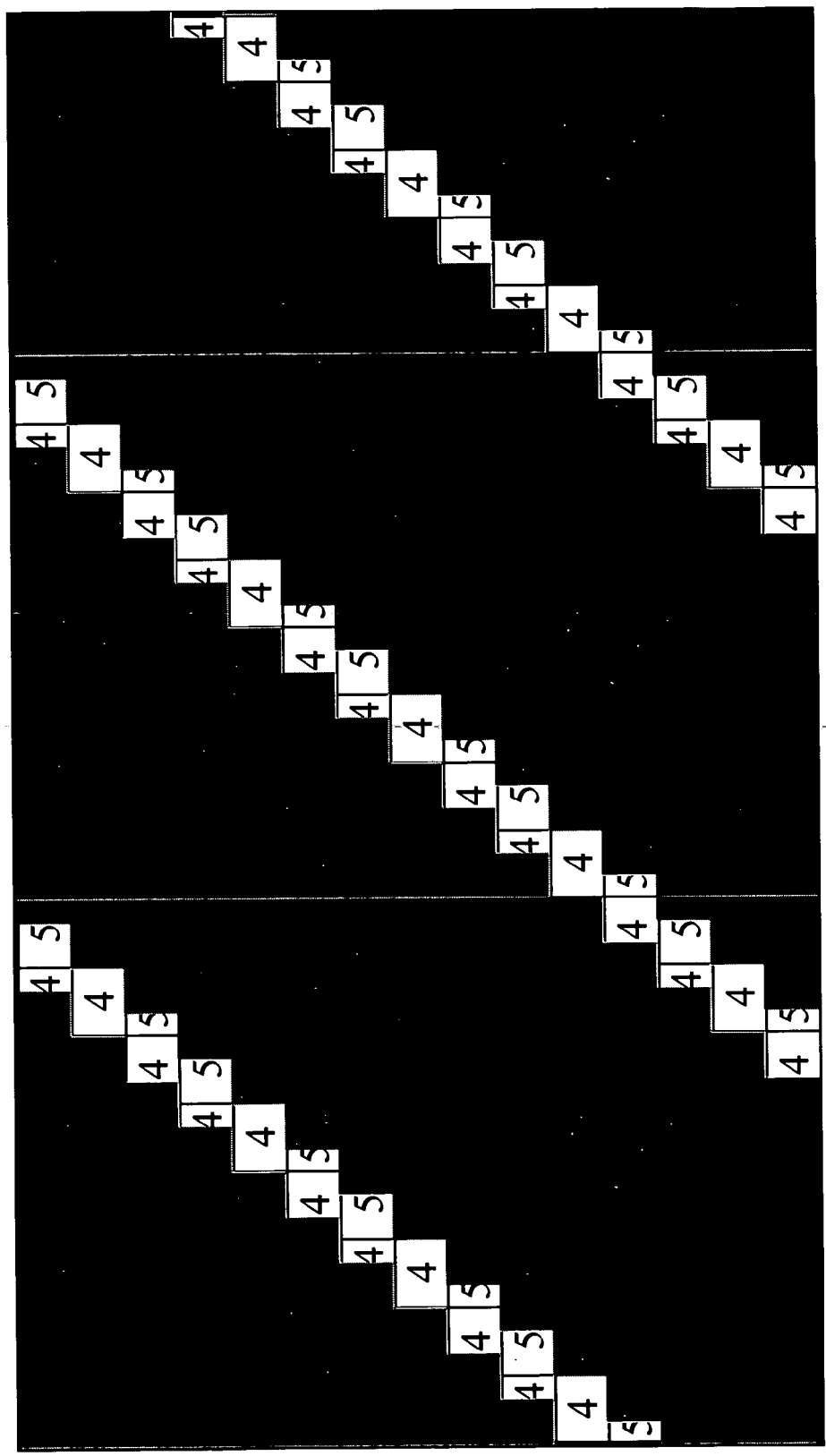

Because of the light propagation directions defined by means of filter array $F_2$, an observer 5 will see, from every viewing position, predominantly bits of partial information of a first selection of views $A_k$ with one eye and predominantly bits of partial information of a second selection with the other eye, so that he will have a spatial impression from a multitude of viewing positions. FIG. 19 and FIG. 20 each show details of a possible mix of views that can be seen by an observer's eye in a viewing position if the first embodiment of the invention is used. In the first position acc. to FIG. 19, the observer's eye will, e.g., predominantly see the views 1 and 2, whereas in the second example position acc. to FIG. 20, it will predominantly see the views 4 and 5. If each of the observer's eyes sees one of the mixes of views, the observer will have a spatial impression.

Let it be noted again that, in this fourth exemplary embodiment, too, the three filter arrays $F_1$, $F_2$ cannot be made completely congruent by horizontally and/or vertically linear scaling. In other words, the structures of the respective filter arrays do not turn into each other by one- or two-dimensional magnification or demagnification. With regard to the spatial impression, this lack of congruence has the effect that the eye of an observer will, from actually every viewpoint, always see a mix of bits of partial information from several views (see also the view mix examples in FIG. 19 and FIG. 20). This completely excludes the case that an observer's eye in any position in the viewing space sees bits of partial information from exactly one of the views.

The projection screen is translucent and preferably also comprises a carrier substrate, e.g. a glass plate. In addition, it may have a light-concentrating effect, i.e. a positive gain. Excellent definition of the image rendering elements on the projection screen is achieved if the projection screen is designed as a very thin wafer, preferably with a thickness of less than one millimeter. In this fourth embodiment, the projection screen is a flat plate.

Here again, the projectors used are furnished with image data by an electronic control system, which may comprise one or several separate units. Each of the filter arrays $F_1$ and $F_2$ is designed as an exposed film. Each of the filter arrays $F_1$, $F_2$ is laminated onto a substrate, e.g., a glass substrate. This provides for good mechanical stability. In the arrangement acc. to FIG. 1, both filter arrays $F_1$, $F_2$ are always arranged on the glass substrate sides facing the projectors 4.

A fifth exemplary embodiment also uses an arrangement acc. to FIG. 1; here, however, only one projector is employed instead of the four projectors 4 shown on the drawing. The projector is, e.g., a DMD/DLP projector and shows, in periodic succession, red, green and blue images, with the red image corresponding to view $A_1$ (k=1), the green one to view $A_2$ (k=2), and the blue one to view $A_3$ (k=3). Altogether, n=3 views are presented.

The optical axis of the projector is preferably directed at the face center of the projection screen 3. The projection lens has a distance of, e.g., 2000 mm from the face center of the projection screen 3. The projection lens is approximately at, or below, the height of the face center of the projection screen.

FIG. 21 illustrates a detail of the projector-side filter array $F_1$ of the fifth embodiment of the invention. The wavelength filter elements $\beta_{1pq}$ in the raster of rows $q_1$ and columns $p_1$ are arranged according to the rule described repeatedly before; the parameters selected here are as follows: $\lambda_{1,1}$ is a transmission wavelength range for blue light, $\lambda_{1,2}$ a transmission wavelength range for red light, and $\lambda_{1,3}$ a transmission wavelength range for green light; $b_{1max}=3$, $n_{1m}=3$, and $d_{1pq}=-1=$const. Here, a filter element is, e.g., approximately 0.285 mm wide and 0.804 mm high. Other embodiments are also feasible, of course.

FIG. 22 shows a detail of the observer-side filter array $F_2$ of the fifth embodiment of the invention. The respective parameters are: $\lambda_{2,1}$ and $\lambda_{2,3}$ are wavelength ranges blocking the entire visible spectrum; $\lambda_{2,2}$ is a filter range transparent to the visible spectrum; $b_{2max}=3$, $n_{2m}=3$, and $d_{2pq}=-1=$const. Here again, a transparent or opaque filter element is, e.g., approximately 0.285 mm wide and 0.804 mm high, other dimensions being feasible as well.

Filter array $F_1$ is arranged at a distance of $z_1=2$ mm behind the projection screen. For filter array $F_2$, the distance is $z_2=(-)45$ mm; this array is located in front of the projection screen (in viewing direction, which is indicated by the minus sign. To improve the image contrast, the filter array $F_2$, which is located closest to the observer, is preferably provided with an antireflection coating. This reduces reflections of extraneous light and improves the visibility of the spatial image.

If the projectors are aligned as described above, the image structure produced is approximately like that shown as a detail in FIG. 23. The grid with columns i and rows j has been drawn as a reference only; of course it is not necessarily visible on the projection screen 3. The image formed on the projection screen, composed of different bits of partial information of the views $A_k$, thus shows a grid of image rendering elements $\alpha_{ij}$ in columns i and rows j. The image rendering elements $\alpha_{ij}$ display light of altogether different wavelength ranges: in accordance with the geometry of arrangement, the visible bits of partial information of view $A_1$ (k=1) are red, those of view $A_2$ (k=2) are green, and those of view $A_3$ (k=3) are blue.

Because of the light propagation directions defined by means of filter array $F_2$, an observer 5 will see, from every viewing position, predominantly bits of partial information of a first selection of views $A_k$ with one eye and predominantly bits of partial information of a second selection with the other eye, so that he will have a spatial impression from a multitude of viewing positions.

Let it be noted again that in this fifth exemplary embodiments, too, the two filter arrays $F_1$, $F_2$ cannot be made to be completely congruent by horizontal and/or vertical linear scaling of their structures; her, in particular, this is prevented by the specified different transmission wavelength ranges of the two filter arrays $F_1$, $F_2$.

The projection screen is translucent and preferably also comprises a carrier substrate, e.g. a glass plate. In addition, it may have a light-concentrating effect, i.e. a positive gain. Excellent definition of the image rendering elements on the projection screen is achieved if the projection screen is designed as a very thin wafer, preferably with a thickness of less than one millimeter. In this fifth embodiment, the projection screen is a flat plate.

Here again, the projector used is furnished with image data by an electronic control system. Because of the spectral separation of the views, it is recommendable that the control system is a PC controlled by appropriate software. Each of the filter arrays $F_1$ and $F_2$ is designed as an exposed film. Each of the filter arrays $F_1$, $F_2$ is laminated onto a substrate, e.g., a glass substrate. This provides for good mechanical stability. In the arrangement acc. to FIG. 1, both filter arrays $F_1$, $F_2$ are always arranged on the glass substrate sides facing the projectors 4.

Figure 24:
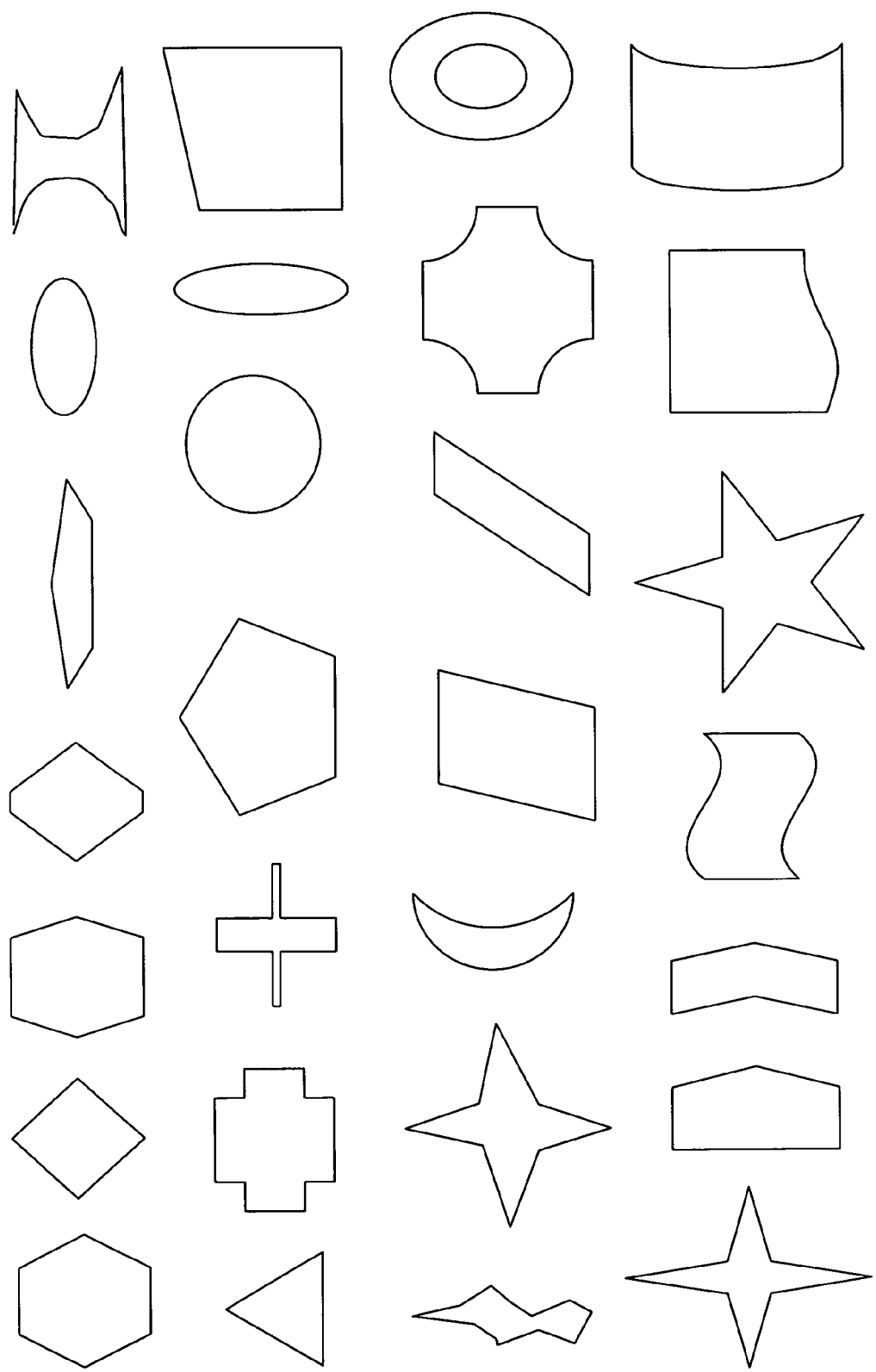
FIG. 24 illustrates diverse possible outlines of filter elements in the arrangements according to the invention.

As mentioned before, it is possible to use, with all described embodiment versions of the invention, filter elements not only with the particularly preferable rectangular outlines but also with other outlines. FIG. 24 shows various filter element outlines that can be used in arrangements according to the invention; under certain circumstances, a filter array may simultaneously contain filter elements with at least two different outlines. Such outlines can be used for avoiding moiré effects. It may also be of advantage if concave and convex filter element outlines are arranged in such a way as to be interlocked. In this context, the term "dimensions" of filter elements denotes the distances between the outermost points in the horizontal and vertical directions.

Very special requirements with regard to image combination structure or the specified light propagation directions can be met, under certain circumstances, if individual filter elements themselves have a transmission wavelength range in the form of a graded-wavelength bandpass filter or a neutral density transmission property in the form of a continuous neutral density wedge.

The invention is excellently useful in the fields of entertainment (3D movies) and product presentation. The special emphasis is on the fact that, depending on the embodiment, several observers can view a large-size, brilliant 3D image with a fairly large freedom of movement. The invention can be embodied with components that are readily available or can be easily manufactured.

Figure 25:
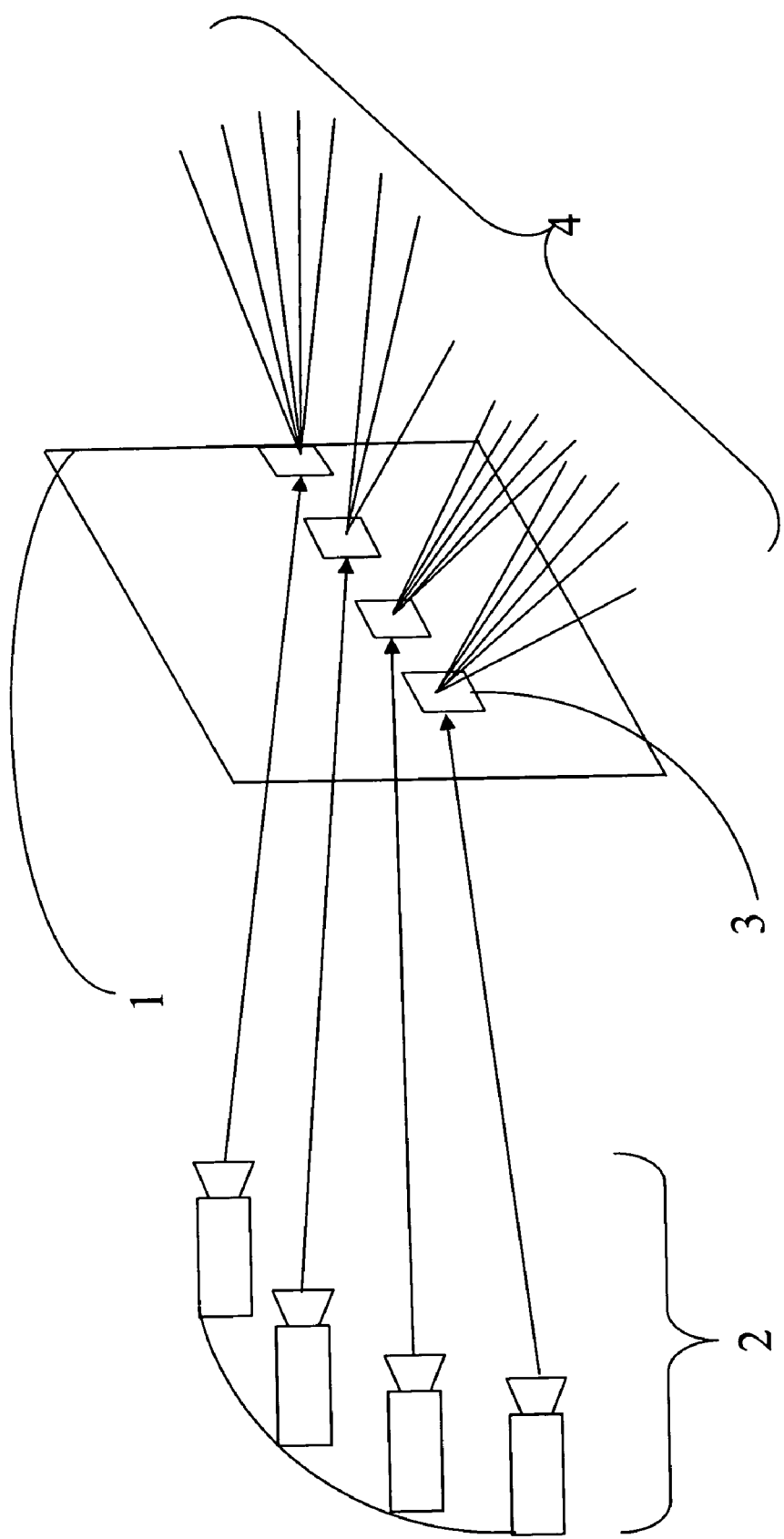
FIG. 25 is a sketch illustrating the principle of constructing an arrangement according to the invention with back-projection.

FIG. 25 is a schematic, not-to-scale sketch illustrating the principle design of an example arrangement according to the invention with back-projection. Several (e.g., eight) projectors 2, of which the drawing shows only four, are arranged behind a holographic screen 1. Four of the image rendering elements 3 are shown extremely magnified; they are struck by light coming from different directions such as here, e.g., from different projectors 2. The image rendering elements of the holographic screen 3 display the light rays in different light propagation directions 4. All directions are drawn only schematically. In practical implementation, the image rendering elements 3 would first be significantly smaller than the dimensions of the entire holographic screen 1, and they would be directly adjacent to each other, as a rule. In FIG. 25, the neighboring image rendering elements 3 are shown separated merely for greater clarity.

Here, each projector 2 projects, e.g., a (another) two-dimensional view of a scene or object, so that altogether eight views are projected. Thanks to the front-side light propagation directions 4 for all light rays incident from the rear side, defined by the holographic screen 1 or its imaging HOEs, an observer 5 will see, from every viewing position, predominantly bits of partial information of a first selection of views $A_k$ with one eye and predominantly bits of partial information of a second selection with the other eye, so that he will have a spatial impression from a multitude of viewing positions. The viewing space would be, e.g., to the right of the holographic screen 1.

Figure 26:
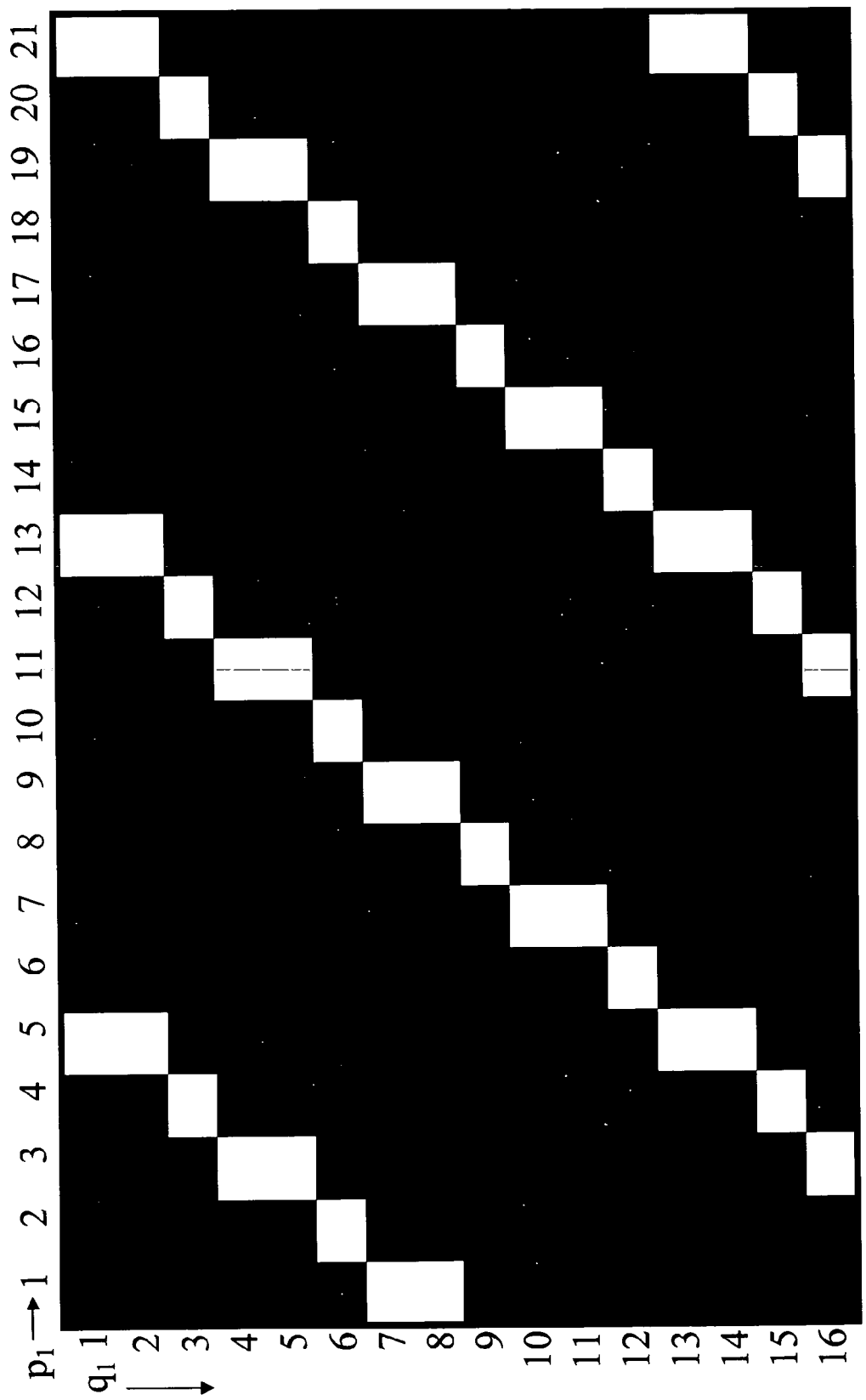
FIG. 26 illustrates an exemplary first filter structure implemented by at least one HOE or simultaneously several HOEs (detail)

As an example, each HOE could implement the optical imaging effect according to item g) of the backprojection arrangement according to the invention. A first filter structure for that purpose, implemented by one or simultaneously several HOEs, could be, e.g., the structure shown in FIG. 26 or a segment of it. At a certain distance, e.g. 4 millimeters, the HOE, or each HOE, would further implement a diffusely transparent opal screen. Finally, another observer-side filter array structure would be provided (e.g., at a distance of 4 millimeters), which is included in the imaging effect of each individual HOE. FIG. 27 shows an example of the last-named filter array structure.

For better understanding it may be noted that HOEs, of all devices, are capable of storing and restoring information about an entire spatial object to be implemented (here, e.g., a filter array or part of it), even though they are considerably smaller than the object to be implemented.

Figure 28:
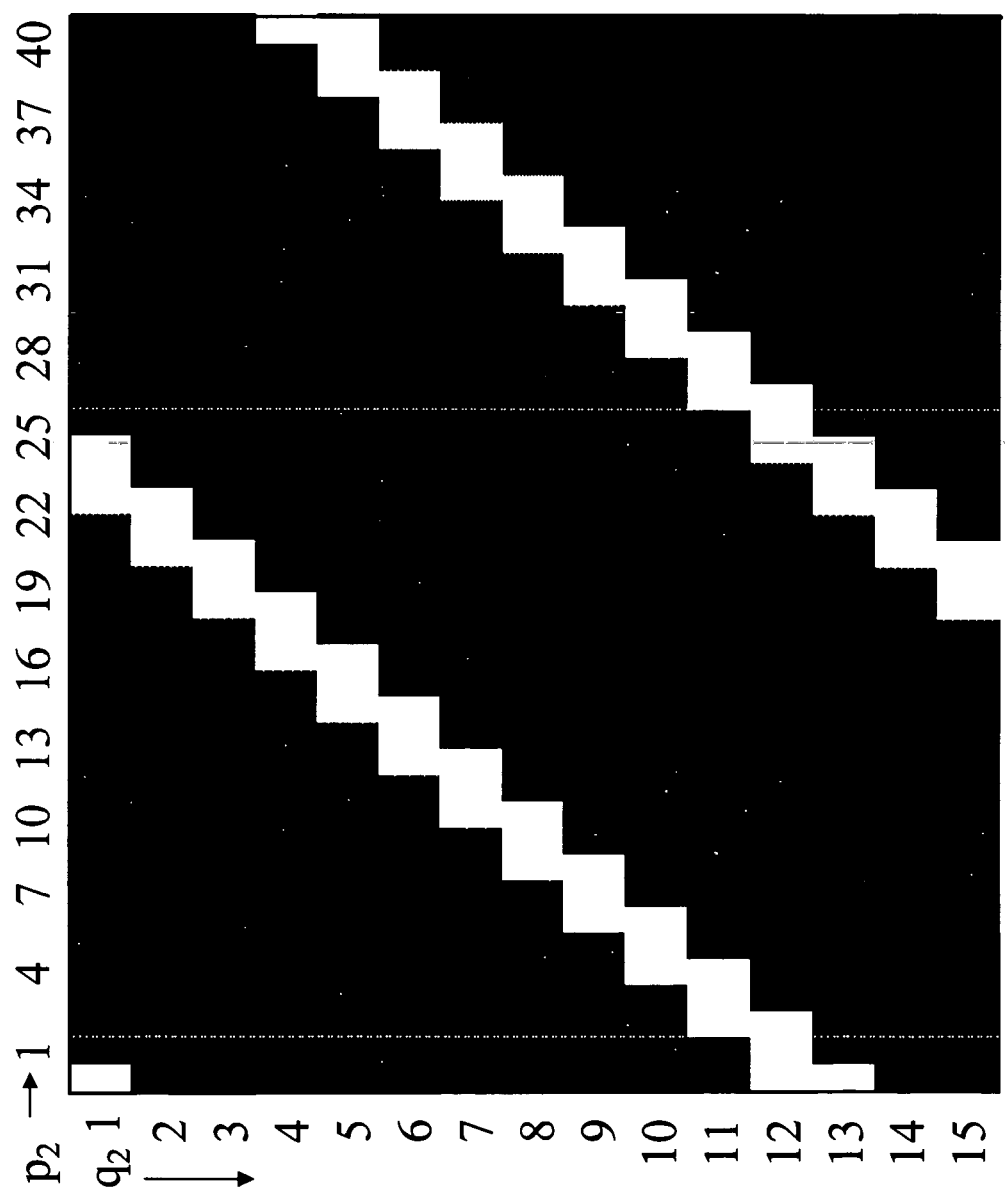
FIG. 28 illustrates an exemplary image combination structure for the composition of an image from bits of partial image information of several views.

If, now, the eight projectors 2 project the eight different views onto the holographic screen, the respective diffusing screens implemented by the multitude of HOEs can be imagined to produce an image combination structure of bits of image information, a detail of which is shown in FIG. 28.

Figure 29:
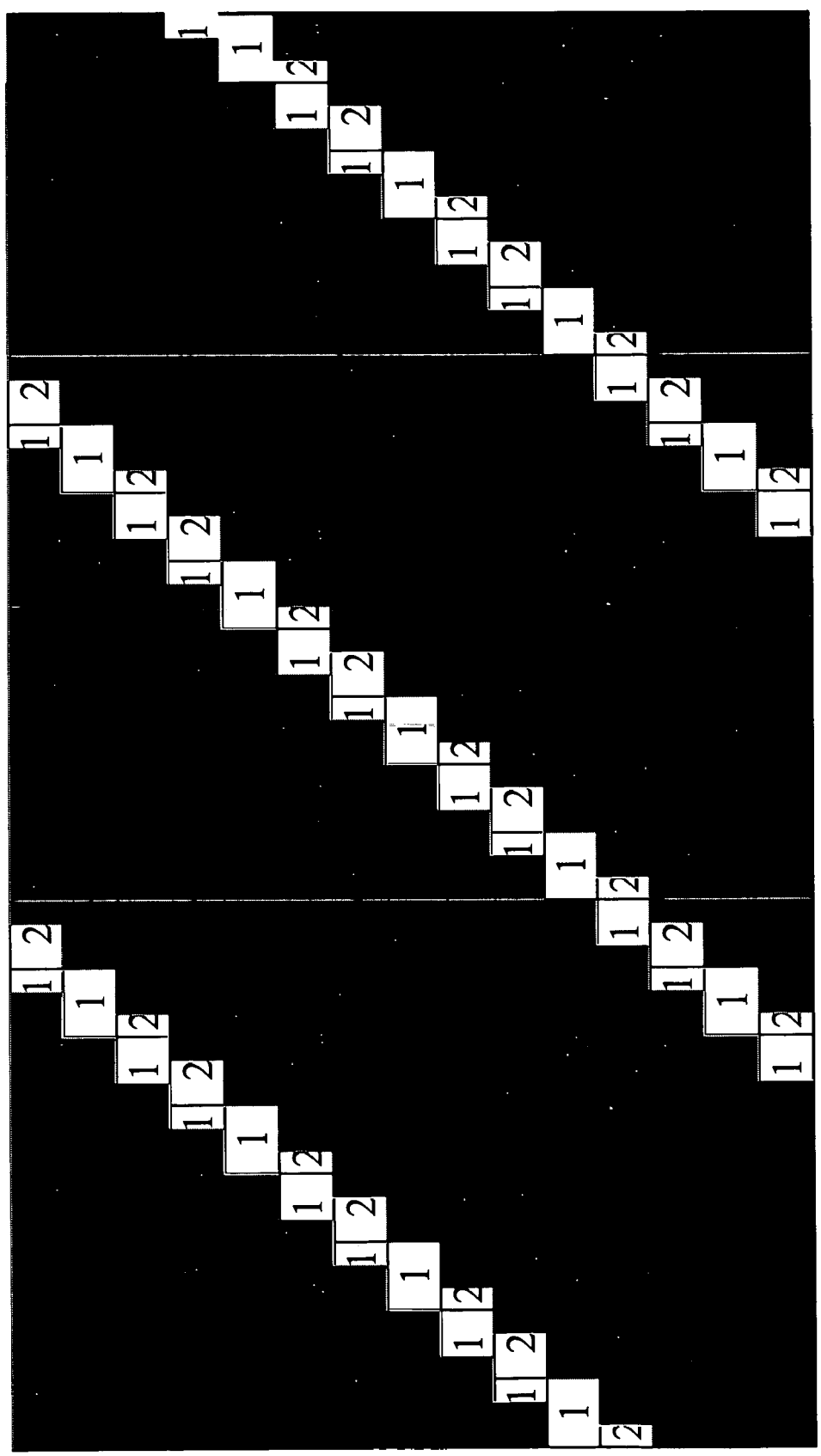
FIG. 29 and FIG. 30 illustrate exemplary views mixes visible to one eye each.

Further, the filter elements of the observer-side filter array, implemented by the HOEs, again define front-side light propagation directions, so that an observer's eye in a particular viewing position would, e.g., predominantly see view 1, but also a smaller amount of bits of partial image information of view 2, as shown in FIG. 29.

Figure 30:
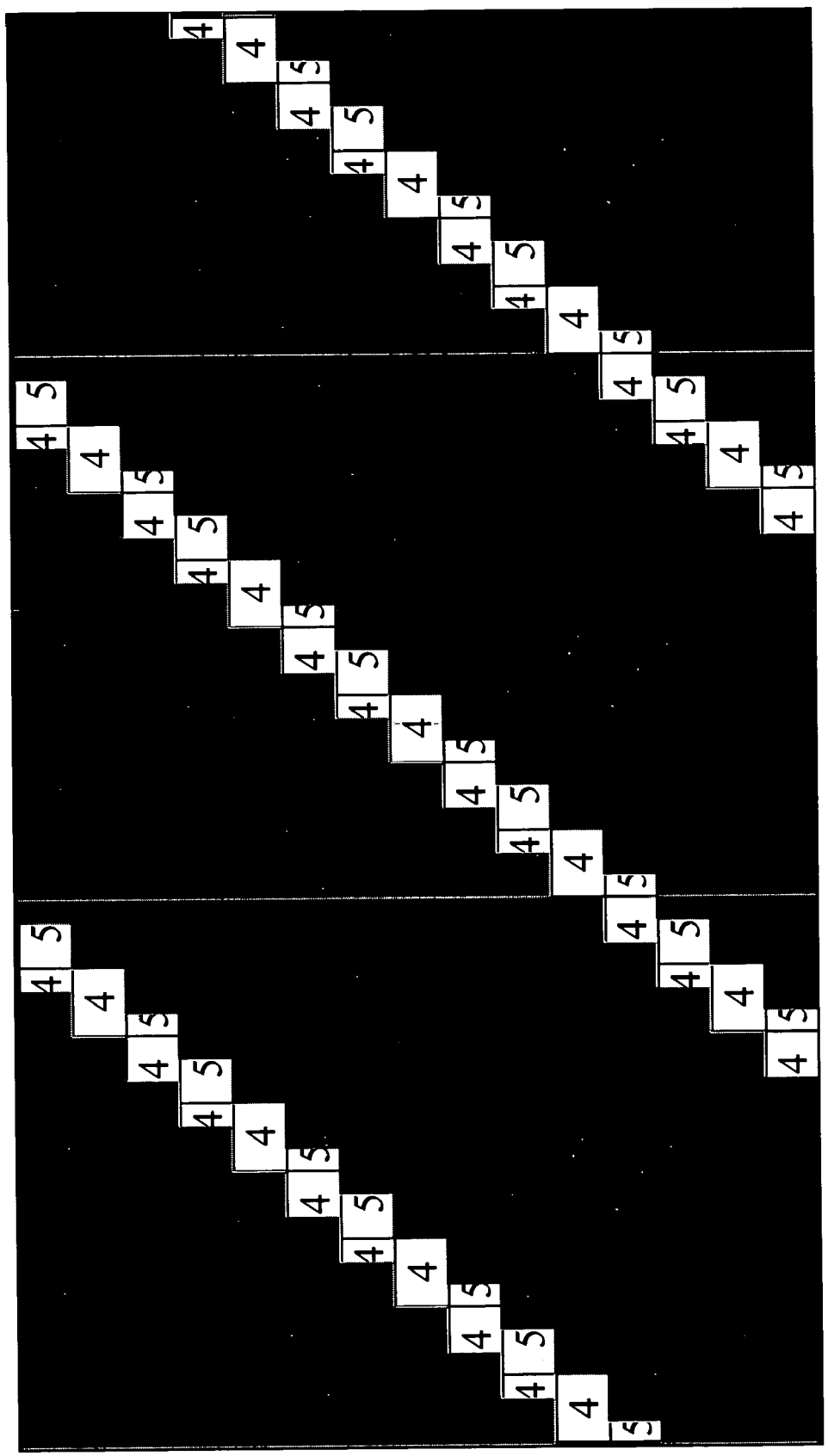

From a corresponding viewing position, the observer's other eye could then, looking at the holographic screen 1, e.g., predominantly see bits of partial image information of view 4 and a smaller amount of bits of partial image information of view 5, as shown in FIG. 30. Since either eye predominantly sees different mixes of views, the observer has a 3d impression.

Figure 31:
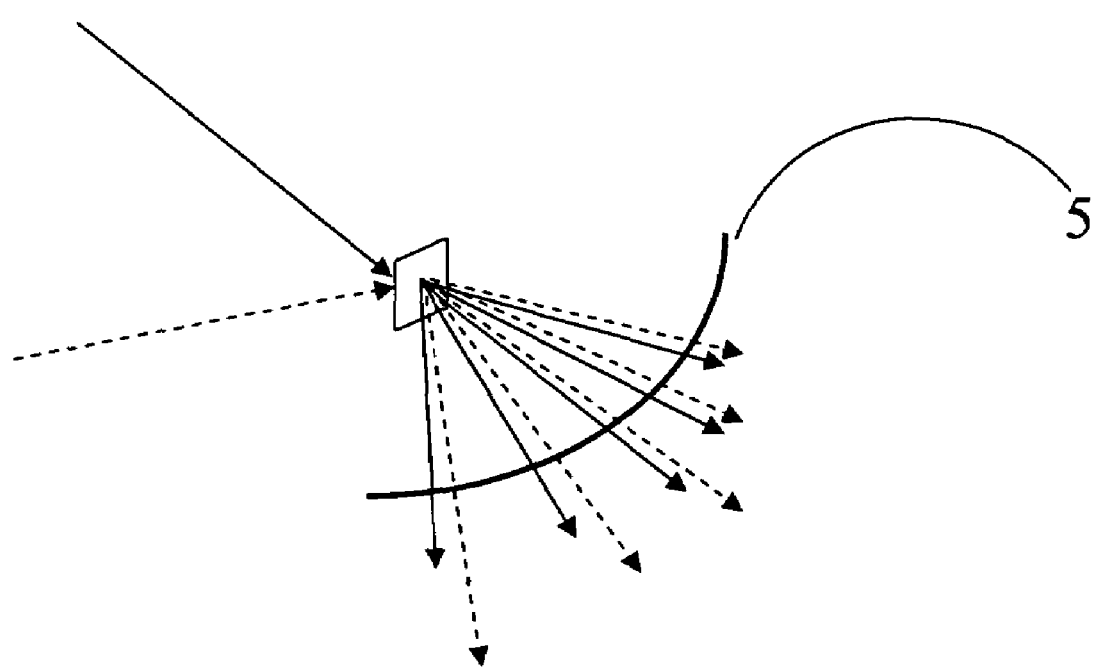
FIG. 31 illustrates another example for the effect of a HOE (shown schematically)

Another example of the effect of an HOE is shown schematically in FIG. 31. An HOE of a holographic screen in an arrangement according to the invention is shown at a high magnification. The rear side of the said HOE is illuminated by light rays incident from different directions and coming, e.g., from different projectors projecting different views. For each incident light ray (the drawing shows only two, one being represented by a solid line, the other by a broken line), the HOE defines several light propagation directions as indicated in FIG. 31. If, for example, the solid line is a light ray representing partial image information of view 1, and the broken line is a light ray representing partial image information of view 2, here the HOE would, for the shown incident light rays alone, define approximately the light propagation directions drawn on the observer side (on the right). If an observer moved along line 5, which is shown with a perspective distortion here and actually lies in a horizontal plane in front of holographic screen, he would see, with one eye, first predominantly bits of partial image information of view 1, then of view 2, and then, if further light rays (not shown on the drawing) were provided representing bits of partial image information of further views, e.g. views 3 through 8, he would see further bits of partial image information predominantly of views 3 through 8, until the cycle began again with view 1.

In this context, "predominantly" means that, according to the invention, the multitude of HOEs define propagation directions that cause an observer's eye to see, as a rule, not only bits of partial image information of exactly one view. To demonstrate this, many more of such HOEs would have to be shown in FIG. 31, but this would make the illustration too confusing.

It is also within the scope of the invention that the light propagation directions to be defined by the HOEs essentially correspond to the respective light intensity maximums rather than to non-divergent light rays alone. In this sense, e.g., also a certain portion of the light of a light propagation direction shown as a broken line in FIG. 31 would reach one (or several) observation points actually lying in the light propagation direction represented by the solid line. In this context, the light propagation directions could be virtually interpreted as scatter lobes rather than scatter lines. Preferably, the scatter lobes are formed in such a way that an HOE, if it also implements, in any position, a preferably diffusely scattering optical element, has a light intensity maximum the course of which extends either vertically or is inclined relative to the vertical.

Figure 32:
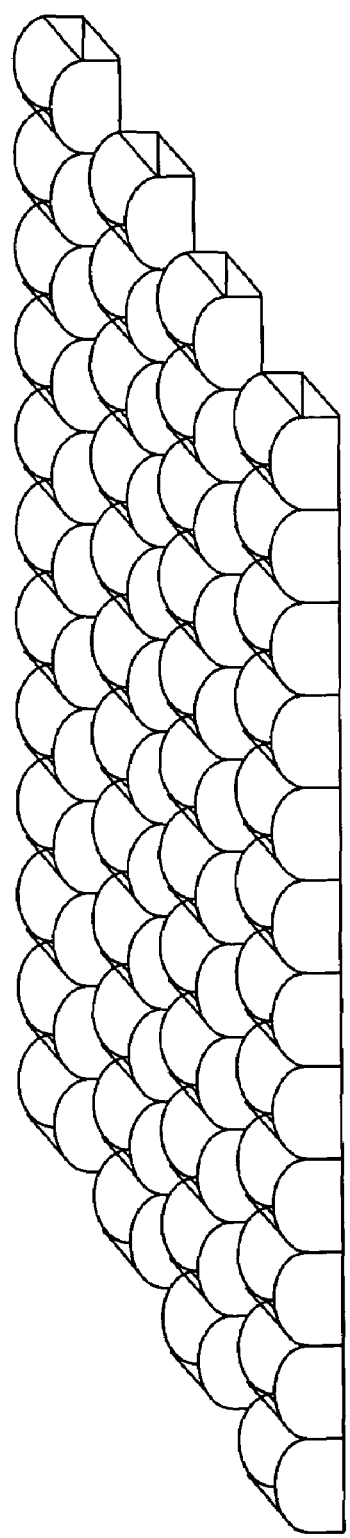
FIG. 32 is an exemplary model illustrating the effect of HOEs on the holographic screen of arrangements according to the invention.

FIG. 32 shows a model of an example illustrating the effect of the HOEs on the holographic screen of arrangements according to the invention. FIG. 32 shows a multitude of cylindrical lenses, with each cylindrical lens being implemented by an HOE. This corresponds to the imaging effect of the HOEs in accordance with HOE feature a).

Characteristically in this example, the periods of the cylindrical lenses are shifted relative to each other from row to row by a distance that here, for example, is approximately one third of the width of a lens (and, thus, of an HOE). One third also corresponds to the non-integral offset relative to an HOE width mentioned before. By means of such an imaging effect of the HOE, it is possible to ensure that light propagation directions are defined for incident light in such a way that, from every viewing position, an observer will see predominantly bits of partial information of a first selection of views $A_k$ with one eye and bits of partial information of a second selection with the other eye, so that he has a spatial impression from a multitude of viewing positions. Of course, this requires that light from different views is projected onto the rear side of the HOEs.

The imaging effect of the HOEs may further comprise that of a diffusely scattering ground glass screen implemented on, or near, the plane face of the grid of cylinder lenses (the lenticular).

Figure 33:
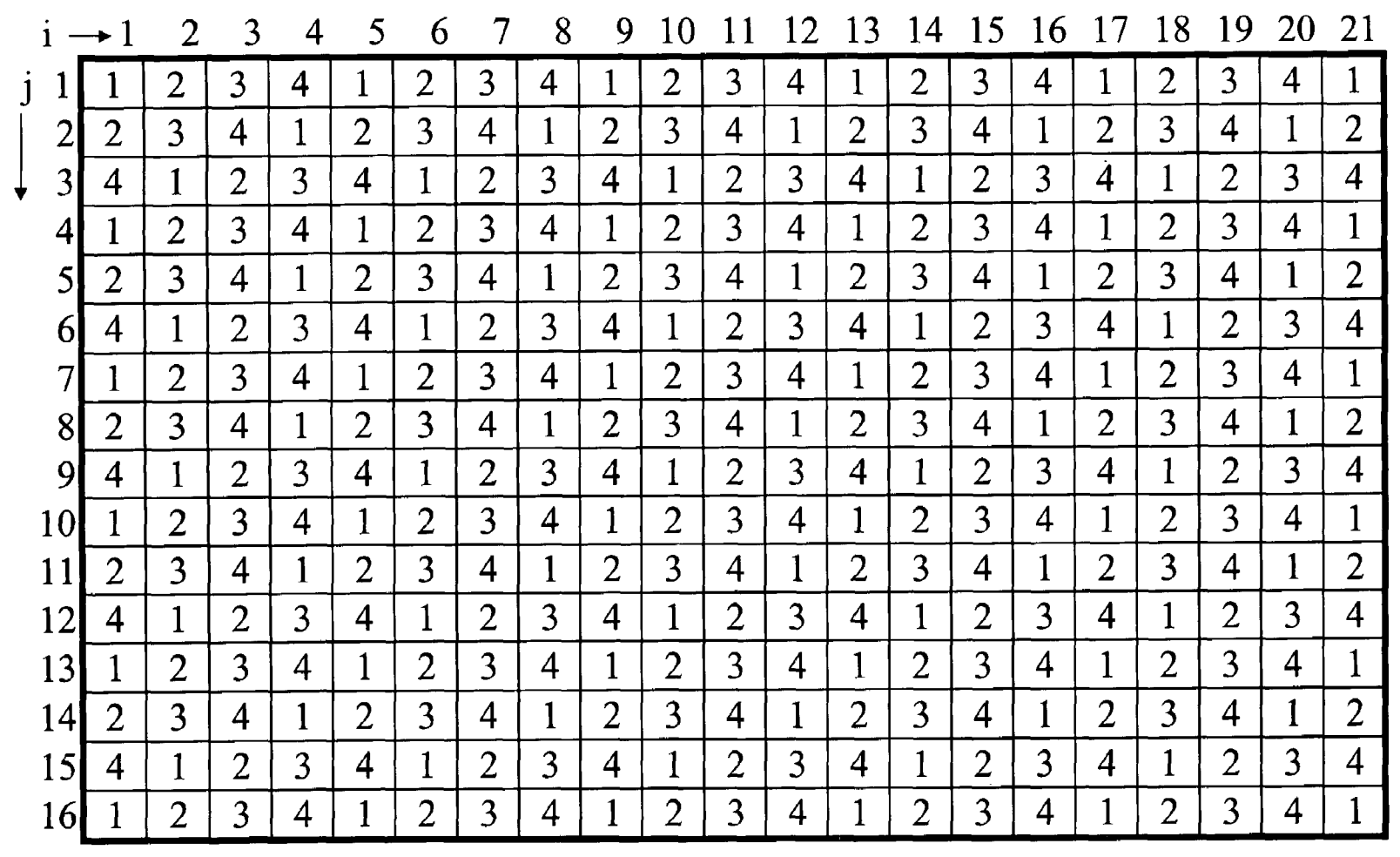

FIG. 33 shows an exemplary image combination structure which uses 4 views and can be used for an image back-projected onto the holographic screen by, e.g., only one projector, to create a spatial impression for observers in the fashion described above (see description of FIG. 32). Here, every box corresponds to an image point projected; the number in the box indicates the view from which the respective image point obtains its image information. The image points are arranged in rows j and columns i.

The plane face of every cylindrical lens (and thus, the projection of its convex surface onto the plane face) has, in one direction, a length approximately equal to the height of a row of image points of the projected image (on the ground glass screen implemented) (e.g., 0.8 mm) and, in the other direction, a width approximately equal to the width of four columns of image points of the projected image (on the ground glass screen implemented) (e.g., 3.2 mm).

Alternatively, the image combination structure acc. to FIG. 33 can be generated by projection of the four views by means of, e.g., four projectors through a suitable filter array, which can also be implemented by the HOEs.

Figure 34:
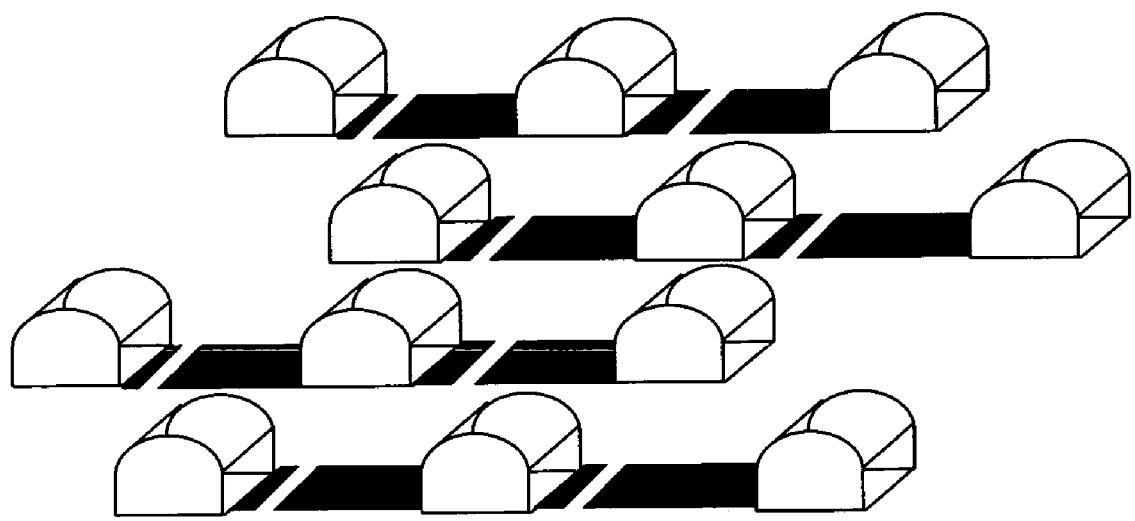
FIG. 34 illustrates another exemplary model illustrating the effect of the HOEs on the holographic screen of arrangements according to the invention.

FIG. 34 shows an exemplary model illustrating the effect of the HOEs on the holographic screen of arrangements according to the invention. For the sake of clarity, only a few HOEs are shown; for the same reason, the rows of the grid are shown slightly staggered, which is not required in practice. FIG. 34 shows a multitude of cylindrical lenses and filter segments; each cylindrical lens and each filter segment (especially if this is located between two HOEs) is implemented by one HOE. This corresponds to the imaging types according to HOE features a) and e). With regard to feature e), different interpretations are possible: Either one HOE implements several (here, e.g., two opaque and one transparent) filter elements, or the different filter elements are implemented by different neighboring HOEs. The optical effect is essentially the same.

Each filter segment may, in addition, be provided with a diffusely scattering area on its projection side, to be implemented in addition by one HOE each. In this case also, bits of partial image information are back-projected from several (e.g., four or eight) views. For the said bits of partial image information of different views, incident on the holographic screen, light propagation directions are defined by the lenses or filter elements simulated by the HOEs, so that a three-dimensional impression is created.

The invention has important advantages over prior art. It permits several observers to see an improved 3D image on a projection system with considerable freedom of movement. Further, the HOEs can implement optical images that cannot be practically implemented with conventional optics unless incompletely or with extreme technical expenditure. Moreover, it is possible to produce 3D projections of large images having dimensions, e.g., of several meters.

Guideline parameters for the holographic 3D back-projection disk to be used in connection with the arrangement according to the invention are given below; they may be varied depending on the application. In particular, the sizes of the angles α and β may be varied as required, in order to optimize the viewing distance. Also, the degree of light transmission should be made as high as possible.

Figure 35:
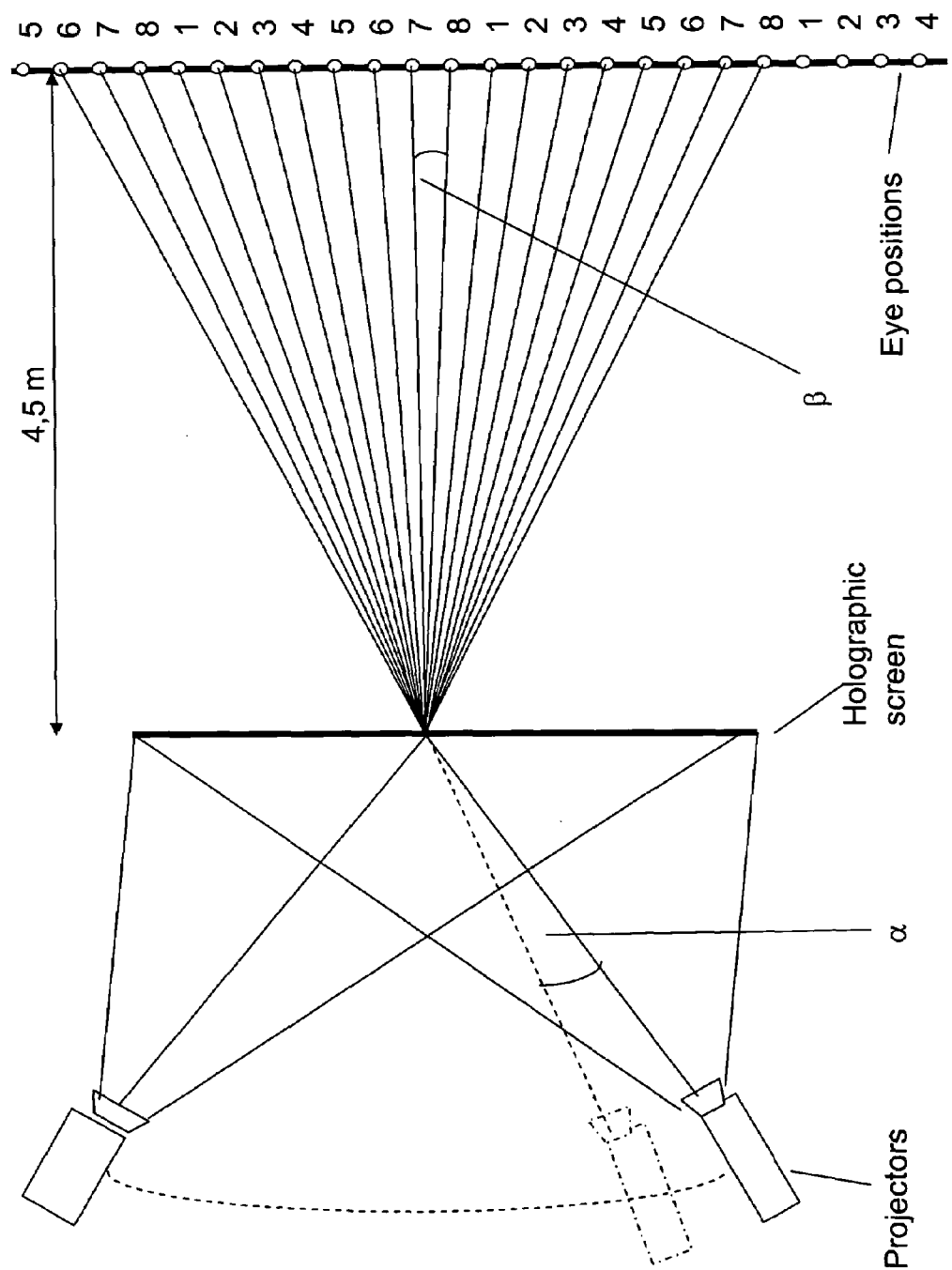
FIG. 35 illustrates an embodiment with a holographic 3D back-projection screen.

FIG. 35 is a top view of a preferred embodiment version in which a holographic back-projection 3D screen is used. It can be seen that several projectors are arranged on a circular arc, with a mean distance of approximately 2 m from the projection screen. The angles α and β are approximately 8.6° and approximately 0.83°, respectively.

The size of angle β has been selected for a viewing distance of 4.5 m between the observer's eyes and the projection screen. As the angle β is increased, the distance between the viewing position and the projection screen decreases. From a distance of 4.5 m, the observer's eyes can no longer resolve the raster underlying the image information, which is favorable for 3D perception. The raster size of the HOE on the projection screen should be approximately 0.1 mm×0.1 mm.

In this arrangement it is possible, e.g., to arrange the viewing positions (each of which corresponds to the eye positions of one observer) either vertically as shown in FIG. 36, or obliquely as shown in FIG. 37.

Identical viewing positions always offer identical mixes of views. In every point of the curves shown, the summed shares of the views yield a value of 1. Some leeway is permissible in smoothing the curves or lines, which yields tolerances for manufacturing the back-projection disk. Accordingly, the sum of shares may deviate from 1 by a few percent.

The vertical arrangement of the viewing positions acc. to FIG. 36 is preferably suitable for 3D movie theaters with a fixed arrangement of seats, as viewing is independent of seat height. By contrast, the oblique arrangement of viewing positions acc. to FIG. 37 is convenient for 3D perception by moving viewers. This is essentially due to the fact that, because of the inclination, there are no completely blind spots in the room.

Figure 38:
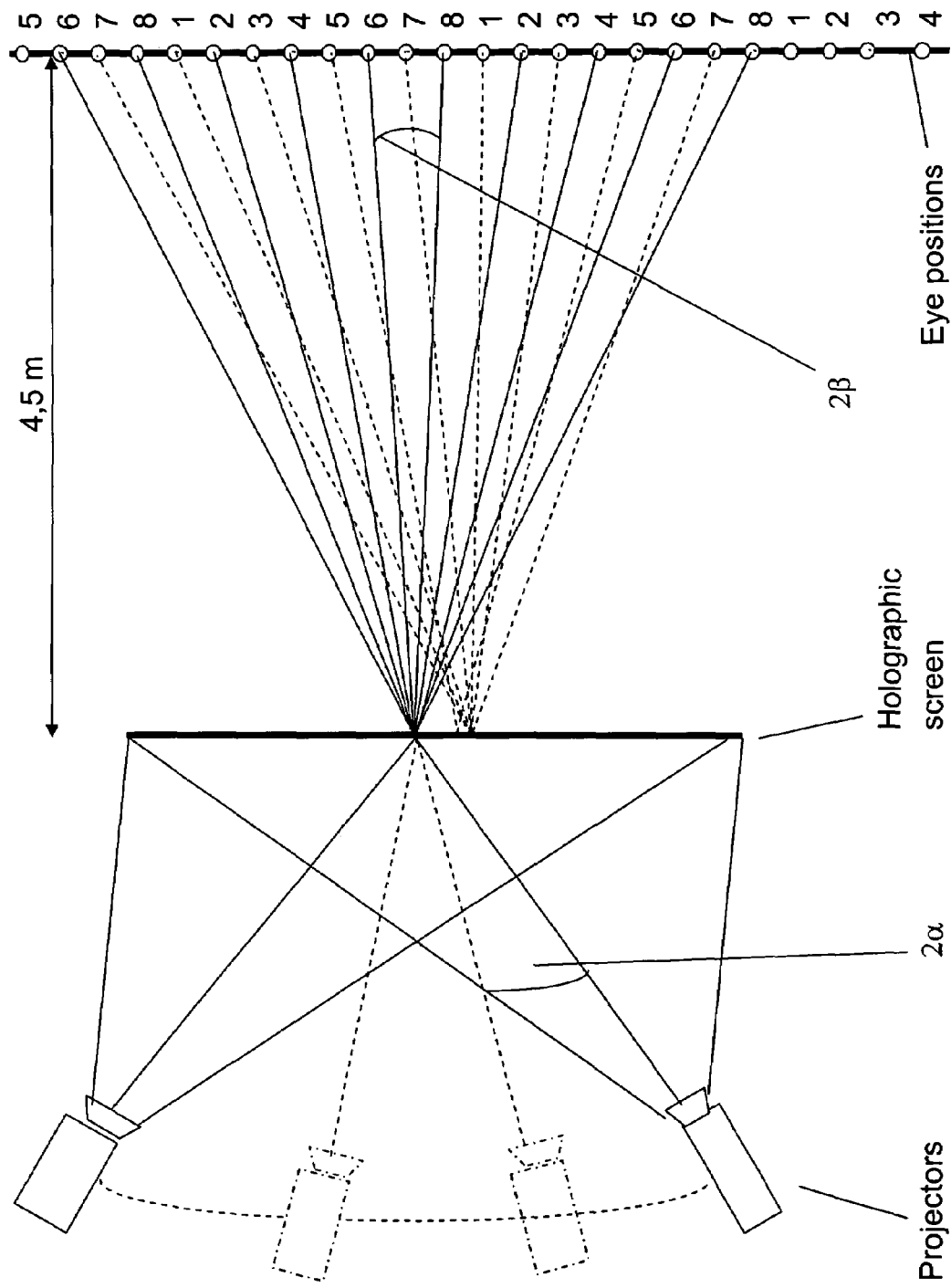
FIG. 38 illustrates an embodiment with projectors, each of which showing bits of image information of at least two views.

FIG. 38 shows an embodiment of the arrangement according to the invention with a holographic 3D back-projection screen which, compared to the embodiment acc. to FIG. 35, needs only half the number of projectors but nevertheless also ensures an excellent 3D impression. Each of the projectors simultaneously projects (interlaced column by column) two of the altogether eight images. The distances of the projectors and the viewing positions from the projection screen as well as the sizes of the angles are equal to those of the embodiment acc. to FIG. 35. Here again, the viewing positions may be aligned either vertically or obliquely, as shown in FIG. 36 or FIG. 37, respectively.

In general, it should be noted that a slight mixing of the views is advantageous for achieving a soft transition from view to view.

As suggested before, the invention includes embodiments permitting a choice between 2D and 3D projection. For switching between the 2D and 3D modes, various embodiment versions are possible.

If, e.g., a filter array is provided in front of a ground glass screen and if these two components from a unit, this can simply be reversed by 180° in order to switch from 2d to 3D display. In another version, this switching is achieved by changing the position of the projector, or by deflecting the light coming from the projector by means of reflectors.

If the arrangement comprises two filter arrays, these may be arranged before or behind the ground glass screen and provided with a sliding mechanism. Depending on the display mode desired, the filter arrays are then slid into the imaging beam path or removed from it. It is also feasible to make the structure of the filter elements in the arrays changeable, e.g., by means of photochromic or electrochromic layers or the like.

What is claimed is:

1. An autostereoscopic projection arrangement comprising:
a first projector, and
a first filter array having a multitude of filter elements, in which
the projector projects bits of partial information from views of a scene or object onto a projection screen, where the bits of partial information are rendered on image rendering elements and, having passed the filter array, are made visible to an observer, and in which
the image rendering elements correspond with correlated filter elements, as regards the propagation direction of the bits of partial information, in such a way that the observer will see predominantly bits of partial information from a first selection of views with a first eye and predominantly bits of partial information from a second selection of views with a second eye, so that the observer perceives a spatial impression,
a second projector,
a second filter array, in which the first filter array is arranged between the projection screen and the projectors, and the second filter array is arranged in front of the projection screen and in which
the first and second filter arrays have wavelength filter elements arranged in columns and rows that are transparent to light of different wavelengths or different wavelength ranges and in which
the projectors project bits of partial information from views of a scene or object through at least one of the first and second filter arrays and onto the projection screen, so that bits of partial information of the views are made optically visible on the projection screen in combination or mix determined by a geometry of the arrangement, and the projection screen is divided into a grid of image rendering elements which are arranged in columns and rows and, depending on the embodiment of the filter arrays and the projectors, radiate light of particular wavelengths or wavelength ranges, with each image rendering element rendering bits of partial information of at least one of the views, and in which
the second filter array arranged in front of the projection screen defines propagation directions for the light radiated by the projection screen toward the observer, in which any individual image rendering element corresponds with several allocated wavelength filters of the filter array, or one wavelength filter of the filter array corresponds with several allocated image rendering elements, in such a way that a straight line connecting a first centroid of the cross-section area of a visible portion of the image rendering element and a second centroid of the cross-section area of a visible portion of the wavelength filter represents one propagation direction, so that, from every viewing position, the observer will see predominantly bits of partial information of a first selection of views with the first eye, and predominantly bits of partial information of a second selection of views with the second eye, so that the observer perceives a spatial impression from a multitude of viewing positions.

2. The autostereoscopic projection arrangement according to claim 1, in which
at least two of the filter arrays cannot be made completely congruent by horizontal and/or vertical linear scaling of their structures, and
the filter arrays are arranged at a distance ($z_A$) in front or behind the projection screen (in viewing direction), respectively, in which ($z_A$) may adopt values in the range of $-60 \text{ mm} \leq (z_A) \leq 60 \text{ mm}$, with a negative value of ($z_A$) meaning arrangement in front of the projection screen and a positive value of ($z_A$) meaning arrangement behind the projection screen at the respective distance given by the absolute amount of ($z_A$).

3. The autostereoscopic projection arrangement according to claim 1, in which at least one filter element of at least one of the filter arrays comprises a lens or a prism.

4. The autostereoscopic projection arrangement according to claim 3, in which the lens comprises a cylindrical lens.

5. The autostereoscopic projection arrangement according to claim 3 in which the lenses or prisms are arranged in columns only or in rows only.

6. The autostereoscopic projection arrangement according to claim 1 in which the projection screen is translucent.

7. The autostereoscopic projection arrangement according to claim 1 in which at least one of the projectors projects a combination image composed of bits of partial information of at least two views ($A_k$), in which preferably two projectors each project a combination image composed of bits of partial information of at least two views ($A_K$) and the image combination structure of the views ($A_K$) selected differs for the said two projectors.

8. The autostereoscopic projection arrangement according to claim 1 in which
the alignment and structure of the filter array between the projectors and the projection screen are selected in such a way that each image rendering element on the projection screen can receive light from at least one of the projectors, and
the projection screen is curved, so that essentially equal angles of incidence are obtained for the light received from the various projectors.

9. The autostereoscopic projection arrangement according to claim 8, in which for each projector, a separate projection position and projection direction is specified related to the projection screen, preferably with the projection direction and the projection distance differing from projector to projector.

10. The autostereoscopic projection arrangement according to claim 1, in which each of the filter arrays contains wavelength filter elements arranged in a specific grid assigned to it, consisting of rows and columns, which are arranged on the filter array depending on their transmission wavelength or their transmission wavelength range according to the following function:

$$b = p_A - d_{Apq} \cdot q_A - n_{Am} \cdot IntegerPart\left[\frac{p_A - d_{Apq} \cdot q_A - 1}{n_{Am}}\right],$$

wherein
($p_A$=p) is the index of a wavelength filter in a row of the respective array,
($q_A$=q) is the index of a wavelength filter in a column of the respective array ($F_A$),
(b) is an integer that defines one of the specified transmission wavelengths or wavelength ranges for a wavelength filter of the filter array in the position ($p_A$,$q_A$), and may have values between 1 and $b_{Amax}$,
($n_{Am}$) is an integer greater than zero that corresponds to the total number (n) of the views ($A_k$) displayed by the projectors,
($d_{Apq}$) is a selectable mask coefficient matrix for varying the arrangement of the wavelength filters on the respective array, and
IntegerPart is a function for generating the greatest integer that does not exceed the argument put in square brackets.

11. An autostereoscopic projection arrangement comprising
a first projector, and
a first filter array having a multitude of filter elements, in which
the projector projects bits of partial information from views of a scene or object onto a projection screen, where the bits of partial information are rendered on image rendering elements and, having passed the filter array, are made visible to an observer, and in which
the image rendering elements correspond with correlated filter elements, as regards the propagation direction of the bits of partial information, in such a way that the observer will see predominantly bits of partial information from a first selection of views with a first eye and predominantly bits of partial information from a second selection of views with a second eye, so that the observer perceives a spatial impression,
a second projector,
in which the first filter array is arranged between the projection screen and the projectors, and
in which the projection screen is suitable for front projection; and
in which the filter array has wavelength filter elements that are arranged in columns and rows, are transparent to light of different wavelengths or different wavelength ranges, and absorb the light that is not transmitted at least partially, and in which
the projectors project bits of partial information from views of a scene or object through at least one of the first and second filter arrays and onto the projection screen, so that bits of partial information of the views are made optically visible on the projection screen in combination or mix determined by a geometry of the arrangement, and the projection screen is divided into a grid of image rendering elements which are arranged in columns and rows and, depending on the embodiment of the filter arrays and the projectors, radiate light of particular wavelengths or wavelength ranges, with each image rendering element rendering bits of partial information of at least one of the views, and in which
the first filter array defines propagation directions for the light radiated by the projection screen toward the observer, in which any individual image rendering element corresponds with several allocated wavelength filters of the filter array, or one wavelength filter of the filter array corresponds with several allocated image rendering elements, in such a way that a straight line connecting a first centroid of the cross-section area of a visible portion of the image rendering element and a second centroid of the cross-section area of a visible portion of the wavelength filter represents one propagation direction, so that, from every viewing position, the observer will see predominantly bits of partial information of a first selection of views with the first eye, and predominantly bits of partial information of a second selection of views with the second eye, so that the observer perceives a spatial impression front a multitude of viewing positions.

12. The autostereoscopic projection arrangement according to claim 11, in which the filter array comprises wavelength filter elements ($\beta_{pq}$) in a grid of rows (q) and columns (p), which, depending on their transmission wavelength/their transmission wavelength range ($\lambda_b$) are arranged on the filter array according to the following function:

$$b = p - d_{pq} \cdot q - n_m \cdot IntegerPart\left[\frac{p - d_{pq} \cdot q - 1}{n_m}\right],$$

wherein
(p) is the index of a wavelength filter $\beta_{pq}$ in a row of the array, (q) is the index of a wavelength filter $\beta_{pq}$ in a column of the array, (b) is an integer that defines one of the specified transmission wavelengths/wavelength ranges ($\lambda_b$) for a wavelength filter ($\beta_{pq}$) of the filter array in the position (p,q), and may have values between 1 and $b_{max}$, ($n_m$) is an integer greater than zero that preferably corresponds to the total number (n) of the views ($A_k$) displayed by the projectors, ($d_{pq}$) is a selectable mask coefficient matrix for varying the arrangement of the wavelength filters on the array, and IntegerPart is a function for generating the greatest integer that does not exceed the argument put in square brackets.

13. An autostereoscopic projection arrangement comprising:

a first projector, and a first filter array having a multitude of filter elements, in which the projector projects bits of partial information from views of a scene or object onto a projection screen, where the bits of partial information are rendered on image rendering elements and, having passed the filter array, are made visible to an observer, and in which the image rendering elements correspond with correlated filter elements, as regards the propagation direction of the bits of partial information, in such a way that the observer will see predominantly bits of partial information from a first selection of views with a first eye and predominantly bits of partial information from a second selection of views with a second eye, so that the observer perceives a spatial impression, in which the projection screen is suitable for front projection, the first filter array is arranged between the projection screen and the projector, the first filter array comprises wavelength filter elements that are arranged in columns and rows, are transparent to light of different wavelengths or different wavelength ranges, and absorb the light tat is not transmitted at least partially, and in which the projector projects bits of partial information from views of a scene or object through at least one of the first and second filter arrays and onto the projection screen, so that bits of partial information of the views are made optically visible on the projection screen in combination or mix determined by a geometry of the arrangement, and the projection screen is divided into a grid of image rendering elements which are arranged in columns and rows and, depending on the embodiment of the filter arrays and the projectors, radiate light of particular wavelengths or wavelength ranges, with each image rendering element rendering bits of partial information of at least one of the views, and in which the first filter array defines propagation directions for the light radiated by the projection screen toward the observer, in which any individual image rendering element corresponds with several allocated wavelength filters of the filter array, or one wavelength filter of the filter array corresponds with several allocated image rendering elements, in such a way that a straight line connecting a first centroid of the cross-section area of a visible portion of the image rendering element and a second centroid of the cross-section area of a visible portion of the wavelength filter represents one propagation direction, so that, from every viewing position, the observer will see predominantly bits of partial information of a first selection of views with the first eye, and predominantly bits of partial information of a second selection of views with the second eye, so that the observer perceives a spatial impression from a multitude of viewing positions.

14. The autostereoscopic projection arrangement according to claim 13, in which the projector radiates light of different wavelengths or wavelength ranges in succession, and the bits of partial information of each of the views are radiated in pairs of different wavelengths or wavelength ranges, in which bits of partial information of n=3 views ($A_k$ with k=1 . . . n) are displayed, the projector is a DMD/DLP projector, and view $A_1$ (k=1) is displayed exclusively in red, view $A_2$ (k=2) exclusively in green, and view $A_3$ (k=3) exclusively in blue.

15. An autostereoscopic projection arrangement comprising:

a first projector, and a first filter array having a multitude of filter elements, in which the projector projects bits of partial information from views of a scene or object onto a projection screen, where the bits of partial information are rendered on image rendering elements and, having passed the filter array, are made visible to an observer, and in which the image rendering elements correspond with correlated filter elements, as regards the propagation direction of the bits of partial information, in such a way that the observer will see predominantly bits of partial information from a first selection of views with a first eye and predominantly bits of partial information from a second selection of views with a second eye, so that the observer perceives a spatial impression, in which the projection screen is a translucent projection screen, and further comprising a second filter array, in which the first filter array is arranged between the projection screen and the projectors, and the second filter array is arranged front of the projection screen and in which the first and second filter arrays have wavelength filter elements arranged in columns and rows that are transparent to light of different wavelengths or different wavelength ranges and in which the projector projects bits of partial information from views of a scene or object through at least one of the first and second filter arrays and onto the projection screen, so that bits of partial information of the views are made optically visible on the projection screen in combination or mix determined by a geometry of the arrangement, and the projection screen is divided into a grid of image rendering elements which are arranged in columns and rows and, which radiate light of particular wavelengths or wavelength ranges, with each image rendering element rendering bits of partial information of at least one of the views, and in which the second filter array, arranged in front of the projection, screen defines propagation directions for the light radiated by the projection screen toward the observer, in which any individual image rendering element corresponds with several allocated wavelength filters of the filter array, or one wavelength filter of the filter array corresponds with several allocated image rendering elements, in such a way that a straight line connecting a first centroid of the cross-section area of a visible portion of the image rendering element and a second centroid of the cross-section area of a visible portion of the wavelength filter represents one propagation direction, so that, from every viewing position, the observer will see predominantly bits of partial information of a first selection of views with the first eye, and predominantly bits of partial information of a second selection of views with the second eye, so that the observer perceives a spatial impression from a multitude of viewing positions.

16. The autostereoscopic projection arrangement according to claim 15, in which
the projector radiates light of different wavelengths or wavelength ranges in succession, and the bits of partial information of each of the views are radiated in pairs of different wavelengths or wavelength ranges, in which
bits of partial information of n=3 views ($A_k$ with k=1 ... n) are displayed, the projector is a DMD/DLP projector, and view $A_1$ (k=1) is displayed exclusively in red, view $A_2$ (k=2) exclusively in green, and view $A_3$ (k=3) exclusively in blue.

17. An autostereoscopic projection arrangement comprising:
a first projector, and
a first filter array having a multitude of filter elements, in which
the projector projects bits of partial information from views of a scene or object onto a projection screen, where the bits of partial information are rendered on image rendering elements and, having passed the filter array, are made visible to an observer, and in which
the image rendering elements correspond with correlated filter elements, as regards the propagation direction of the bits of partial information, in such a way that the observer will see predominantly bits of partial information from a first selection of views with a fast eye and predominantly bits of partial information from a second selection of views with a second eye, so that the observer perceives a spatial impression,
in which
the projection screen is a translucent projection screen,
the first projector is ranged behind the projection screen,
the first filter array is arranged in front of the projection screen,
the first filter array has wavelength filter elements arranged in columns and rows that are transparent to light of different wavelengths or different wavelength ranges and in which
the projector projects bits of partial information from views of a scene or object through at least one of the first and second filter arrays and onto the projection screen, so that bits of partial information of the views are made optically visible on the projection screen in combination or mix determined by a geometry of the arrangement, and the projection screen is divided into a grid of image rendering elements which are arranged in columns and rows and, which radiate light of particular wavelengths or wavelength ranges, with each image rendering element rendering bits of partial information of at least one of the views, and in which
the second filter array, arranged in front of the projection screen, defines propagation directions for the light radiated by the projection screen toward the observer, in which any individual image rendering element corresponds with several allocated wavelength filters of the filter array, or one wavelength filter of the filter array corresponds with several allocated image rendering elements, in such a way that a straight line connecting a first centroid of the cross-section area of a visible portion of the image rendering element and a second centroid of the cross-section area of a visible portion of the wavelength filter represents one propagation direction, so that, from every viewing position, the observer will see predominantly bits of partial information of a first selection of views with the first eye, and predominantly bits of partial information of a second selection of views with the second eye, so that the observer perceives a spatial impression from a multitude of viewing positions.

* * * * *